(12) United States Patent
Flinn et al.

(10) Patent No.: US 9,454,730 B2
(45) Date of Patent: *Sep. 27, 2016

(54) EXPERTISE DISCOVERY IN SOCIAL NETWORKS

(71) Applicants: Steven Dennis Flinn, Sugar Land, TX (US); Naomi Felina Moneypenny, Houston, TX (US)

(72) Inventors: Steven Dennis Flinn, Sugar Land, TX (US); Naomi Felina Moneypenny, Houston, TX (US)

(73) Assignee: ManyWorlds, Inc., Brenham, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,654

(22) Filed: Sep. 17, 2015

(65) Prior Publication Data

US 2016/0012344 A1 Jan. 14, 2016

Related U.S. Application Data

(63) Continuation of application No. 14/462,788, filed on Aug. 19, 2014, now Pat. No. 9,171,263, which is a continuation of application No. 13/555,941, filed on Jul. 23, 2012, now Pat. No. 8,843,433, which is a (Continued)

(51) Int. Cl.
| | |
|---|---|
| *G06F 9/44* | (2006.01) |
| *G06N 7/02* | (2006.01) |
| *G06N 7/06* | (2006.01) |
| *G06N 5/04* | (2006.01) |
| *G06Q 50/00* | (2012.01) |
| *G06F 17/30* | (2006.01) |
| *G06F 17/28* | (2006.01) |

(52) U.S. Cl.
CPC .......... *G06N 5/048* (2013.01); *G06F 17/30528* (2013.01); *G06Q 50/01* (2013.01); *G06F 17/2881* (2013.01)

(58) Field of Classification Search
CPC combination set(s) only.
See application file for complete search history.

(56) References Cited

U.S. PATENT DOCUMENTS

| | | | |
|---|---|---|---|
| 7,860,811 B2 | 12/2010 | Flinn et al. | |
| 8,380,579 B2 | 2/2013 | Flinn et al. | |
| 8,458,119 B2 | 6/2013 | Flinn et al. | |
| 8,458,120 B2 | 6/2013 | Flinn et al. | |

(Continued)

OTHER PUBLICATIONS

Using weak ties to understand resource usage behaviors in an online community of educators Oghencovo Dibie; Tamara Sumner 2015 IEEE/ACM International Conference on Advances in Social Networks Analysis and Mining (ASONAM) Year: 2015 pp. 533-536, DOI: 10.1145/2808797.2809420 IEEE Conference Publications.*

(Continued)

*Primary Examiner* — Michael B Holmes

(57) ABSTRACT

A method and system of expertise discovery in social networks accesses behavioral information associated with users' use of a computer-implemented social network, whereby the computer-implemented social network enables its users to have subscribing relationships with other users. Expertise levels of users of the social network with respect to one or more topics are automatically inferred from the behavioral information. The behavioral information may comprise interactions by other users with respect to content published by a user. The expertise levels of users may be inferred in accordance with the expertise levels of other users who are subscribed to them. Recommendations of users based on their expertise levels may be delivered, as well as explanations for the recommendations. Expertise levels of multiple users and/or expertise levels of a user over time may be delivered for display.

20 Claims, 19 Drawing Sheets

Related U.S. Application Data continuation-in-part of application No. 13/295,414, filed on Nov. 14, 2011, now Pat. No. 8,600,926, which is a continuation-in-part of application No. 13/268,035, filed on Oct. 7, 2011, now Pat. No. 8,650,149.

(60) Provisional application No. 61/469,052, filed on Mar. 29, 2011, provisional application No. 61/496,025, filed on Jun. 12, 2011, provisional application No. 61/513,920, filed on Aug. 1, 2011.

(56) References Cited

U.S. PATENT DOCUMENTS

| | | | |
|---|---|---|---|
| 8,515,901 | B2 | 8/2013 | Flinn et al. |
| 8,600,920 | B2 | 12/2013 | Flynn et al. |
| 8,600,926 | B2 | 12/2013 | Flinn et al. |
| 8,645,292 | B2 | 2/2014 | Flinn et al. |
| 8,645,312 | B2 | 2/2014 | Flinn et al. |
| 8,650,149 | B2 | 2/2014 | Flinn et al. |
| 8,655,829 | B2 | 2/2014 | Flinn et al. |
| 8,676,742 | B2 | 3/2014 | Flinn et al. |
| 8,694,442 | B2 | 4/2014 | Flinn et al. |
| 8,694,457 | B2 | 4/2014 | Flinn et al. |
| 8,719,213 | B2 | 5/2014 | Flinn et al. |
| RE44,966 | E * | 6/2014 | Flinn ............... G06F 15/18 706/12 |
| RE44,967 | E * | 6/2014 | Flinn ............... G06F 15/18 706/12 |
| RE44,968 | E * | 6/2014 | Flinn ............... G06F 15/18 706/12 |
| 8,818,917 | B2 * | 8/2014 | Flinn ............... G06N 7/02 706/11 |
| 8,818,931 | B2 * | 8/2014 | Flinn ............... G06F 17/27 706/52 |
| 8,843,433 | B2 * | 9/2014 | Flinn ............... G06N 5/048 706/52 |
| 9,026,488 | B2 * | 5/2015 | Flinn ............... G06F 17/30699 707/603 |
| 9,047,245 | B2 * | 6/2015 | Flinn ............... G06F 17/30699 |
| RE45,770 | E * | 10/2015 | Flinn ............... G06F 15/18 |
| 9,159,027 | B2 * | 10/2015 | Flinn ............... G06N 5/022 |
| 9,165,259 | B2 * | 10/2015 | Flinn ............... G06N 7/02 |
| 9,171,262 | B2 * | 10/2015 | Flinn ............... G06F 17/27 |
| 9,171,263 | B2 * | 10/2015 | Flinn ............... G06N 5/048 |
| 2006/0155681 | A1 | 7/2006 | Chiang et al. |
| 2008/0243817 | A1 | 10/2008 | Chan et al. |
| 2009/0248599 | A1 | 10/2009 | Hueter et al. |
| 2010/0228582 | A1 | 9/2010 | King et al. |
| 2010/0235313 | A1 | 9/2010 | Rea et al. |
| 2011/0055017 | A1 | 3/2011 | Solomon et al. |
| 2011/0066497 | A1 | 3/2011 | Gopinath et al. |
| 2011/0082825 | A1 | 4/2011 | Sathish et al. |
| 2011/0125700 | A1 | 5/2011 | Funada |
| 2011/0153414 | A1 | 6/2011 | Elvekrog et al. |
| 2011/0219011 | A1 | 9/2011 | Carmel et al. |
| 2016/0012343 | A1 | 1/2016 | Flinn et al. |

OTHER PUBLICATIONS

Uberveillance and the Internet of Things and people M. G. Michael; Katina Michael; Christine Perakslis Contemporary Computing and Informatics (IC3I), 2014 International Conference on Year: 2014 pp. 1381-1386, DOI: 10.1109/IC3I.2014.7019829 IEEE Conference Publications.*

Inferring user relationship from hidden information in WLANs Ningning Cheng; Prasant Mohapatra; Mathieu Cunche; Mohamed Ali Kaafar; Roksana Boreli; Srikanth Krishnamurthy MILCOM 2012—2012 IEEE Military Communications Conference Year: 2012 pp. 1-6, DOI: 10.1109/MILCOM.2012.6415713 IEEE Conference Publications.*

Synergizing people, process, and technology to motivate knowledge sharing and collaboration industry case study Pickering, C.K. Collaboration Technologies and Systems (CTS), 2013 Intemtional Conference on Year: 2013 pp. 35-39, DOI: 10.1109/CTS.2013.6567200.

Temporally adaptive motion estimation using temporal subband analysis Zung Kon Yim; Jae Ho Chung Circuits and Systems, 1996. ISCAS '96., Connecting the World., 1996 IEEE International Symposium on Year:1996, vol. 2 pp. 588-591 vol. 2, DOI: 10.1109/ISCAS.1996.541793.

Leveraging temporal, contextual and ordering constraints or recognizing complex activities in video Laxton, B; Jongwoo Lim; Kriegman, D Computer vision and Pattern Recognition, 2007. CVPR '07 IEEE Conference on Year: 2007 pp. 1-8, DOI: 10.1109/CVPR.2007.383074.

An implicit spatiotemporal shape model for human activity localization and recognition Oikonomopoulos, A; Patras, I; Pantic, M. Computer Vision and Pattern Recognition Workshops, 2009, CVPR Workshops 2009. IEEE Computer Society Conference of the Year: 2009 pp. 27-33, DOI: 10.1109/CVPRW.2009.5204262.

Relationships Among Distinct Models and Notions of Equivalence for Stochastic Finite-State Systems De Renna E, C.; Leake, R.J. Computers, IEEE Transactions on Year: 1969, vol. C-18, Issue: 7 pp. 633-641, DOI: 10.1109/T-C.1969.222730.

Study on relationship between optical signals and charge quantity of partial discharge under four typical insulation lefects Zhuo Ran; Tang Ju; Fan Lei; Liu Yonggng; Zhang Xiaoxing. Electrical Insulation and Dielectric Phenomena (CEIDP), 2013 IEEE Conference on Year: 2013 pp. 1209-1212, DOI: 10.1109/CEIDP.2013.6748175.

Analysis of spatial-temporal regularization methods for linear inverse problems from a common statistical framework Yiheng Zhang; Ghodrati, Alizera; Brooks, D.H. Biomedical Imaging: Nano to Macro, 2004. IEEE International Symposium on Year: 2004 pp. 772-775 vol. 1, DOI: 1109/ISBI.2004.1398652.

On the Spectral Characterization and Scalable Mining of Network Communities Bo Yang; Jiming Liu; Jianfeng Feng Knowledge and Data Engineering, IEEE Transactions on Year: 2012, vol. 24, Issue: 2 pp. 326-337, DOI: 10.1109/TKDE.2010.233.

Automated Building of Domain Ontologies from Lecture Notes in Courseware Gantayat, N.; Iyer, S. Technology for Education (T4E), 2011 IEEE International Conference on Year: 2011 pp. 89-95, DOI: 10.1109/T4E.201122 Referenced in: IEEE Conference Publications.

Use of usability evaluation methods in France: The reality in professional practices Roche, A.; Lespinet-Njib, V.; Andre, J.-M. User Science and Engineering (i-USEr), 2014 3rd International Conference on Year: 2014 pp. 180-185, DOI: 10.1109/IUSER.2014.7002699 Referenced in: IEEE Conference Publications.

Modeling the Risk & Utility of Information Sharing in Social Networks Fouad, M.R.; Elbassioni, K.; Bertino, E. Privacy, Security, Risk and Trust (PASSAT), 2012 International Conference on Social Computing (SocialCom) Year: 2012 pp. 441-450, DOI: 10.1109/SocialCom-PASSAT.2012.131.

Droid Analytics: A Signature Based Analytic System to Collect, Extract, Analyze and Associate Android Malware Min Zheng; Mingshen Sun; Lui, J.C.S. Trust, Security, and Privacy in Computing and Communications (Trustcom), 2013 12th IEEE International Conference on Year: 2013 pp. 163-171, DOI: 10.1109/TrustCom.2013.25.

* cited by examiner

| Phrase Array | Phrase ID | Relative Frequency | Phrase | Phrase Attribute 1 | Phrase Attribute 2 |
|---|---|---|---|---|---|
| Array 1 | 1 | 1 | I've noticed you've been spending a lot of time with your profile lately ;-) | Sarcastic | User-attentive |
| Array 1 | 2 | 3 | It seems to me that you recently have been more interested in areas such as {1} | Business-like | User-attentive |
| Array 1 | 3 | 1 | I've noticed your colleagues have been very interested recently in {1}-related topics | Business-like | Socially-attentive |
| Array 1 | 4 | 5 | Null | Null | Null |
| Array 2 | 1 | 2 | I know this is probably silly of me | Humorous | Introspective |
| Array 2 | 2 | 1 | I often wonder why you | Inquisitive | User-attentive |

4000

| Phrase Array | Phrase ID | Relative Frequency | Phrase | Phrase Attribute 2 | Phrase Attribute 3 |
|---|---|---|---|---|---|
| Array 3 | 1 | 1 | You know, I sense that I have become a lot more fun loving since I met you | Introspective | Humorous |
| Array 3 | 2 | 2 | I feel like I take myself a lot less seriously when I'm around you | Introspective | Humorous |
| Array 3 | 3 | 10 | Null | Null | Null |
| Array 4 | 1 | 1 | I keep wondering why I've become increasingly self-absorbed of late | Introspective | Introspective |
| Array 4 | 2 | 1 | Null | Null | Null |

EXPERTISE DISCOVERY IN SOCIAL NETWORKS

CROSS-REFERENCE TO RELATED APPLICATIONS

The present application is a continuation of U.S. patent application Ser. No. 14/462,788, filed on Aug. 19, 2014, which is a continuation of U.S. patent application Ser. No. 13/555,941, filed on Jul. 23, 2012, now U.S. Pat. No. 8,843,433, which is a continuation-in-part of U.S. patent application Ser. No. 13/295,414, filed on Nov. 14, 2011, now U.S. Pat. No. 8,600,926, which is a continuation-in-part of U.S. patent application Ser. No. 13/268,035, filed on Oct. 7, 2011, now U.S. Pat. No. 8,650,149, which claims the benefit of U.S. Provisional Patent Application No. 61/469,052, filed Mar. 29, 2011, U.S. Provisional Patent Application No. 61/496,025, filed Jun. 12, 2011, and U.S. Provisional Patent Application No. 61/513,920, filed Aug. 1, 2011, all of which are hereby incorporated by reference as if set forth herein in their entirety.

FIELD OF THE INVENTION

This invention relates to systems and methods for incorporating an adaptive layer of auto-learning capabilities within one or more computer-implemented systems.

BACKGROUND OF THE INVENTION

Existing computer-implemented recommender systems can provide personalized recommendations basis expected interests of recommendation recipients derived from behavioral history with respect to system use. Existing search engines can index the contents of documents and retrieve information based on search terms provided by users. However, these approaches operating independently are inadequate in some cases for delivering the most useful information to computer systems users. Thus there is a need for a system and method that beneficially integrates the two approaches.

SUMMARY OF THE INVENTION

In accordance with the embodiments described herein, a system and method for generating personalized recommendations based, at least in part, on combining behavioral-based indexing and contents-based indexing is disclosed. The interest levels and/or expertise levels of users may be inferred from behavioral information during the behavioral-based indexing of one or more computer-implemented systems. The contents of objects of one or more computer-implemented systems may be indexed, by, for example, a search engine, into vectors of object informational elements and associated relevancy values. Topical areas of interest and/or expertise associated with users are mapped to object information elements. An evaluation of interest and/or expertise levels for the mapped topics versus the relevancy values of the informational elements of objects provides a basis for selecting the objects to be delivered to the user.

Other features and embodiments will become apparent from the following description, from the drawings, and from the claims.

BRIEF DESCRIPTION OF THE DRAWINGS

FIG. 11 is a diagram of exemplary data structures associated with the adaptive personality process and the self-aware personality process of FIGS. 9 and 10, according to some embodiments;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

A method and system for transforming one or more non-adaptive or inadequately adaptive systems to an adaptive system are disclosed. In some embodiments, originating fuzzy or non-fuzzy network information structures are transformed to fuzzy network structures so as to enable a greater capacity for adaptation, while retaining a degree of contextual correspondence. The term "fuzzy network" as used herein is defined as a computer-implemented plurality of nodes, with relationships among the nodes that have affinities that are by degree. The nodes of a fuzzy network may comprise any type of computer-implemented information. In contrast, non-fuzzy networks, including hierarchies, comprise a plurality of nodes, with relationships among the nodes that are binary: that is, either the relationships between any two nodes exist or do not exist. A non-fuzzy network can therefore be considered just a particularly constrained form of a fuzzy network.

In some embodiments, knowledge discovery and expertise discovery functions are applied to the original non-fuzzy network and/or the transformed structure. In some embodiments, additional "learning layer" functions may be applied to the originating and/or transformed structures to enable additional or enhanced adaptive features, including applying functions to enhance beneficial serendipity with regard to personalized recommendations.

Adaptive System

Figure 1:
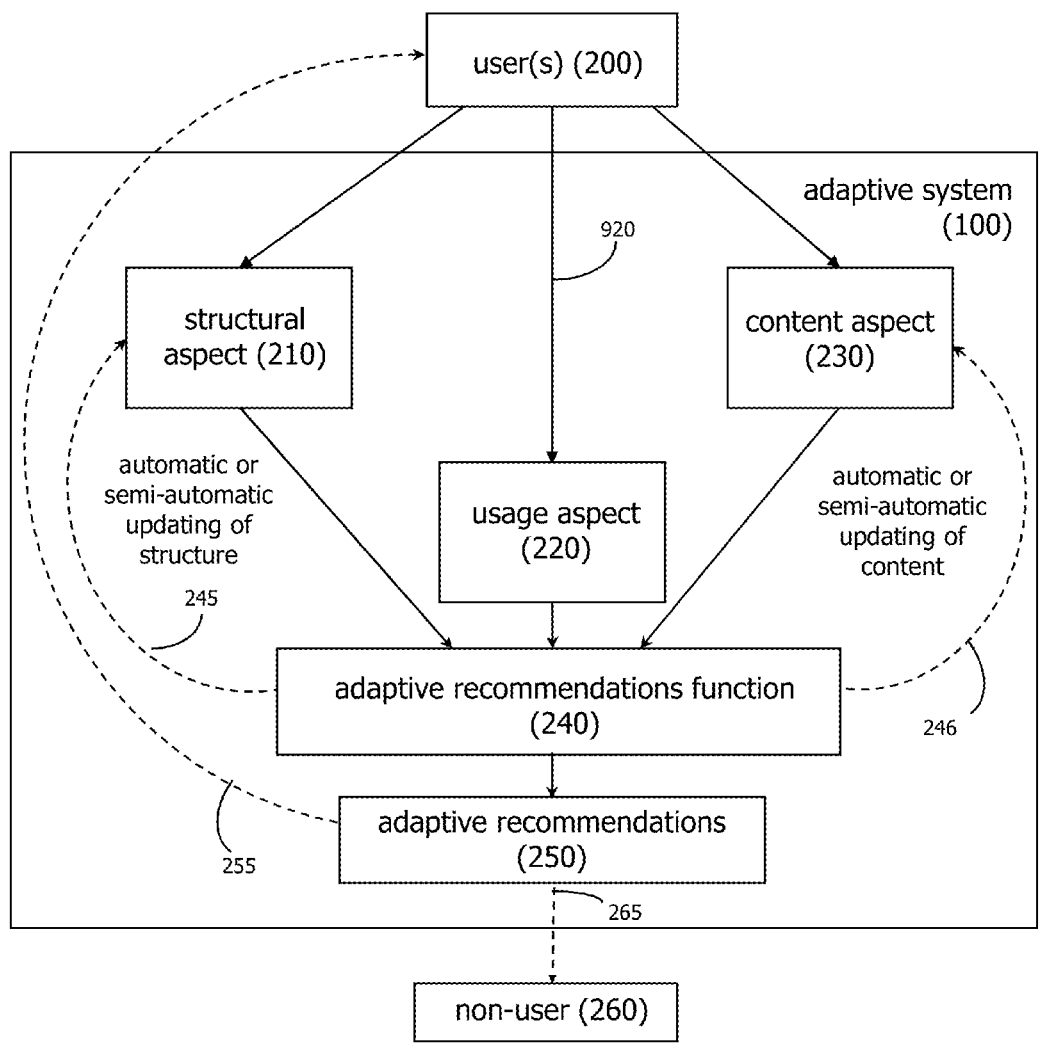
FIG. 1 is a block diagram of an adaptive system, according to some embodiments.

In some embodiments, the present invention may apply the methods and systems of an adaptive system as depicted by FIG. 1. FIG. 1 is a generalized depiction of an adaptive system 100, according to some embodiments. The adaptive system 100 includes three aspects: a structural aspect 210, a usage aspect 220, and a content aspect 230. One or more users 200 interact with the adaptive system 100. An adaptive recommendations function 240 may produce adaptive recommendations 250 based upon the user interactions, and the recommendations may be delivered to the user 200 or applied to the adaptive system 100.

As used herein, one or more users 200 may be a single user or multiple users. As shown in FIG. 1, the one or more users 200 may receive the adaptive recommendations 250. Non-users 260 of the adaptive system 100 may also receive adaptive recommendations 250 from the adaptive system 100.

A user 200 may be a human entity, a computer system, or a second adaptive system (distinct from the adaptive system 100) that interacts with, or otherwise uses the adaptive system. The one or more users 200 may therefore include non-human "users" that interact with the adaptive system 100. In particular, one or more other adaptive systems may serve as virtual system "users." Although not essential, these other adaptive systems may operate in accordance with the architecture of the adaptive system 100. Thus, multiple adaptive systems may be mutual users of one another.

It should be understood that the structural aspect 210, the content aspect 230, the usage aspect 220, and the recommendations function 240 of the adaptive system 100, and elements of each, may be contained within one processor-based device, or distributed among multiple processor-based devices, and wherein one or more of the processor-based devices may be portable. Furthermore, in some embodiments one or more non-adaptive systems may be transformed to one or more adaptive systems 100 by means of operatively integrating the usage aspect 220 and the recommendations function 240 with the one or more non-adaptive systems. In some embodiments the structural aspect 210 of a non-adaptive system may be transformed to a fuzzy network-based structural aspect 210 to provide a greater capacity for adaptation.

The term "computer system" or the term "system," without further qualification, as used herein, will be understood to mean either a non-adaptive or an adaptive system. Likewise, the terms "system structure" or "system content," as used herein, will be understood to refer to the structural aspect 210 and the content aspect 230, respectively, whether associated with a non-adaptive system or the adaptive system 100. The term "system structural subset" or "structural subset," as used herein, will be understood to mean a portion or subset of the elements of the structural aspect 210 of a system.

Structural Aspect

Figure 2A:
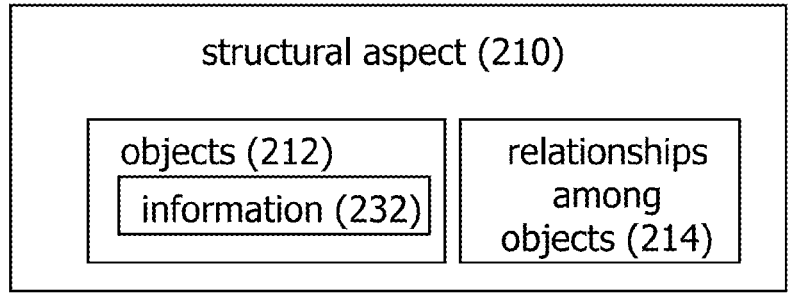
FIGS. 2A, 2B, and 2C are block diagrams of the structural aspect, the content aspect, and the usage aspect of the adaptive system of FIG. 1, according to some embodiments.
Figure 2B:
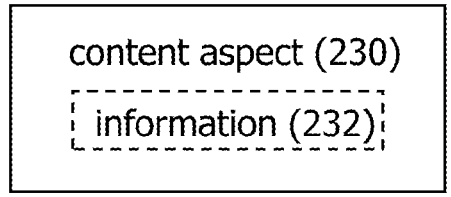

The structural aspect 210 of the adaptive system 100 is depicted in the block diagram of FIG. 2A. The structural aspect 210 comprises a collection of system objects 212 that are part of the adaptive system 100, as well as the relationships among the objects 214, if they exist. The relationships among objects 214 may be persistent across user sessions, or may be transient in nature. The objects 212 may include or reference items of content, such as text, graphics, audio, video, interactive content, or embody any other type or item of computer-implemented information. The objects 212 may also include references, such as pointers, to content. Computer applications, executable code, or references to computer applications may also be stored as objects 212 in the adaptive system 100. The content of the objects 212 is known herein as information 232. The information 232, though part of the object 214, is also considered part of the content aspect 230, as depicted in FIG. 2B, and described below.

The objects 212 may be managed in a relational database, or may be maintained in structures such as, but not limited to, flat files, linked lists, inverted lists, hypertext networks, or object-oriented databases. The objects 212 may include meta-information 234 associated with the information 232 contained within, or referenced by the objects 212.

As an example, in some embodiments, the World-wide Web could be considered a structural aspect, wherein web pages constitute the objects of the structural aspect and links between web pages constitute the relationships among the objects. Alternatively, or in addition, in some embodiments, the structural aspect could be composed of objects associated with an object-oriented programming language, and the relationships between the objects associated with the protocols and methods associated with interaction and communication among the objects in accordance with the object-oriented programming language.

The one or more users 200 of the adaptive system 100 may be explicitly represented as objects 212 within the system 100, therefore becoming directly incorporated within the structural aspect 210. The relationships among objects 214 may be arranged in a hierarchical structure, a relational structure (e.g. according to a relational database structure), or according to a network structure.

Content Aspect

The content aspect 230 of the adaptive system 100 is depicted in the block diagram of FIG. 2B. The content aspect 230 comprises the information 232 contained in, or referenced by the objects 212 that are part of the structural aspect 210. The content aspect 230 of the objects 212 may include text, graphics, audio, video, and interactive forms of content, such as applets, tutorials, courses, demonstrations, modules, or sections of executable code or computer programs. The one or more users 200 interact with the content aspect 230.

The content aspect 230 may be updated based on the usage aspect 220, as well as associated metrics. To achieve this, the adaptive system 100 may use or access information from other systems. Such systems may include, but are not limited to, other computer systems, other networks, such as the World Wide Web, multiple computers within an organization, other adaptive systems, or other adaptive recombinant systems. In this manner, the content aspect 230 benefits from usage occurring in other environments.

Usage Aspect

Figure 2C:
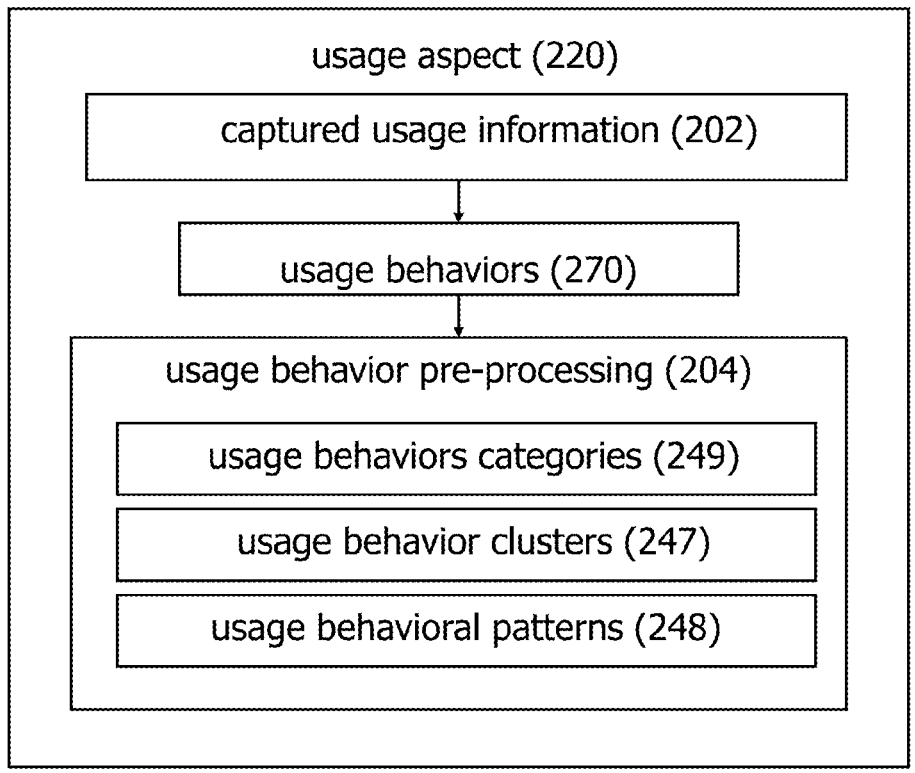

The usage aspect 220 of the adaptive system 100 is depicted in the block diagram of FIG. 2C, although it should be understood that the usage aspect 220 may also exist independently of adaptive system 100 in some embodiments. The usage aspect 220 denotes captured usage information 202, further identified as usage behaviors 270, and usage behavior pre-processing 204. The usage aspect 220 thus reflects the tracking, storing, categorization, and clustering of the use and associated usage behaviors of the one or more users 200 interacting with, or being monitored by, the adaptive system 100. Applying usage behavioral information 202, including, but not limited to the usage behavioral information described by Table 1, to generate relationships or affinities 214 among objects 212 may be termed "behavioral indexing" herein.

The captured usage information 202, known also as system usage or system use 202, may include any user behavior 920 exhibited by the one or more users 200 while using the system. The adaptive system 100 may track and store user key strokes and mouse clicks, for example, as well as the time period in which these interactions occurred (e.g., timestamps), as captured usage information 202. From this captured usage information 202, the adaptive system 100 identifies usage behaviors 270 of the one or more users 200 (e.g., a web page access or email transmission). Finally, the usage aspect 220 includes usage-behavior pre-processing, in which usage behavior categories 249, usage behavior clusters 247, and usage behavioral patterns 248 are formulated for subsequent processing of the usage behaviors 270 by the adaptive system 100. Non-limiting examples of the usage behaviors 270 that may be processed by the adaptive system 100, as well as usage behavior categories 249 designated by the adaptive system 100, are listed in Table 1, and described in more detail, below.

The usage behavior categories 249, usage behaviors clusters 247, and usage behavior patterns 248 may be interpreted with respect to a single user 200, or to multiple users 200; the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 249 include types of usage behaviors 270, such as accesses, referrals to other users, collaboration with other users, and so on. These categories and more are included in Table 1, below. Usage behavior clusters 247 are groupings of one or more usage behaviors 270, either within a particular usage behavior category 249 or across two or more usage categories. The usage behavior pre-processing 204 may also determine new clusterings of user behaviors 270 in previously undefined usage behavior categories 249, across categories, or among new communities. Usage behavior patterns 248, also known as "usage behavioral patterns" or "behavioral patterns," are also groupings of usage behaviors 270 across usage behavior categories 249. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, and/or monitored behaviors such as physiological responses, physical location, and environmental conditions local to the user 200. The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences 252 associated with other adaptive or non-adaptive systems.

Adaptive Recommendations

As shown in FIG. 1, the adaptive system 100 generates adaptive recommendations 250 using the adaptive recommendations function 240. The adaptive recommendations 250, or suggestions, enable users to more effectively use and/or navigate the adaptive system 100.

The adaptive recommendations 250 are presented as structural subsets of the structural aspect 210, which may comprise an item of content, multiple items of content, a representation of one or more users, and/or a user activity or stream of activities. The recommended content or activities may include information generated automatically by a processor-based system or device, such as, for example, by a process control device. A recommendation may comprise a spatial or temporal sequence of objects. The adaptive recommendations 250 may be in the context of a currently conducted activity of the system 100, a current position while navigating the structural aspect 210, a currently accessed object 212 or information 232, or a communication with another user 200 or another system. The adaptive recommendations 250 may also be in the context of a historical path of executed system activities, accessed objects 212 or information 232, or communications during a specific user session or across user sessions. The adaptive recommendations 250 may be without context of a current activity, currently accessed object 212, current session path, or historical session paths. Adaptive recommendations 250 may also be generated in response to direct user requests or queries, including search requests. Such user requests may be in the context of a current system navigation, access or activity, or may be outside of any such context and the recommended content sourced from one or more systems. The adaptive recommendations 250 may comprise advertising or sponsored content. The adaptive recommendations 250 may be delivered through any computer-implemented means, including, but not limited to delivery modes in which the recommendation recipient 200, 260 can read and/or listen to the recommendation 250.

Fuzzy Content Network

Figure 3:
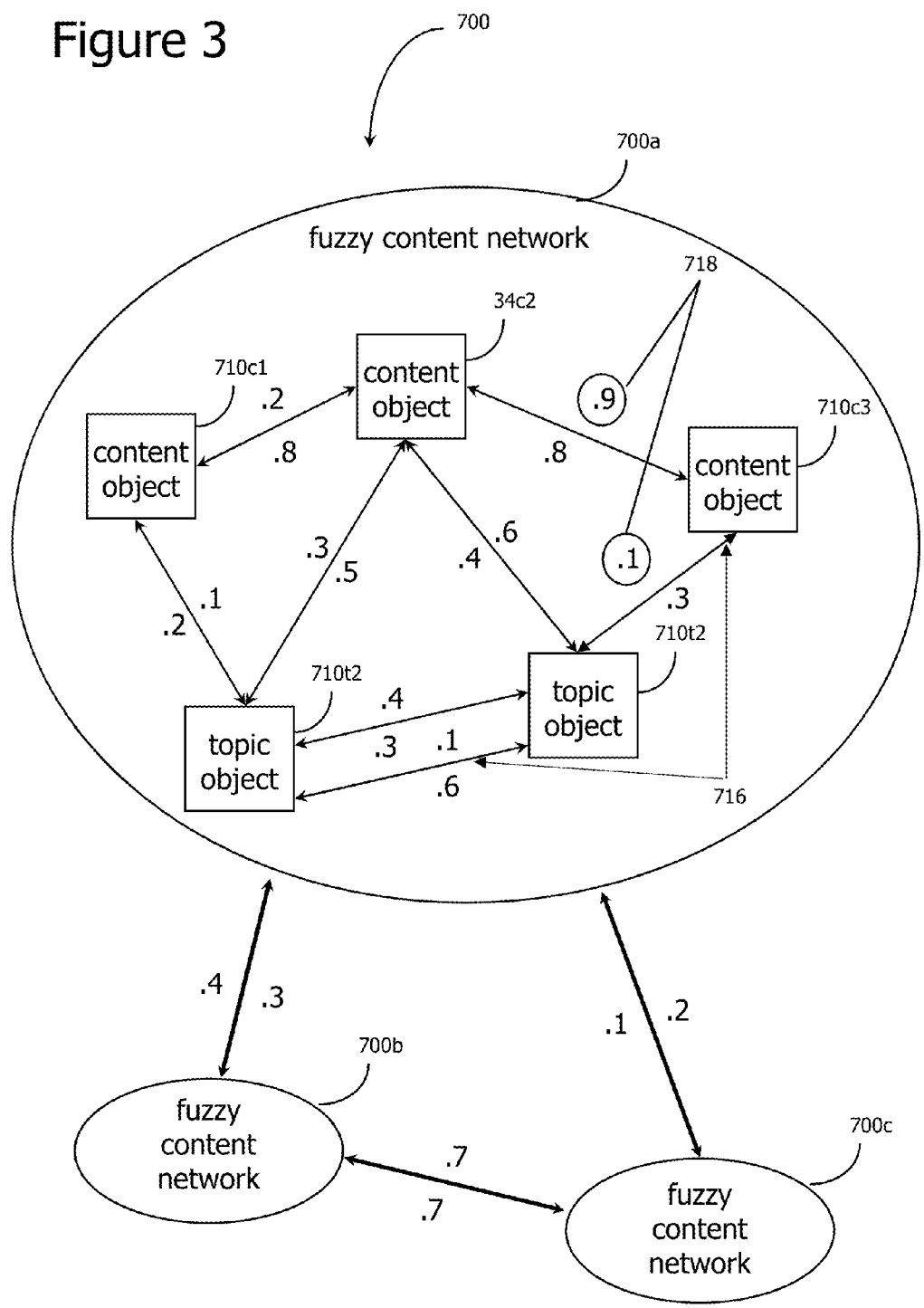
FIG. 3 is a block diagram of a fuzzy content network-based system, according to some embodiments.
Figure 4A:
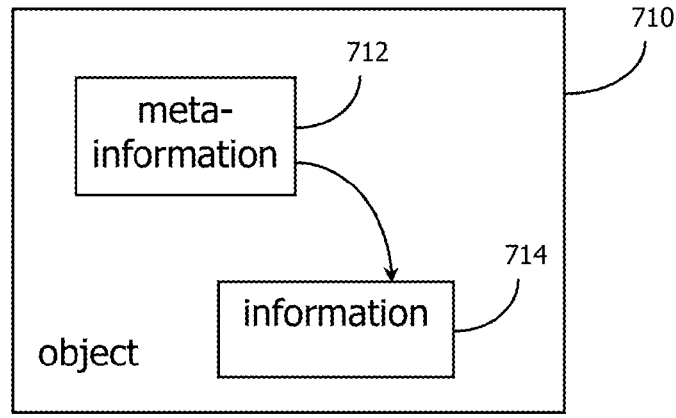
FIGS. 4A, 4B, and 4C are block diagrams of an object, a topic object, and a content object, according to some embodiments.

In some embodiments, the structural aspect 210 of the adaptive system 100, comprises a specific type of fuzzy network, a fuzzy content network. A fuzzy content network 700 is depicted in FIG. 3. The fuzzy content network 700 may include multiple content sub-networks, as illustrated by the content sub-networks 700a, 700b, and 700c, and fuzzy content network 700 includes "content," "data," or "information," packaged in objects 710. Details about how the object works internally may be hidden. In FIG. 4A, for example, the object 710 includes meta-information 712 and information 714. The object 710 thus encapsulates information 714.

Another benefit to organizing information as objects is known as inheritance. The encapsulation of FIG. 4A, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 4B:
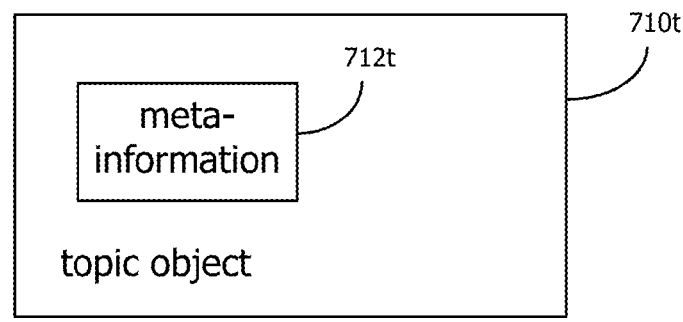
Figure 4C:
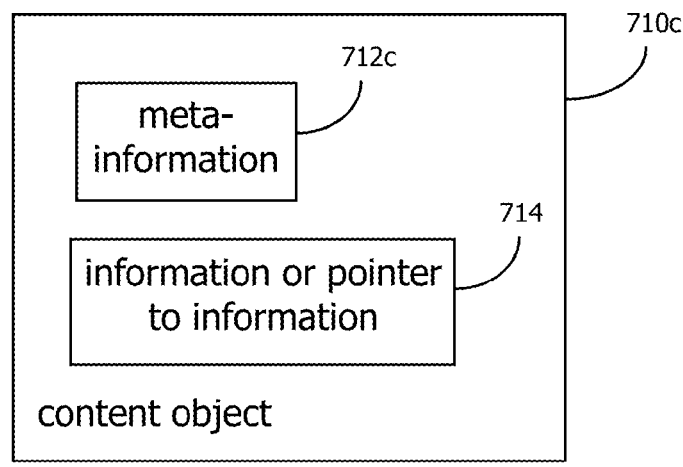

In the content network 700, the objects 710 may be either topic objects 710$t$ or content objects 710$c$, as depicted in FIGS. 4B and 4C, respectively. Topic objects 710$t$ are encapsulations that contain meta-information 712$t$ and relationships to other objects (not shown), but do not contain an embedded pointer to reference associated information. The topic object 710$t$ thus essentially operates as a "label" to a class of information. The topic object 710 therefore just refers to "itself" and the network of relationships it has with other objects 710. People may be represented as topic objects or content objects in accordance with some embodiments.

Content objects 710$c$, as shown in FIG. 4C, are encapsulations that optionally contain meta-information 712$c$ and relationships to other objects 710 (not shown). Additionally, content objects 710$c$ may include either an embedded pointer to information or the information 714 itself (hereinafter, "information 714").

The referenced information 714 may include files, text, documents, articles, images, audio, video, multi-media, software applications and electronic or magnetic media or signals. Where the content object 714$c$ supplies a pointer to information, the pointer may be a memory address. Where the content network 700 encapsulates information on the Internet, the pointer may be a Uniform Resource Locator (URL).

The meta-information 712 supplies a summary or abstract of the object 710. So, for example, the meta-information 712$t$ for the topic object 710$t$ may include a high-level description of the topic being managed. Examples of meta-information 712$t$ include a title, a sub-title, one or more descriptions of the topic provided at different levels of detail, the publisher of the topic meta-information, the date the topic object 710$t$ was created, and subjective attributes such as the quality, and attributes based on user feedback associated with the referenced information. Meta-information may also include a pointer to referenced information, such as a uniform resource locator (URL), in one embodiment.

The meta-information 712$c$ for the content object 710$c$ may include relevant keywords associated with the information 714, a summary of the information 714, and so on. The meta-information 712$c$ may supply a "first look" at the objects 710$c$. The meta-information 712$c$ may include a title, a sub-title, a description of the information 714, the author of the information 714, the publisher of the information 714, the publisher of the meta-information 712$c$, and the date the content object 710$c$ was created, as examples. As with the topic object 710$t$, meta-information for the content object 710$c$ may also include a pointer.

In FIG. 3, the content sub-network 700$a$ is expanded, such that both content objects 710$c$ and topic objects 710$t$ are visible. The various objects 710 of the content network 700 are interrelated by degrees using relationships 716 (unidirectional and bidirectional arrows) and relationship indicators 718 (values). Each object 710 may be related to any other object 710, and may be related by a relationship indicator 718, as shown. Thus, while information 714 is encapsulated in the objects 710, the information 714 is also interrelated to other information 714 by a degree manifested by the relationship indicators 718.

The relationship indicator 718 is a type of affinity comprising a value associated with a relationship 716, the value typically comprising a numerical indicator of the relationship between objects 710. Thus, for example, the relationship indicator 718 may be normalized to between 0 and 1, inclusive, where 0 indicates no relationship, and 1 indicates a subset or maximum relationship. Or, the relationship indicators 718 may be expressed using subjective descriptors that depict the "quality" of the relationship. For example, subjective descriptors "high," "medium," and "low" may indicate a relationship between two objects 710.

The relationship 716 between objects 710 may be bi-directional, as indicated by the double-pointing arrows. Each double-pointing arrow includes two relationship indicators 718, one for each "direction" of the relationships between the objects 710.

As FIG. 3 indicates, the relationships 716 between any two objects 710 need not be symmetrical. That is, topic object 710$t$1 has a relationship of "0.3" with content object 710$c$2, while content object 710$c$2 has a relationship of "0.5" with topic object 710$t$1. Furthermore, the relationships 716 need not be bi-directional—they may be in one direction only. This could be designated by a directed arrow, or by simply setting one relationship indicator 718 of a bi-directional arrow to "0," the null relationship value.

The content networks 700A, 700B, 700C may be related to one another using relationships of multiple types and associated relationship indicators 718. For example, in FIG. 3, content sub-network 700$a$ is related to content sub-network 700$b$ and content sub-network 700$c$, using relationships of multiple types and associated relationship indicators 718. Likewise, content sub-network 700$b$ is related to content sub-network 700$a$ and content sub-network 700$c$ using relationships of multiple types and associated relationship indicators 718.

Individual content and topic objects 710 within a selected content sub-network 700$a$ may be related to individual content and topic objects 710 in another content sub-network 700$b$. Further, multiple sets of relationships of multiple types and associated relationship indicators 718 may be defined between two objects 710.

For example, a first set of relationships 716 and associated relationship indicators 718 may be used for a first purpose or be available to a first set of users while a second set of relationships 716 and associated relationship indicators 718 may be used for a second purpose or available to a second set of users. For example, in FIG. 3, topic object 710$t$1 is bi-directionally related to topic object 710$t$2, not once, but twice, as indicated by the two double arrows. An indefinite number of relationships 716 and associated relationship indicators 718 may therefore exist between any two objects 710 in the fuzzy content network 700. The multiple relationships 716 may correspond to distinct relationship types. For example, a relationship type might be the degree an object 710 supports the thesis of a second object 710, while another relationship type might be the degree an object 710 disconfirms the thesis of a second object 710. The content network 700 may thus be customized for various purposes and accessible to different user groups in distinct ways simultaneously.

The relationships among objects 710 in the content network 700, as well as the relationships between content networks 700$a$ and 700$b$, may be modeled after fuzzy set theory. Each object 710, for example, may be considered a fuzzy set with respect to all other objects 710, which are also considered fuzzy sets. The relationships among objects 710 are the degrees to which each object 710 belongs to the fuzzy set represented by any other object 710. Although not essential, every object 710 in the content network 700 may conceivably have a relationship with every other object 710.

The topic objects 710t may encompass, and may be labels for, very broad fuzzy sets of the content network 700. The topic objects 710t thus may be labels for the fuzzy set, and the fuzzy set may include relationships to other topic objects 710t as well as related content objects 710c. Content objects 710c, in contrast, typically refer to a narrower domain of information in the content network 700.

Figure 5A:
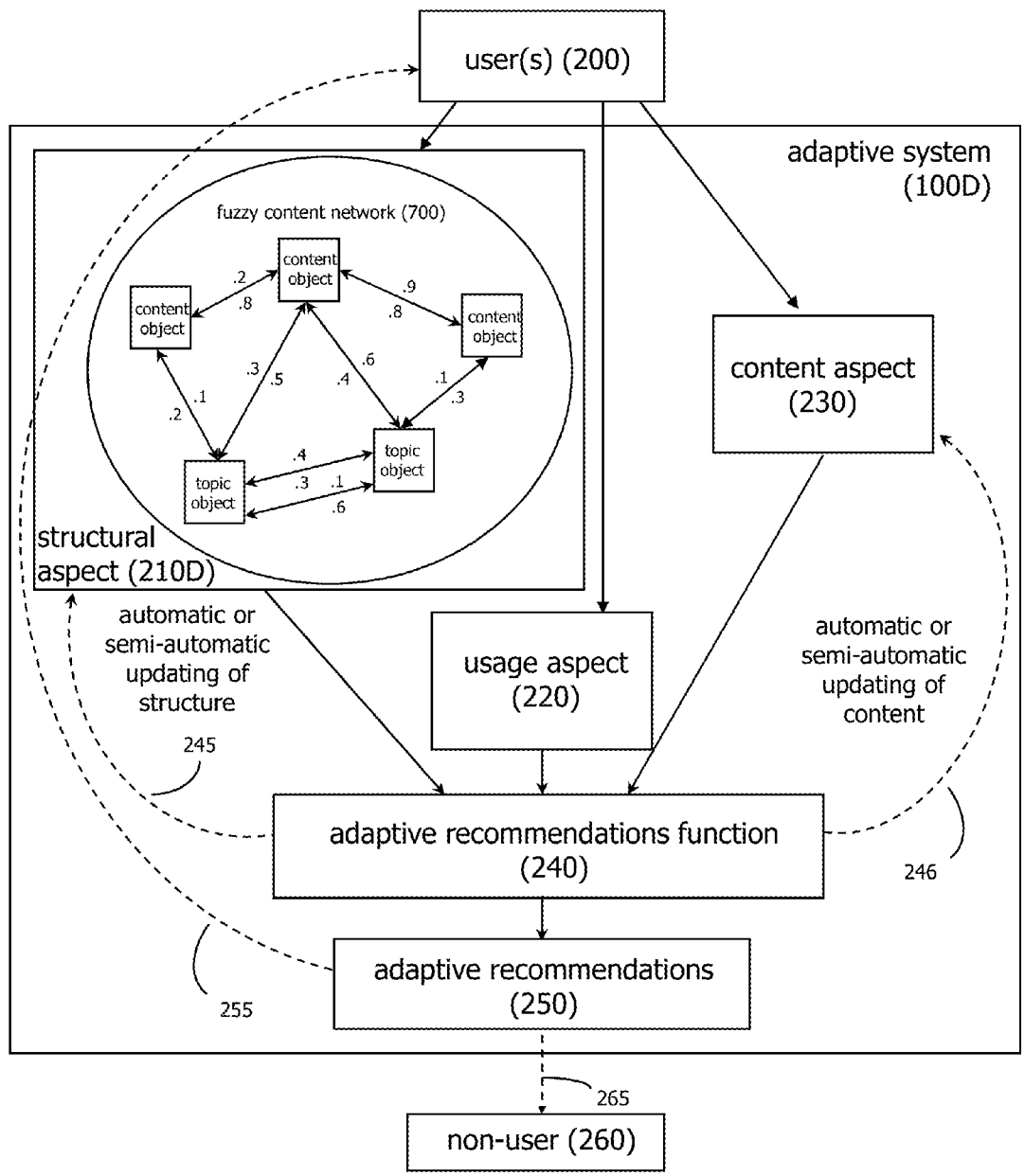
FIG. 5A is a block diagram of a fuzzy content network-based adaptive system, according to some embodiments.

The adaptive system 100 of FIG. 1 may operate in association with a fuzzy content network environment, such as the one depicted in FIG. 3. In FIG. 5A, an adaptive system 100D includes a structural aspect 210D that is a fuzzy content network. Thus, adaptive recommendations 250 generated by the adaptive system 100D are also structural subsets that may themselves comprise fuzzy content networks.

In some embodiments a computer-implemented fuzzy network or fuzzy content network 700 may be represented in the form of vectors or matrices in a computer-implemented system, and where the vectors or matrices may be further represented by data structures such as relational databases. For example, the relationship indicators 718 or affinities among topics may be represented as topic-to-topic affinity vectors ("TTAV"). The relationship indicators 718 or affinities among content objects may be represented as content-to-content affinity vectors ("CCAV"). The relationship indicators 718 or affinities among content object and topic objects may be represented as content-to-topic affinity vectors ("CTAV"), which is also sometimes referred to an object-to-topic affinity vector ("OTAV") herein.

Further, affinity vectors between a user 200 and objects of a fuzzy network or fuzzy content network 700 may be generated. For example, a member (i.e., user)-to-topic affinity vector ("MTAV") may be generated in accordance with some embodiments (and an exemplary process for generating an MTAV is provided elsewhere herein). In some embodiments an affinity vector ("MMAV") between a specific user and other users 200 may be generated derivatively from MTAVs and/or other affinity vectors (and an exemplary process for generating an MMAV is provided elsewhere herein). In some embodiments a member-topic expertise vector (MTEV) is generated, which is defined as a vector of inferred member or user 200 expertise level values, wherein each value corresponds to an expertise level corresponding to a topic.

One or more of object 212 relationship mappings 214 represented by TTAVs, CCAVs, CTAVs (or OTAVs), MTAVs or MTEVs may be the result of the behavioral indexing of a structural aspect 210 (that is not necessarily fuzzy network-based) in conjunction with a usage aspect 220 and an adaptive recommendations function 240.

In some embodiments, indexes generated from information 232 within objects 212 may be applied to populate an MTAV and/or MTEV, and/or to modify an existing MTAV and/or MTEV. Computer-implemented algorithms may be applied to index objects 212 such that for each object 212 a vector or vectors comprising one or more constituent elements, such as words, phrases, or concepts, is generated, along with a numerical weight or value corresponding to each constituent element, wherein each of the corresponding weights is indicative of the inferred importance or relevance of each of the associated constituent elements with respect to the associated indexed object 212. By way of a non-limiting example, such a vector or vectors may be generated by a search engine function during the process of indexing the contents 232 of an object 212. This vector of constituent elements and associated weights or values, hereinafter called an "object contents vector," or "OCV," may be generated using pattern detection and/or statistical techniques such as Bayesian analytic approaches and/or or other statistical pattern matching and/or statistical learning techniques, as are known by those skilled in the art. For example, word or phrase frequencies within an object 212 comprising a document will typically influence the OCV, as may the position of words or phrases within an object 212. These object contents-indexing techniques may further apply more general linguistic data such as word and phrase frequencies for a given language, synonym tables, and/or other lexicon-based information in generating OCVs.

In some embodiments, a system may track a user's 200 behaviors 920, including, but not limited to, the behaviors described by Table 1, and map them to the OCVs of a collection of objects 212. Constituent elements of the OCVs of objects that are inferred from the tracked behaviors 920 to be of particular interest to one or more users 200 or to have some other inferred quality of interest are then identified. These inferences may be based on the relative number of occurrences of constituent elements among objects that are inferred to be interest to a user, as well as in accordance with the weights or values associated with these constituent elements and their associated OCVs. For example, everything else being equal, constituent elements (or synonyms) of OCVs that occur frequently among the objects that are inferred to be of high interest to a user and that have relatively high relevance weightings in the OCVs are favored for identification.

These one or more identified constituent elements may then be transformed via, for example, application of appropriate lexicon-based information and techniques into, or directly serve without transformation as, topics 710t with associated weights in the user's MTAV and/or MTEV, wherein the associated weights are calculated in accordance with the inferred degree of affinity 214 between the user 200 and the objects 212 from which the associated OCVs are sourced. This process can be iteratively executed to continue to expand or refine the MTAV as additional or alternative sets of behaviors 920 are applied OCVs of the same, additional, or different sets of object 212, enabling continuously improved capabilities for personalization.

In some embodiments a multi-dimensional mathematical construct or space may be generated based on one or more of the affinity vectors. By way of a non-limiting example, topics may represent each dimension of a multi-dimensional space. Calculations of distances between objects and/or users in the multi-dimensional space, and clusters among objects and/or users, may be determined by applying mathematical algorithms to the multi-dimensional space and its elements. These calculations may be used by the adaptive system 100 in generating recommendations and/or in clustering elements of the space.

In some embodiments one or more topics 710t and/or relationship indicators 718 may be generated automatically by evaluating candidate clusters of content objects 710c based on behavioral information 920 and/or the matching of information within the content objects 710c, wherein the matching is performed, for example, through probabilistic, statistical, and/or neural network techniques.

Transforming Non-Fuzzy Network Structures to Fuzzy Network Structures

In some embodiments, systems that include organizing structures or taxonomies other than non-fuzzy networks may be beneficially transformed or converted to a fuzzy network to enable a greater capacity for adaptation, while retaining contextual correspondences to the originating systems. Such a transformation is called a "structural transformation" herein, and wherein the structural transformation is based on the processing of usage behavioral information, the structural transformation represents a form of behavioral indexing. The resulting fuzzy taxonomy and adaptive contextualization may be applied to enhance user navigational experiences. The transformation may be performed in initializing the fuzzy network only, or the transformation may be performed on a periodic or continuing basis. In some embodiments the fuzzy network may exist in parallel with the originating structure or structures. In other embodiments the fuzzy network may replace the originating non-fuzzy network structure. In some embodiments the fuzzy network structure to which the non-fuzzy structure is transformed comprises a fuzzy content network 700. Examples of originating non-fuzzy network system structures include flat files, hierarchical structures, relational structures, virtual views, tagging structures, and network structures in which the relationships between objects or items are not by degree. Structures employed by social networking, collaborative systems, and micro-blogging systems may be transformed to a fuzzy network, including originating structures that comprise a stream of activities, as well as structures in which people have symmetric relationships (e.g., "friends," colleagues, or acquaintances) or asymmetric relationships (e.g., "followers" or "fans").

In some embodiments, the transformation process described herein may also or alternatively be applied to transform a first fuzzy network to a second fuzzy network, whereby the second fuzzy network includes additional or alternative relationships among objects. This may be the case, for example, as when additional behavioral information is used to generate relationships in the second fuzzy network that have not been applied, or have been applied differently, in the first fuzzy network.

The process of transforming a non-fuzzy network structure to a fuzzy structure may include mappings between elements of the non-fuzzy network structure and the fuzzy network structure, as well as rules for establishing and adjusting elements of the fuzzy network structure. The elements of the fuzzy network structure that is transformed include objects and relationships among the objects. The mappings and rules are collectively called a "transformational protocol" herein. The computer-implemented function or functions that are invoked to perform the transformational protocol may apply user behavioral information 920 that includes, but is not limited to, one or more behaviors corresponding to the usage behavioral categories listed in Table 1 herein.

Figure 5B:
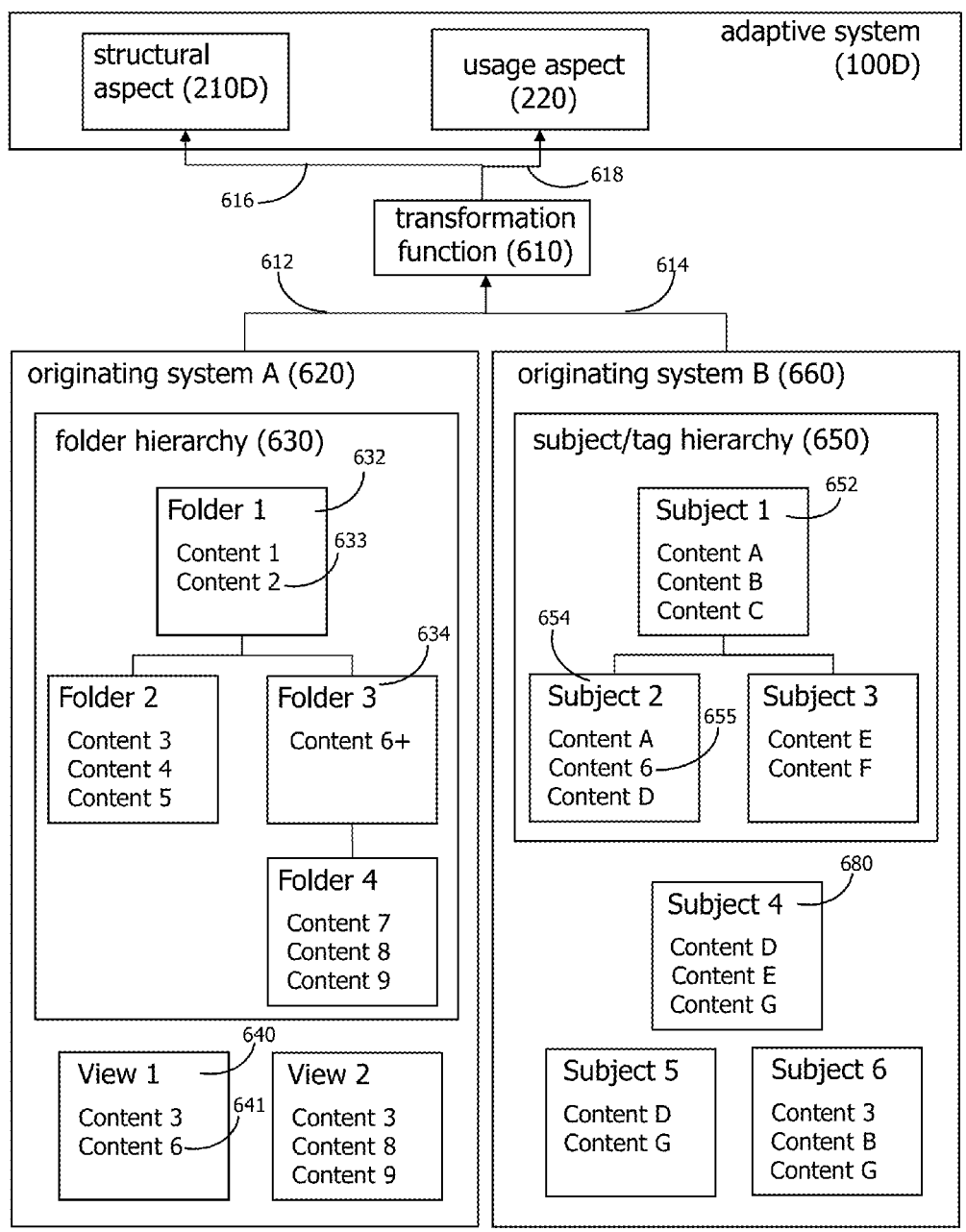
FIG. 5B is a block diagram of the transformation of originating system structures to a fuzzy network-based adaptive system, according to some embodiments.

An exemplary structural transformation and associated transformational protocol is illustrated by FIG. 5B, which depicts a first originating system 620 and a second originating system 660 being transformed by means of a transformation function 610 into an adaptive system 100D. It should be understood that while FIG. 5B depicts two originating systems being transformed, a single originating system or more than two originating systems may be transformed.

Originating system A 620 comprises a folder structure hierarchy 630 and one or more views 640. These types of organizing structures may be similar to information organizing structures that are available, for example, in a Microsoft® SharePoint® system. Such organizing structures may include virtual views and/or hierarchical structures, comprising views and/or folders, which may be aligned with super-structures such as libraries and sub-sites, with each view or folder potentially containing one or more files of content 633. Views 640 are contrasted with folders 630 in that views allow a specific file 641 to be shared or commonly included across multiple views, whereas a specific file 633 can typically be allocated only to a single folder 632.

As illustrated in originating system B 660, another type of non-fuzzy organizing structure that may be transformed in some embodiments is a subject tagging structure in which files of content 655, or most generally, objects 212, are tagged with one or more words or phrases corresponding to subjects 652 or topics. These subjects 652 may be selected by a user from an existing list of subject tags, or they may be entered directly by a user. In some embodiments the subject tags may correspond to a pre-defined structure, such as a hierarchy 650, in which a first subject tag 652 may represent a parent subject and a second subject 654 may represent a child of the parent subject. In other cases, the subject tags 680 may not have an explicit hierarchical structure. In some originating systems every content item or object 655 may be required to have at least one subject tag; in other originating systems some objects may be associated with one or more tags, but others may not. It should be understood that the distribution and combinations of originating structures across one or more originating systems may be different than those depicted in FIG. 5B.

In some embodiments, a transformation protocol is applied by the transformation function 610 to transform structures of one or more originating systems comprising views 640, folders 632, or subject tags 652,680, as well as combinations thereof. Each of these types of structures can contribute beneficially complementary information in generating a fuzzy network structure. Although the transformation function 610 is depicted outside the adaptive system 100D in FIG. 5B, in some embodiments the transformation function resides inside the adaptive system 100D. The transformation function 610 accesses 612,614 structural, content, and, in some cases, behavioral information (not explicitly shown in the originating systems of FIG. 5B), from the one or more or originating systems 620,660. The transformation function uses this information from the originating systems to generate a fuzzy network structural aspect 210D, and may provide 618 usage behavior information from the originating systems to the usage aspect 220.

In accordance with some embodiments, non-limiting example cases of structural transformations are now described. The first conversion case to be described is the process for transforming two or more views 640 to a fuzzy content network 700. In the first step, the originating views 640 are mapped 616 to topics 710t of the fuzzy content network, and originating files are mapped 616 to content objects 710c. This mapping may include transferring meta-data 712 associated with the originating views 640 and files 641 to the corresponding objects 710 in the fuzzy content network 700. The transferred or referenced meta-data may include, but is not limited to, creator and create date information, owner, author and publisher information, and user ratings and feedback. Such behavioral based information may be transferred 618 to the usage aspect 220 of the adaptive system 100D. In the second step, relationship indicators 718 are created among the topics 710t (that are converted from views 640) in the fuzzy content network 700.

In some embodiments, a metric based on the intersection divided by the union of files 641 contained in two views of the originating structure is used to generate an affinity 718 between the two corresponding topics 710t in the fuzzy network. Accordingly, in some embodiments the percentage of common files is calculated as the number of common files divided by the sum of the unique files in the two views. For example if there are 4 files in View Y and 4 files in View X and 2 of the files are in both View X and View Y, then the percentage of common files is ⅔=33%. In some embodiments, the percentage-of-common-files metric may be adjusted based on the comparison of information contained in the common and/or uncommon files in the two views. Behavioral information, including, but not limited to the behaviors of Table 1, may be used by the transformation function 610 to adjust the affinity 718 between the two corresponding topics 710t.

An exemplary establishment of bi-directional relationship indicators 718 between topics corresponding two views, Y and X, is illustrated by the following pseudo code:

---

If View Y and View X have > 10% common files then the relationship indicators 718 between corresponding topics 710t are set at: X-to-Y=0.4 and Y-to-X=0.4; else
If View Y and View X have > 25% common files then the relationship indicators 718 between corresponding topics 710t are set at: X-to-Y=0.6 and Y-to-X=0.6; else
If View Y and View X have > 50% common files then the relationship indicators 718 between corresponding topics 710t are set at: X-to-Y=0.8 and Y-to-X=0.8; else
If View Y and View X have > 75% common files then the relationship indicators 718 between corresponding topics 710t are set at: X-to-Y=1.0 and Y-to-X=1.0

---

It should be understood that in this example, and other examples herein of the setting or adjusting of affinities and relationship indicators 718, that the relationships indicators 718 may be determined by continuous functions rather than as particular discrete settings as illustrated by the "if-then" rules in the examples. Furthermore, if discrete settings or adjustments are used, they may be finer or coarser-grained than the examples described herein.

In some embodiments, the relationship indicators 718 between content objects 700c (corresponding to originating files 641) and topics 710t (corresponding to originating views 640) may be set to a specified affinity (e.g., 0.95) if the originating file 641 is contained within the originating view 640. In some embodiments, this affinity may be adjusted based on a comparison or matching of information in the file compared to information compared to other files contained in the view. Behavioral information, including, but not limited to the behaviors of Table 1, may be used by the affinity generation function to adjust the affinity 718 between the content object 700c and the topic 710t.

In some embodiments content object-to-content object relationship indicators 718 are based on frequencies with which two corresponding files or items of content 641 are both included within views 640 in the originating structure 620. For example, following is a non-limiting example of such a frequency-based method to determine affinities 718 between two content objects 710c.

Let:
V(x)=number of views containing a content item x
V(x,y)=number of views containing a content item x and a content item y
% V(x)=percentage of all views containing a content item x=V(x)/total number of views Then, in some embodiments, the expected percentage, actual percentage, and ratio of actual to expected percentage, of view coincidences of x and y are calculated as follows:

Expected % $V(x,y)$=% $V(x)$*% $V(y)$

Actual % $V(x,y)$=$V(x,y)$/total number of views

Actual/Expected Coincidences Ratio$(x,y)$=Actual % $V(x,y)$/Expected % $V(x,y)$

The Actual/Expected Coincidences Ratio ("AECR") metric ranges from 0 to infinity. An AECR>1 is indicative of the two content items having a greater than random affinity, and the higher the AECR, the greater the inferred affinity. An exemplary setting of reciprocal relationship indicators 718 between content object x and content object y 710c by the transformation function 610 is as follows:

If AECR(x,y)>1 then the relationship indicator is set to 0.2; else
If AECR(x,y)>2 then the relationship indicator is set to 0.4; else
If AECR(x,y)>3 then the relationship indicator is set to 0.6; else
If AECR(x,y)>6 then the relationship indicator is set to 0.8; else
If AECR(x,y)>10 then the relationship indicator is set to 1.0

In some embodiments, variations of the AECR metric may be generated and applied to establish object-to-object relationship indicators. For example, binomial-type probabilities may be computed to determine expected co-occurrences of objects within views under randomization assumptions for comparison against the actual distribution of co-occurrences. Or, penalty functions with regard the proportion of non-co-occurrences versus co-occurrences of a pair of objects within a view may be taken into account, and the AECR adjusted accordingly.

In some embodiments, adjustments may be made to the content object object-to-content object relationship indicators 718 by taking into account additional information about the originating files. For example, if two files have the same creator or owner, it may be suggestive of a stronger than average affinity between the two files, everything being equal. So as a non-limiting example, a rule of the type, "if File Y and File X have the same creator, and the relationship indicator 718 between them is <0.8, then increase the relationship indicator 718 by 0.2," may be applied during the transformation process.

In some embodiments, timing considerations may also influence the assigned relationship indicators 718. The closer the creation dates of two files, the stronger may be their inferred affinity, everything else being equal. So in some embodiments a rule of the type, "if the difference in create date between File Y and File X is greater than a certain amount of time, and the relationship indicator 718 between them is >0.2, then decrease the relationship indicator 718 by 0.2," may be applied during the conversion process.

In some embodiments folder structures 632 may be transformed to a fuzzy content network 700, and meta-data 712 associated with the originating folders 632 and files 633 may be included in the transformation. In some embodiments, the first step is to create relationship indicators 718 among topics 710t in the fuzzy content network 700, such that the topics 710t correspond to folders 632,634 (and/or other superstructures such as sub-sites, if desired). In some embodiments, the basic transformational protocol that is applied is based upon the topology of the structure. For example, an exemplary topology-based assumption is that topics (converted from folders in the originating structure) that are closer to one another within a hierarchy should be assigned stronger relationships in the fuzzy content network 700, everything else being equal. The closest relationship within a hierarchy is typically the parent-child relationship. Reciprocal relationships indicators 718 between topics 710*t* in the transformed structure 210D may not necessarily be symmetric. Following is exemplary pseudo code for parent-child conversions by the transformation function 610 of hierarchical structures 630 according to some embodiments:

```
If Folder Y is one level below Folder X, then relationship indicators 718
between corresponding topics 710t are set at: X-to-Y=0.8 and Y-to-X=1
If Folder Y is two levels below Folder X, then relationship indicators 718
between corresponding topics 710t are set at: X-to-Y=0.6 and Y-to-X=0.8
If Folder Y is three levels below Folder X, then relationship indicators 718
between corresponding topics 710t are set at: X-to-Y=0.4 and Y-to-X=0.6
If Folder Y is four levels below Folder X, then relationship indicators 718
between corresponding topics 710t are set at: X-to-Y=0.2 and Y-to-X=0.4
If Folder Y is five or more levels below Folder X, then relationship
indicators 718 between corresponding topics 710t are set at: X-to-Y=0
and Y-to-X=0 (i.e., do not assign a relationship indicator)
```

Next, in some embodiments, topics 710*t* corresponding to sibling/cousin folders may be assigned relationship indicators 718. Following is exemplary pseudo code in accordance with some embodiments:

```
If Folder Y and Folder X are both one level below Folder Z, then
relationship indicators 718 between corresponding topics 710t are set at:
X-to-Y=0.8 and Y-to-X=0.8
If Folder Y and Folder X are both two levels below Folder Z, then
relationship indicators 718 between corresponding topics 710t are set at:
X-to-Y=0.2 and Y-to-X=0.2
```

Relationship indicators between other object relatives within the hierarchy such as uncles/nephews, second cousins, third cousins, and so on, can be generated in a similar manner. In some embodiments, timing considerations may be applied to adjust the relationship indicators 718 that are determined from the topology of the originating system structure. For example, a rule of the type such as, "If the difference in the create date between Folder Y and Folder X is greater than a certain amount of time, and the relationship indicator 718 is >0.2, then decrease the relationship indicator 718 by 0.2," may be applied.

The next step, in some embodiments, is to assign the content object-to-topic relationship indicators 718, starting with folder hierarchy parent-child transformations as exemplified by the following pseudo code:

```
If File Y is contained in Folder X, then relationship indicators 718
between
the corresponding objects are set at: X-to-Y=1.0 and Y-to-X=1.0
If File Y is one level below Folder X, then relationship indicators 718
between the corresponding objects are set at: X-to-Y=0.8 and Y-to-X=0.8
If File Y is two levels below Folder X, then relationship indicators 718
between the corresponding objects are set at: X-to-Y=0.6 and Y-to-X=0.6
If File Y is three levels below Folder X, then relationship indicators 718
between the corresponding objects are set at: X-to-Y=0.4 and Y-to-X=0.4
If File Y is four or more levels below Folder X, then relationship indicators
718 between the corresponding objects are
set at: X-to-Y=0.2 and Y-to-X=0.2
```

In some embodiments, additional considerations such as timing may be applied to adjust these relationship indicators.

For example, a rule such as, "If the difference in the create date between File Y and Folder X is greater than a certain amount of time, and the relationship indicator 718 between the corresponding objects is >0.2, then decrease the relationship indicator 718 by 0.2," may be applied.

Next, in some embodiments, the content object-to-content object relationship indicators 718 may be established for sibling and cousin folders (and similarly for more distant relatives) as exemplified by the following pseudo code:

```
If File Y and File X are both in Folder Z and have the same creator, then
relationship indicators between corresponding content objects are set at:
X-to-Y=0.8 and Y-to-X=0.8
If File Y and File X are both in Folder Z and have a different creator, then
relationship indicators between corresponding content objects are set at:
X-to-Y=0.6 and Y-to-X=0.6
If File Y and File X are in different folders but in the same sub-site, then
relationship indicators between corresponding content objects are set at:
X-to-Y=0.4 and Y-to-X=0.4
```

In some embodiments, adjustment factors such as timing may be applied to these topological-based relationship indicators 718. An exemplary rule is, "If the difference in the create date between File Y and File X is greater than a certain amount of time, and the relationship indicators 718 between them are >0.2, then decrease the relationship indicators 718 by 0.2."

In originating environments with both view 640 and folder 630 structures, in some embodiments the previous exemplary conversion processes for views-only and folders-only environments may be applied, with some additional adjustments to handle the cases of relationships between views and folders, and for the refinement of other object-to-object relationships.

In some embodiments, for topic-to-topic relationships, the view-to-view relationship logic is extended to handle this mixed case as illustrated by the following exemplary pseudo code:

```
If View Y and View or Folder X have > 10% common files then the
relationship indicators 718 between corresponding topics 710t are set at:
X-to-Y=0.4 and Y-to-X=0.4; else
If View Y and View or Folder X have > 25% common files then the
relationship indicators 718 between corresponding topics 710t are set at:
X-to-Y=0.6 and Y-to-X=0.6; else
If View Y and View or Folder X have > 50% common files then the
relationship indicators 718 between corresponding topics 710t are set at:
X-to-Y=0.8 and Y-to-X=0.8; else
If View Y and View or Folder X have > 75% common files then the
relationship indicators 718 between corresponding topics 710t are set at:
X-to-Y=1.0 and Y-to-X=1.0
```

In some embodiments, in generating content object-to-content object relationship indicators 718, the view-only case is extended to also include the case in which two files are contained in the same folder 632 and also in one or more views 640. Following is exemplary pseudo code for this case:

```
If content objects x and y are in the same folder and AECR(x,y) < 1 then
set relationship indicator 718 to 0.6; else
If content objects x and y are in the same folder and AECR(x,y) > 1 then
set relationship indicator 718 to 0.8; else
If content objects x and y are in the same folder and AECR(x,y) > 3 then
set relationship indicator 718 to 0.95
```

In some embodiments, additional considerations such as the creator of a pair of files or the difference in creation data of the pair of files may be applied to adjust these relationship indicators. For example, a creator-based rule such as, "If File Y and File X have the same creator, and the relationship indicator between them is <0.8, then increase the relationship indicator by 0.2," may be applied. An exemplary timing rule is, "If the difference in the create date between File Y and File X is greater than a certain amount of time, and the relationship indicator between them is >0.2, then decrease the relationship indicator by 0.2."

In some embodiments, content object-to-content object and/or topic-to-topic relationship indicators 718 may be established or adjusted based on temporal clustering analysis. For example, files that are accessed by a specific user, or a group of users, within a prescribed period of time may suggest a greater than average affinity among the files everything else being equal. Common clusters of files among multiple users are even more indicative of a greater than average affinity among the files. The clustering analysis may further beneficially take into account the overall frequency of, for example, accesses of the files. Where infrequently accessed files are found temporally clustered, the affinities among the files may be inferred to be greater than average. The results of the access clustering analysis may provide the basis for the magnitude of relationship indicators 718 among corresponding content objects 710c. It should be understood that while the term "accesses" has been used in describing examples of this clustering analysis, temporal clustering analyses of one or more users may be conducted with regard to any of the, and combinations thereof, behaviors and corresponding behavioral categories of Table 1.

Other methods and factors may be applied to assign or adjust the relationship indicators 718 among topics 710t and content objects 710c that have been converted from systems that have hierarchical 630 and/or view 640 structures. These methods include statistical comparison and/or pattern matching, semantic analysis, and or other mathematical and/or machine learning techniques applied to the information within the files. In addition or alternatively, inferences used to assign or adjust relationship indicators 718 may be made from available meta-data that is associated with originating files, folders, and/or views. Available meta-data may include, but is not limited to, author, owner, publisher information, reviews and commentaries, taxonomies (whether explicitly specified or implicitly deduced by a system), and tags or other descriptive information.

As one example, in some embodiments tags 652,680 generated or selected by a user (a "reference behavior" in accordance with Table 1) associated with content objects 710c may be used to determine affinities among content objects 710c and/or topics 710t. For example, content objects with a higher than average or expected proportion of common tags may be considered to have a higher than average affinity, everything else being equal. This calculation may be adjusted basis the overall frequency of the population of tags, such that the commonality of less frequently used tags is given more weight in calculating affinities than more frequently used tags.

In some environments content tags may correspond to pre-determined subjects or topical areas. These subjects may be organized in a taxonomy, and the structure of the taxonomy may be hierarchical 650, as depicted within originating system B 660 of FIG. 5B.

In accordance with some embodiments, following is an exemplary transformational protocol applied by the transformation function 610 for converting such taxonomies to a fuzzy network structure 210D. In this non-limiting example it is assumed the taxonomy of subjects is hierarchical and each item of content is associated with one or more tags that correspond to one or more subjects.

First, similar to the approach described in transforming views, topic-to-topic affinities can be determined basis a metric derived from the intersection divided by union of content between a pair of subjects. For example, this metric may be basis the proportion of common content between two subjects, which according to some embodiments, is defined as the number of common content items divided by the total number of unique content items included in the two subjects. So, for example, if Subject Y contains content items (C1, C2, C4) and Subject X contains content items (C1, C2, C3, C5), then the percentage of common content=2/5=40%.

In some embodiments, this percentage can then be adjusted by a scaling factor that is proportional to the total number of subjects, since if there are only a few subjects, then having a high percentage of common content between a given subject pair is less revealing about the actual affinities between the pair of subjects than if there is a larger population of subjects.

An exemplary scaling formula that can be applied that takes into account the size of subject population is:

$$\text{Subject Scaling Factor}=1-\exp(\text{constant}*\text{number of subjects}).$$

For example, if the constant equals −0.05, this factor will range from 0 when there are no subjects to 1 as the number of subjects goes to infinity, and will be very close to 1 when there are around 100 subjects.

An exemplary metric that can then be applied to set or adjust affinities between subjects is:

$$\text{Adjusted Common Content \%}=\text{Subject Scaling Factor}*\text{\% common content}.$$

A non-limiting example of relationship indicator settings or adjustments using the Adjusted Common Content % metric is as follows:

---

If Subject Y and Subject X have > 5% Adjusted Common Content % then increase the relationship indicators 718 of the corresponding topics 710t by 0.2, but to no more than 1.0; else
If Subject Y and Subject X have > 10% Adjusted Common Content % then increase the relationship indicators 718 of the corresponding topics 710t by 0.4, but to no more than 1.0; else
If Subject Y and Subject X have > 25% Adjusted Common Content % then increase the relationship indicators 718 of the corresponding topics 710t by 0.6, but to no more than 1.0; else
If Subject Y and Subject X have > 50% Adjusted Common Content % then increase the relationship indicators 718 of the corresponding topics 710t by 0.8, but to no more than 1.0.

---

In some embodiments, to generate content-to-content relationships from these types of originating subject taxonomy structures, the first step is to map the relationships between content and subjects of the originating subject taxonomy as illustrated in the example of Table A.

TABLE A

| Content Item | Associated Subjects |
| --- | --- |
| C1 | S1, S2 |
| C2 | S1, S3 |
| C3 | S1, S2, S5 |
| C4 | S2, S3 |
| C5 | S1, S4 |
| C6 | S1, S2, S3 |

Although a simple percentage of common subjects may be applied to establish or adjust affinities among content items, better results will generally be achieved by generating a metric that has properties that include the following characteristics:
 a. Everything else being equal, the higher the proportion of common subjects between two items of content, the higher the affinity between the items of content
 b. Everything else being equal, the more infrequently used are the common subjects associated with two items of content, the higher the affinity between the two items (so in the example above, subject S1 does not convey as much information about affinities because it is so frequently applied, while subject S5 would convey more information because it is less frequently applied)
 c. Everything else being equal, the more infrequently used are the uncommon subjects between two items of content, the lower the affinity between the items (so in the example above, S5 is less frequently applied to the population of content items than is S3, so the affinity between C1 and C3 should be lower than between C1 and C5)

In some embodiments, a method to generate such a metric includes a first step of determining the frequency and relative frequency of the subjects across all items of content that are addressed by the originating subject taxonomy. Using the example from Table A, the frequency and relative frequency results are determined as illustrated in Table B.

TABLE B

| Subject | Frequency | Relative Frequency (RF) |
|---------|-----------|-------------------------|
| S1      | 5         | 5/14                    |
| S2      | 4         | 4/14                    |
| S3      | 3         | 3/14                    |
| S4      | 1         | 1/14                    |
| S5      | 1         | 1/14                    |
| Total   | 14        | 1                       |

In some embodiments, the next step is generating a metric, RFU/RFC, that is applied to determine the strength of affinity between two content items, where:
 RFU=Product of Relative Frequencies of Uncommon Subjects
 RFC=Product of Relative Frequencies of Common Subjects
  and where RFU=1 if there are no uncommon subjects
  and where RFU/RFC=0 if there are no common subjects The metric RFU/RFC, which can be called the Subject Frequency Ratio (SFR), ranges from 0 to infinity, with higher levels of SFR being indicative of higher affinities between the two content items. A non-limiting example of the setting of affinities between content items using SFR is as follows:

If SFR(Content Y, Content X) > 0.2 then the relationship indicator 718 between the corresponding content objects 710c = 0.2; else
If SFR(Content Y, Content X) > 0.5 then the relationship indicator 718 between the corresponding content objects 710c = 0.4; else
If SFR(Content Y, Content X) > 1.0 then the relationship indicator 718 between the corresponding content objects 710c = 0.6; else
If SFR(Content Y, Content X) > 6.0 then the relationship indicator 718 between the corresponding content objects 710c = 0.8; else
If SFR(Content Y, Content X) > 30.0 then the relationship indicator 718 between the corresponding content objects 710c = 1.0

In some embodiments, functions that generate content-to-topic relationships from these types of originating subject taxonomy structures may employ a variation of the technique that was described to generate the content-to-content affinities from these types of structures. For example, the generation of a metric with the following characteristics may be desirable:
 a. Everything else being equal, an item of content associated with an infrequently used subject has a higher affinity to that subject than it would to a more frequently used subject
 b. Everything else being equal, the fewer the subjects an item of content is associated with, the higher the affinity to any given subject (if there is only one directly associated subject, that is analogous to the folder case, in which an item of content can be within only one folder). And other infrequently used subjects associated with a content item dilute the affinity with a given subject to a greater degree than other more frequently used subjects would.

In some embodiments, a metric, RFO/RFT, having these characteristics, is generated and is used in determining the strength of affinity between a content item (Cx) item and a target subject (St). RFO and RFT are defined as:
 RFT=Relative Frequency of the Target Subject
 RFO=Product of Relative Frequencies of Other Subjects Associated with Cx
  and where RFO=1 if there are no other subjects than the target subject associated with Cx The metric RFO/RFT, which can be called the Content-Subject Frequency Ratio (CSFR), ranges from 0 to infinity, with higher levels being indicative of a higher affinity between a content item and a particular subject. A non-limiting example of using the CSFR to set the affinities between corresponding content objects 710c and topic objects 710t is as follows:

If CSFR(Content X, Topic Y) > 0.1 then the relationship indicator 718 between the corresponding content object and topic object = 0.2; else
If CSFR(Content X, Topic Y) > 0.3 then the relationship indicator 718 between the corresponding content object and topic object = 0.4; else
If CSFR(Content X, Topic Y) > 0.6 then the relationship indicator 718 between the corresponding content object and topic object = 0.6; else
If CSFR(Content X, Topic Y) > 1.0 then the relationship indicator 718 between the corresponding content object and topic object = 0.8; else
If CSFR(Content X, Topic Y) > 5.0 then the relationship indicator 718 between the corresponding content object and topic object = 1.0

Integration of Multiple Originating Systems

In some embodiments, multiple originating systems and/or structures associated with one or more computer-implemented systems may be transformed into an integrated fuzzy network. This approach beneficially creates an underlying integrated contextualization of the multiple systems and originating structures, which can enhance user navigation, including providing for content and expertise discovery. Usage behavior and topological synergies between two originating systems can enable a better contextualization than with one originating system and associated originating structure alone.

In some embodiments a function that integrates recommendations sourced from multiple systems based on the contextualization of an integrated fuzzy network may be invoked by a user or administrator. In some embodiments the user or administrator may be able to select and de-select the originating systems from which recommended content or people are sourced. This selection interface may be available through one of the originating systems, multiple of the originating systems, and/or through a separate interface to the fuzzy network-based contextualization of adaptive system 100D.

In some embodiments, when a user has selected that he wants a recommendation of content sourced from a first originating system 620 while interacting with, or navigating within, a second originating system's 660 interface, the integrated contextualization is preferentially required to understand the appropriate topical neighborhood within the first originating system 620 to serve as a basis for a recommendation and/or a contextual scope for the recommendation. In other words, a simulation of the user navigating the first originating system is performed while the user is actually within the second originating system's environment and navigational context.

To perform this contextual simulation, in accordance with some embodiments, a relation between a user-conducted activity in the second originating system 660, such as contributing an item of content or posting an activity, is made with respect to an object 641 in the first system 620. In some embodiments, subjects 654 in the second system 660 may be associated with content 641 in the first system through the saving or referencing of an object in the first system while the user interacts with the second system 660. For example, an attachment to, or a link or pointer such as an URL or URI within, a post in the second system 660 may be saved to, or reference an object 212, in the first system 620.

In the following non-limiting example of this integration, it is assumed originating system A 620 has a folder-based structure and originating system B 660 has a subject taxonomy structure. It should be understood, however, that different structures may be distributed among two or more originating systems than is assumed in this specific example. Table A1 represents an exemplary mapping of content and subjects in originating system B:

TABLE A1

| Originating System B Content | Corresponding Subjects or Subject Tags Applied in Originating system B |
|---|---|
| C1 | S1, S2 |
| C2 | S1, S3 |
| C3 | S1, S2, S5 |
| C4 | S2, S3 |
| C5 | S1, S4 |
| C6 | S1, S2, S3 |

Then, as a non-limiting example, it is assumed in this example that the one or more items of content 655 originating from system 2 660 is stored in folders 634 of system 1 620. It follows that there may be one or more instances of content items associated with each folder. The folders 634 can then be mapped to subjects 654 as shown in the exemplary mapping of Table C.

TABLE C

| System 1 Folder Instances | Associated System 2 Subjects |
|---|---|
| F1 instance 1 (C1) | S1, S2 |
| F1 instance 2 (C2) | S1, S3 |
| F2 instance 1 (C3) | S1, S2, S5 |
| F3 instance 1 (C4) | S2, S3 |
| F4 instance 1 (C5) | S1, S4 |

The occurrences of subjects can be summed across folder instances for each folder as illustrated in Table D.

TABLE D

| Folder | S1 | S2 | S3 | S4 | S5 |
|---|---|---|---|---|---|
| F1 | 2 | 1 | 1 | 0 | 0 |
| F2 | 1 | 1 | 0 | 0 | 1 |
| F3 | 0 | 1 | 1 | 0 | 0 |
| F4 | 1 | 0 | 0 | 1 | 0 |
| Etc. | | | | | |
| Total | | | | | |

In some embodiments, these types of mappings can be applied by a method to determine a simulated navigation context within system 1 620 while the user is interacting with system 2 660. For example, in the case considered here, an appropriate context in system 1 620 can be determined when one or more subjects are specified in system 2 660.

For example, a metric, the Frequency Weighted Subject Occurrences (FWSO), can be defined as the sum across all of the specified subjects of the number of occurrences of each subject*(1/relative frequency of each subject), for a given folder. For example, from the data of tables B and D, for the specified subjects of S1 and S3, the FWSO of folder F1 is:

$$FWSO(F1;S1,S3)=(2*1/(5/14))+(1*1/(3/14))$$

If there exist no folders in which FWSO>0 for the specified subjects, then there may not be sufficient context to generate in-context recommendation from content items sourced from originating system A. Otherwise, sufficient context is available for in-context recommendations. A similar approach to calculating FWSOs, but with respect to view-based structures rather than folder-based structures, or mixed folder and view-based structures, and be applied in accordance with some embodiments.

Following are some exemplary methods for generating in-context recommendations from system A 620 given specified subjects of system B 660. In some embodiments, in generating a system A expertise (people) recommendation based on a system B content contribution associated with a specified set of subjects, the system A folder taken as the contextual basis is the folder with the maximum FWSO for the specified subjects. If there is a tie, it can be broken, for example, by selecting among the tied folders the one with the user's highest MTAV value.

For knowledge discovery (content recommendations), it is preferred to select or otherwise indicate a specific content item in system A to be the contextual basis for the in-context recommendation sourced from system A. In some embodiments, this can be achieved by selecting the system A content item with the highest Subject Frequency Ratio (SFR) calculated with respect to the specified subjects. In other words, the SFR is calculated basis the subjects of each content item of system A and the specified subjects. If there is a resulting tie, among other possibilities, the content item among the tied candidate content items within a folder with the highest FWSO can be selected. If there is still more than one candidate content item, among other tie-breaking possibilities, the most popular can be selected.

In addition to delivering cross-contextualization of multiple originating systems, the mappings between two originating systems may enable the adjusting of affinities 718 of the fuzzy network resulting from the transformation by the transformation function 610 of a first originating system 620 basis information accessed from a second originating system 660.

In some embodiments the data of Table D is applied to adjust affinities 718 between topics 710*t* that correspond to folders 630 in the originating system 620. For example, metrics of similarity may be applied for each pair of folders against subject data of the type illustrated in Table D. The folder similarity metric may be calculated using a cosine similarity formula, correlation coefficient formula, or any other suitable formula for comparing the similarity of two vectors. The following non-limiting pseudo code example illustrates the use of a correlation coefficient to adjust the topic-to-topic affinities 718 that correspond to originating folders

```
If correlation coefficient (Fx,Fy) > 0.75, then the corresponding topic-to-
topic relationship indicator = max(0.2, existing level); else
If correlation coefficient (Fx,Fy) > 0.80, then the corresponding topic-to-
topic relationship indicator = max(0.4, existing level); else
If correlation coefficient (Fx,Fy) > 0.85, then the corresponding topic-to-
topic relationship indicator = max(0.6, existing level); else
If correlation coefficient (Fx,Fy) > 0.90, then the corresponding topic-to-
topic relationship indicator = max(0.8, existing level); else
If correlation coefficient (Fx,Fy) > 0.95, then the corresponding topic-to-
topic relationship indicator = max(1.0, existing level)
```

In some embodiments, the SFR can be calculated for content items originating from originating system A 620 basis subjects or subject tags applied in originating system B 660, which can then be used to adjust the affinities 718 of between content items accordingly. In some embodiments, the SFR adjustments over-ride previous content object-to-content object affinities per the following exemplary pseudo code:

```
If SFR(Content Y, Content X) > 0.2 then the content-to-content
  relationship indicator = 0.2; else
If SFR(Content Y, Content X) > 0.5 then the content-to-content
  relationship indicator = 0.4; else
If SFR(Content Y, Content X) > 1.0 then the content-to-content
  relationship indicator = 0.6; else
If SFR(Content Y, Content X) > 6.0 then the content-to-content
  relationship indicator = 0.8; else
If SFR(Content Y, Content X) > 30.0 then the content-to-content
  relationship indicator = 1.0
```

In some embodiments, content-to-topic affinities in a fuzzy network generated from structures within a first system 620 are adjusted basis information originating in a second system 660. As one non-limiting example, a vector of CSFRs is generated by calculating for the target content item a CFSR with respect to each of the content item's associated subjects (and the CFSR value is set to zero for all other subjects that are not associate with the content item). Then a similarity metric is generated between this vector of CSFRs of the target content and the vector of subject occurrences (Table D) for the target folder. The similarity metric may be calculated, for example, by using a cosine similarity formula, correlation coefficient formula, or any other suitable formula for comparing the similarity of two vectors. Exemplary pseudo code for adjusting the affinities between a target content item (Cx) and a folder (Fy) is as follows:

```
If correlation coefficient (Cx,Fy) > 0.75, then content-topic relationship
indicator = max(0.2, existing level); else
If correlation coefficient (Cx,Fy) > 0.80, then content-topic relationship
indicator = max(0.4, existing level); else
If correlation coefficient (Cx,Fy) > 0.85, then content-topic relationship
indicator = max(0.6, existing level); else
If correlation coefficient (Cx,Fy) > 0.90, then content-topic relationship
indicator = max(0.8, existing level); else
If correlation coefficient (Cx,Fy) > 0.95, then content-topic relationship
indicator = max(1.0, existing level)
```

For integrated contextualizations of multiple originating structures, candidate recommendations may be generated from multiple source system structures. In some embodiments, a candidate recommendation score harmonization function enables direct comparisons of the scores associated with candidate recommended items from multiple source systems. The top scored candidate items are then selected for delivery to the recommendation recipient regardless of the system source of the candidate items.

In some embodiments the originating systems or structures to be transformed may not have structural constructs that enable a one-to-one correspondence with topics 710*t* in the transformed structure. In such cases, one or more topics 710*t* and/or relationship indicators 718 may be generated automatically by evaluating candidate clusters of content objects 710*c* based on behavioral information 920 and/or statistical pattern matching of information within the content objects 710*c*. In some cases, this clustering may be based on automatic inferences informed by hashtags or other organizing indicia embedded within the content objects 710*c*.

In some embodiments various system functions and interfaces (e.g., SharePoint web parts) may be applied that provide selective functionalities of adaptive system 100, 100D. These functionalities in conjunction with the structural aspect 210,210D may be collectively called a "learning layer" in some embodiments. The computer-implemented functions, knowledge discovery and expertise discovery, refer to specific learning layer functions that generate content recommendations and people recommendations, respectively. In some embodiments the fuzzy content network 700 may be hidden from the user 200; in other embodiments it may be transparent to the users 200. Other functions may be included in the learning layer such as enabling visualizations of affinities among topics, content, and users, functions to directly interact with the fuzzy content network 700, administrative functions to facilitate installation and tuning of other learning layer functions, and functions that serve to capture additional behavioral information that would not be otherwise captured in accordance with, but not limited to, the behaviors and behavioral categories of Table 1.

In some embodiments learning layer functions can be accessed by other systems through an application programming interface (API) comprising standardized programming protocols. The API may include protocols for both receiving information from the learning layer and/or for delivering information to the learning layer.

Figure 5C:
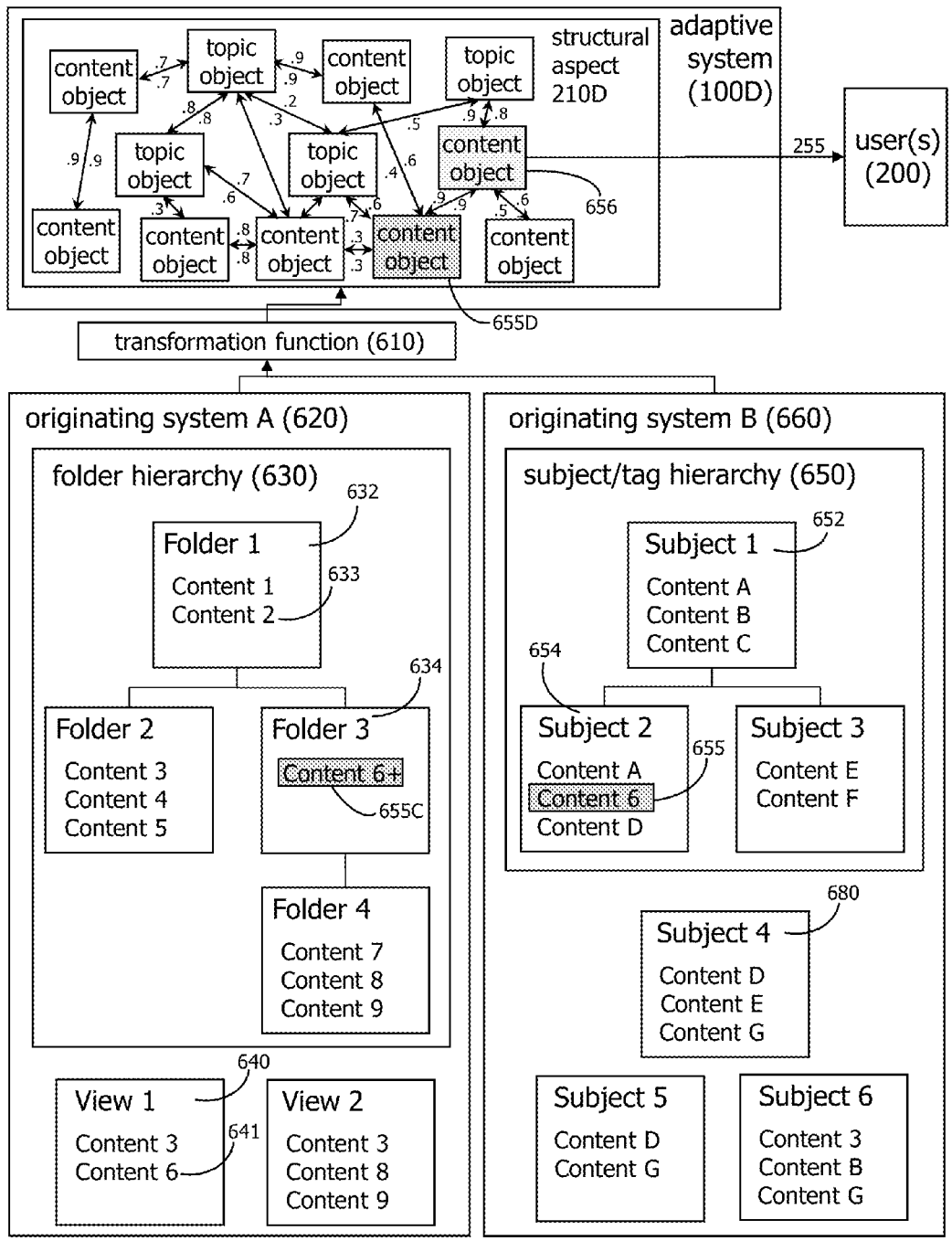
FIG. 5C is a block diagram of a contextualized recommendation sourced from originating systems, according to some embodiments.

FIG. 5C further illustrates the contextual transformation of originating systems into a fuzzy network-based learning layer, and the contextualization of recommendations that are delivered to a user as the user navigates an originating system, in accordance with some embodiments. For example, assuming a user 200 is currently navigating at, or accessing, an object 655 of a first originating system 660, a contextually equivalent object 655D is identified in the transformed structural aspect 210D of the adaptive learning layer 100D, which serves as the contextual basis within the learning layer 100D for a recommendation 255 that is generated and delivered to a user 200, wherein the recommendation comprises an object 656 in the learning layer 100D that is related to, or is within the contextual neighborhood of, the learning layer's 100D contextually equivalent object 655D of the navigated object 655.

In some embodiments the object 655 at which the user 200 is currently navigating may be related to another object 655C in the second originating system basis an explicit relationship or correspondence established by a user 200. For example, the second object 655C may be an attachment object to the first object 655, and the attachment object 655C may not necessarily be stored in the originating system 660 being navigated. In some embodiments the contextual correspondence between the two objects 655,655C may be established through automated means such as through the comparison of the contents of objects, for example, through generation and comparison of OCVs, rather than, or in addition to, explicit user establishment of the correspondence.

The contextually equivalent object 655D in the learning layer 100D to the navigated object 655 in the first originating system 660 may correspond indirectly to the navigated object 655 by way of the related object 655C in the second originating system, in accordance with some embodiments.

In some embodiments an administrator or user 200 may select one or more originating systems to be the source of objects recommended 255 by the learning layer 100D. So, for example, if the user chose to have recommendations of objects sourced only from the second system 620 while navigating the first system 660, then the contextually corresponding object 655C would be used as the contextual basis 655D in the learning layer 100D, and recommended objects 656 would be limited to only those originating in the second system.

In such selectable recommendation sourcing embodiments, the candidate recommendation score harmonization function may be applied to enable direct comparisons of the scores associated with candidate recommended items from the multiple source systems selected by the user or an administrator. The top scored candidate objects are then selected for delivery 255 to the recommendation recipient 200 regardless of the system source of the candidate objects, given that the system sources have been selected by the user or administrator.

In some embodiments, standardized tags may be applied to the topics within, or sourced from, one or more originating systems 620,660 so as to create a standardized member-topic affinity vector (MTAV) for a specific user 200, and that can be standardized across multiple users 200, based on the tags. The adaptive system 100,100D generates a standardized MTAV derivatively from each originating MTAV from the tags that are mapped to topics of the originating MTAV. In some embodiments not every originating topic has a standardized tag applied—in this case, the function that generates the standardized MTAV may ignore the originating topic without a standardized tag. Since in some cases the number of different topics may exceed the number of applicable standardized tags, some topics may have the same standardized tag. In these cases, the standardized MTAV generation function will create a composite standardized MTAV value based on the multiple affinity values of the originating MTAVs. The standardized MTAV will be of a dimension equal to the number of standardized tags.

To summarize an exemplary process, the folders 632, views 640, and/or subjects 652 of one or more originating systems 620,660 have standardized tags applied. The folders 632, views 640, and/or subjects 652 of the one or more originating systems 620,660 are transformed to topics 710$t$ and behavioral information from the one or more originating systems 620,660 are used to generate originating system-specific MTAVs. The standardized tags associated with the folders 632, views 640, and/or subjects 652 of the one or more originating systems 620,660 are then used to create a standardized, composite MTAV that is a vector of affinity values corresponding to each of the standardized tags.

The standardized MTAV can be beneficially used to harmonize the encoding of interests, preferences, and most generally learning, from the one or more originating systems 620,660 and/or one or more adaptive systems 100,100D. By establishing a direct correspondence between originating MTAVs, this approach of generating a standardized MTAV has the benefit of enabling portability of a user's interests from one system to another, enabling the integration of the user's interests from multiple originating systems, and enabling consistent comparisons of interest profiles across users. These standardized, portable MTAVs can then be used to generate member-to-member affinity vectors (MMAVs) that are indicative of interest similarities among users across different originating systems—even if the users are not all users of exactly the same originating systems.

Similar to the process described for MTAVs, in some embodiments, standardized tags can be applied in the generation of member-topic expertise vectors (MTEVs). Rather than interest portability across different originating systems, expertise portability across different originating systems is enabled by standardized MTEVs.

In some embodiments, the standardized tags are applied by humans, in other embodiments the tags may be generated and/or applied by automated means—for example, through the evaluation of the contents of the associated topics and related content.

Figure 5D:
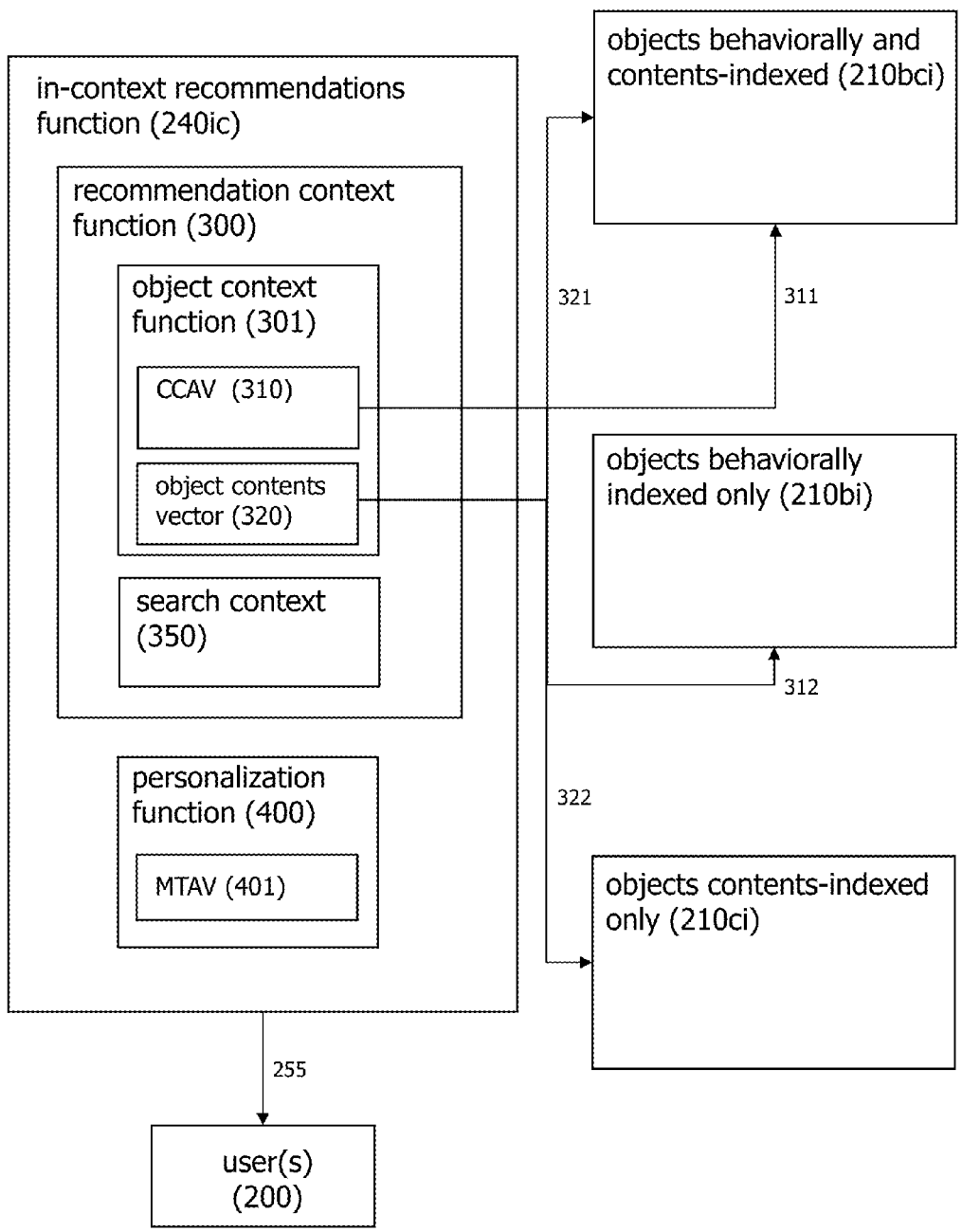
FIG. 5D is a block diagram of in-context recommendations sourced from behaviorally indexed and/or contents-indexed objects given an object context, according to some embodiments.

FIG. 5D illustrates the generation of in-context recommendations by an in-context recommendations function 240$ic$, which is a component of adaptive recommendations function 240, in which the recommended objects 255 are sourced from a collection of objects 212 residing in one or more structural aspects 210$bci$, 210$bi$, 210$ci$, in accordance with some embodiments. In-context recommendations are a type of recommendations that are generated basis a user's 200 context with regard to a base object 212. For example, the context may be a document that is being accessed or viewed by the user, or a song that the user is listening to among a collection of songs. In addition to the object 212 that is providing the context being a computer-implemented object such as a document, it should be noted that the object 212 may alternatively represent the physical user himself within his physical environment in one embodiment, and the associated context of this object 212 representing the physical user 200 may be physical aspects of the user's physical presence such as the user's location, the surrounding external environment of the user, including physical objects, and/or aspects of the user's internal environment or physiology.

A recommendation context function 300 comprises an object context function 301 that may include a representation of context by, for example, a CCAV 310 that is generated by a behavioral indexing process and/or the object 212 context may be derived from an object contents vector (OCV) 320 that may be generated by, for example, a search indexing process. Alternatively, if the object context is the physical user 200 herself, her context may be represented by an MTAV or other type of vector that describes affinity levels between the user and other objects, including other physical objects, including other people.

If the object context function 301 has access to a CCAV 310 (or alternatively a CTAV) associated with a base object, then the CCAV or CTAV can be applied to determine 311,312 an appropriate contextual neighborhood for the in-context recommendations function 240*ic* with regard to objects 212 that have been behaviorally indexed 210*bci*, 210*bi* based on an evaluation of the associated degrees of affinity.

If the object context function 301 has access to an OCV 320 associated with a base object, then this base OCV can be applied to select candidate objects 321,322 for recommendation from objects 212 that have been had their contents indexed 210*bci*, 210*ci*. In this case the base OCV 320 is compared to OCVs of target objects that have been contents-indexed 210*bci*, 210*ci*. Evaluating the comparisons between the base OCV and the targeted OCVs preferentially takes into account the number of occurrences of common constituent elements (or synonyms) between the base OCV and each of the targeted OCVs, as well as the associated the weights or values associated with the common constituent elements of the base OCV and each of the targeted OCVs. Affinities determined by the object context function 300 and the contents-indexed objects 210*bci*,210*ci* are generated basis these OCV-based comparisons, and these affinities collectively serve as a contextual neighborhood for the in-context recommendations function 240*ic*.

In cases in which the object context function 301 includes both a CCAV 310 (or CTAV) and OCV 320, and both behaviorally indexed and contents-indexed source objects 210*bci*,210*bi*,210*ci* are available, an affinity harmonization process may be performed to generate an appropriate contextual neighborhood. This may result in objects in the contextual neighborhood that are solely derived from the CCA or CTA, solely derived from the OCV comparisons, or from both; and the associated affinities between the base object and other objects in the contextual neighborhood may be derived from either the CCA or the OCV comparisons, or may have an affinity value influenced by both the CCA and OCV comparisons.

In some embodiments, the in-context recommendation function 240*ic* then applies a personalization step through application of a personalization function 400 with respect to the objects 212 in the resulting contextual neighborhood. This personalization may be performed by comparing the user's 200 MTAV and/or MTEV to the CTAV of the objects in the contextual neighborhood. In some embodiments, associated CTAVs are only available for objects associated with behaviorally indexed sources 210*bci*,210*bi*. In some embodiments, CTAVs are also available for objects 212 sourced from system sources that have not been behaviorally indexed but have been contents-indexed 210*ci*. In this case, the CTAVS may be derived from OCVs by automatically determining topics through a statistical analysis of the OCVs. As a simple, non-limiting example, if a cluster of OCVs with common words or phrases with relatively high weights is identified, then the words or phrases (or synonyms thereof) may be identified as one or more topics. The relative affinities of the objects to the one or more topics based on the each object's OCV can then be calculated. The result is an OCV-derived CTAV that can be compared to the user's 200 MTAV and/or MTEV (facilitated by appropriate glossary or lexicon-based mappings as required) so as to beneficially apply a personalization filter to the candidate objects in the contextual neighborhood.

Figure 5E:
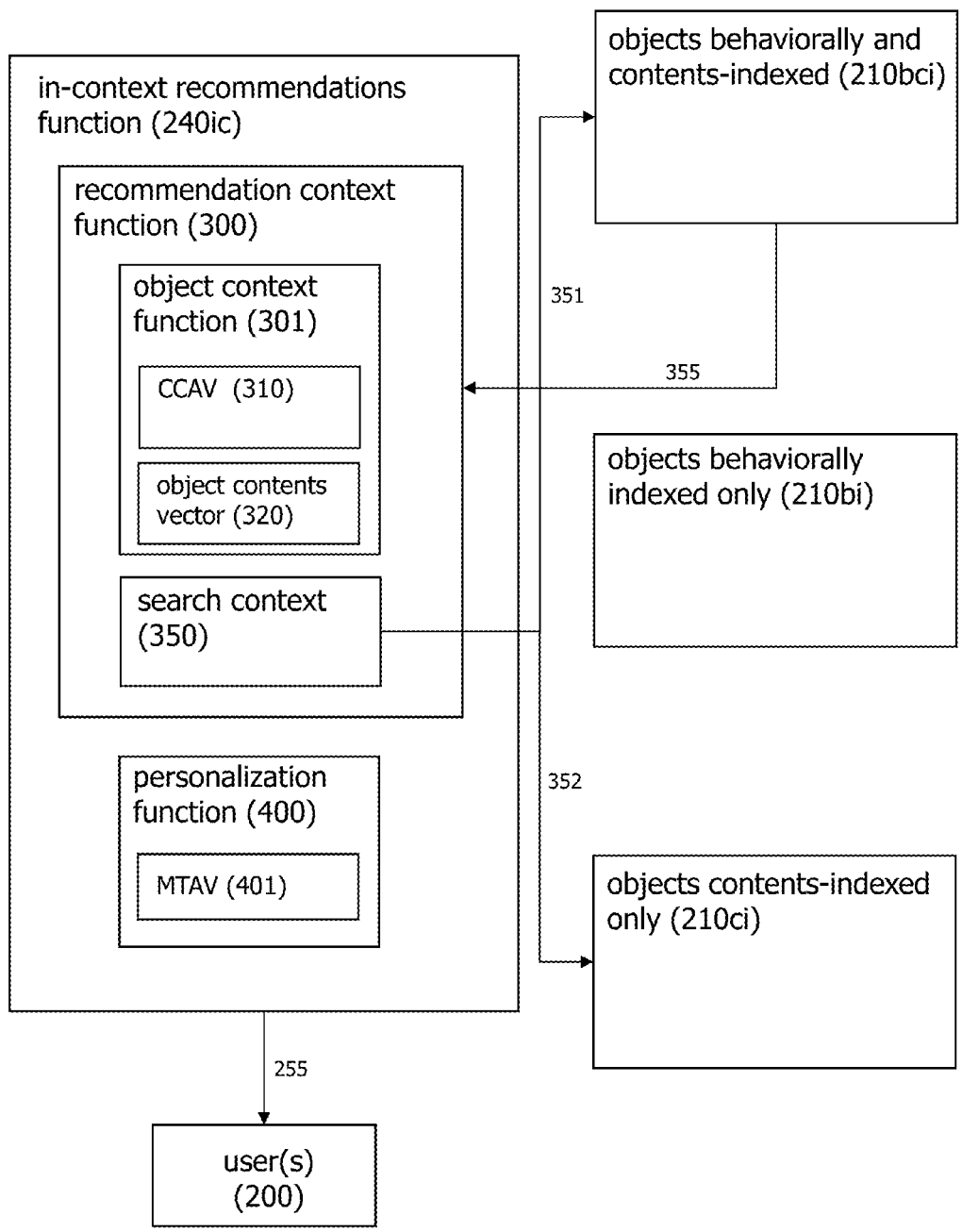
FIG. 5E is a block diagram of in-context recommendations sourced from behaviorally indexed and/or contents-indexed objects given a search context, according to some embodiments.

In addition to, or instead of, the personalization step, various object quality filtering methods may be performed by the in-context recommendations function 240*ic* on the objects in the contextual neighborhood. These quality evaluations are described in more detail elsewhere herein, and may be based on object attributes such as recency of publication, or behavioral information such as user's ratings, for example FIG. 5E illustrates the generation of in-context recommendations in which the recommendation context function 300 establishes a recommendation context by means of a user 200 performing a search request, in accordance with some embodiments. The search request can be processed and applied 351,352 against objects 212 that have been contents-indexed 210*bci*,210*ci*. For objects sourced from collections of objects that have also been behaviorally indexed 210*bci*, one or more of the objects that the search function identifies based on an evaluation of the OCVs of the selected objects may in turn be used as a basis for selecting additional or alternative objects 355 from the object collection 210*bci* basis the results of behavioral indexing. For example, the CTAV associated with an object selected based on its OCV by the search function can then be used to generate a contextual neighborhood to supplement the search-based results. This can be beneficial to the user performing the search request as the search function might otherwise miss bringing such relevant objects to the user's attention. These supplemental objects 355 selected basis the behavioral indexing may be integrated within the search results delivered to the user, or alternatively, they may be accessed or requested by the user after receiving the standard search results. In some embodiments, the user 200 is able to select one of the search results objects, and invoke a function that returns one or more additional objects 355 that are based, at least in part, on the object's CTAV or other behaviorally-based set of affinities. In some embodiments, a comparison of the OCV of the object selected by the user and the OCVs of additional objects identified by the CTAV 355 processing may be applied to also influence the selection and/or arrangement of the objects that are actually delivered in response to the user's request.

Figure 5F:
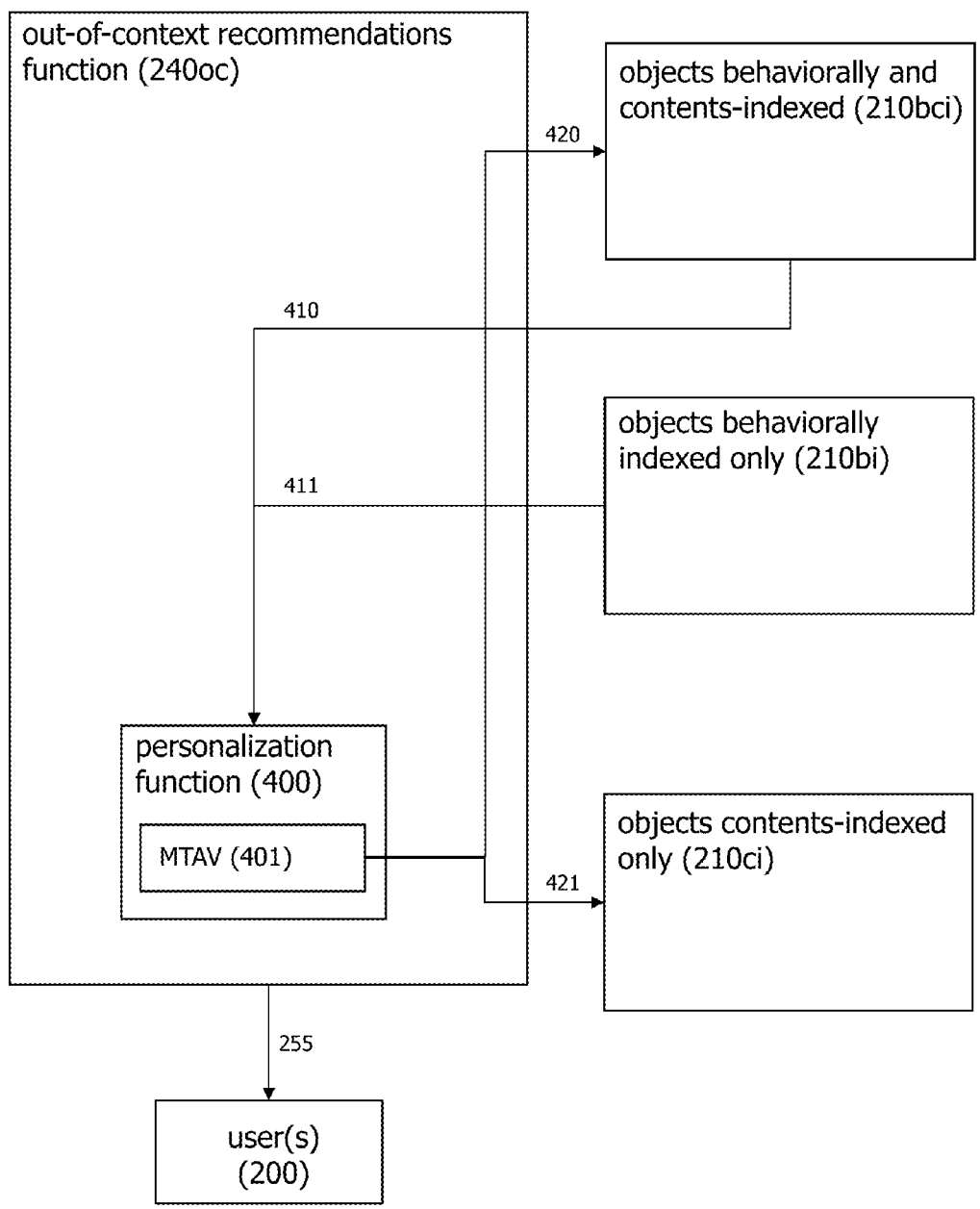
FIG. 5F is a block diagram of out-of-context recommendations sourced from behaviorally indexed and/or contents-indexed objects, according to some embodiments.

FIG. 5F illustrates the generation of out-of-context recommendations by an out-of-context recommendations function 240*oc*, which is a component of adaptive recommendations function 240, in which the recommended objects 255 are sourced from a collection of objects 212 residing in one or more structural aspects 210*bci*,210*bi*,210*ci*, in accordance with some embodiments. Out-of-context recommendations are a type of recommendations that are generated in which there does not exist an object context on which to base recommendations 255. Even in such an out-of-context situation, useful recommendations can still be generated by applying personalization criteria, assuming the identity of the recommendation recipient 200 is known, and/or by applying object quality filtering criteria.

Candidate objects for out-of-context recommendations may be sourced from behaviorally indexed objects 210*bci*, 210*bi*. In this case the user's 200 MTAV 401 can be used to compare against the CTAV of the behaviorally indexed objects using mathematical techniques known to those skilled in the art that determine the mathematical "distance" between vectors, and a subset of behaviorally indexed objects that have CTAVs with the shortest distance from the MTAV 401 (or basis the user's MTEV) are identified. This personalized subset 410,411 of the behaviorally indexed objects may then be filtered through object-specific quality filtering to yield one or more objects 255 that are recommended to the user 200.

Candidate objects for out-of-context recommendations may also, or alternatively, be sourced from contents-indexed objects 210*bci*, 210*ci*. In this case the user's 200 MTAV 401 (or MTEV) can be converted to an OCV format, and this synthetic, MTAV-derived base OCV can be used to compare 420,421 against the OCVs of the context-indexed objects in a manner as has been previously described herein. A subset of the contents-indexed objects which have OCVs that are closest in terms of mathematically defined distance to the MTAV-derived OCV is selected. This personalized subset of the contents-indexed objects may then, if it has not already been performed, be filtered through object-specific quality filtering to yield one or more objects 255 that are recommended to the user 200.

In cases in which candidate objects for out-of-context recommendations are sourced from both behaviorally indexed and contents-indexed objects, the resulting recommendations 255 delivered to the user 200 may include objects from one or both types of sources.

Figure 5G:
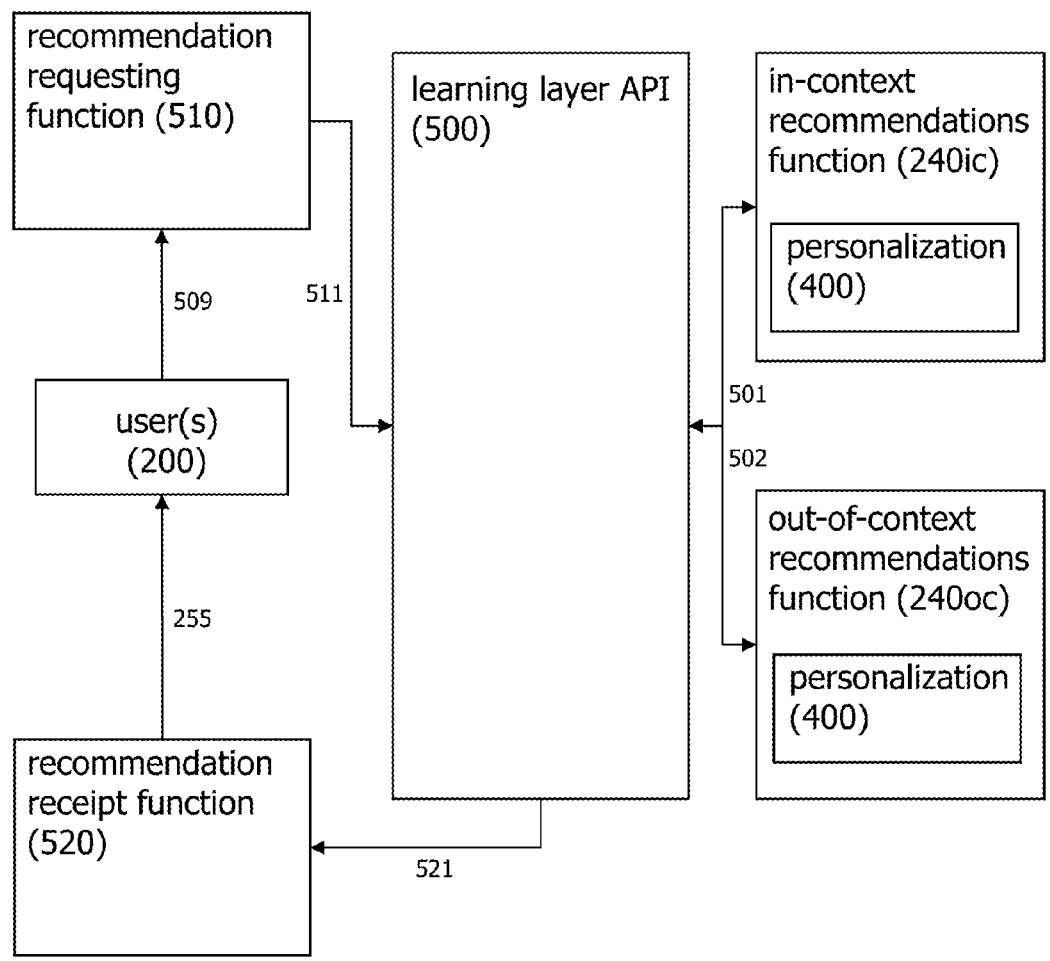
FIG. 5G is a block diagram of a learning layer application programming interface, according to some embodiments.

FIG. 5G illustrates an in-context recommendations function 240*ic* and an out-of-context recommendations function 240*oc* being accessed through a learning layer application programming interface ("API") 500, in accordance with some embodiments. The learning layer API receives a program call for a request for a recommendation by a recommendation requesting function 510 (which may be invoked 509 by a user 200) through application of a specified API syntax. Within the API syntax, an object context, a specified user 200, or both, are provided by the recommendation requesting function 510. The learning layer API 500 relays the program call syntax to the appropriate recommendations function. If an object context is provided, then an in-context recommendations function 240*ic* is invoked 511. If no object context is provided, then out-of-context recommendations function 240*oc* is invoked 521. If an identifiable user 200 is provided then the relevant recommendations function 240*ic*, 240*oc* executes personalization function 400. Object quality filtering may also be applied by the relevant recommendations function 240*ic*, 240*oc*.

The relevant recommendations function 240*ic*, 240*oc* then returns one or more recommendations 250 to the recommendation receipt function 520 via the learning layer API 500. The recommendations receipt function may then deliver the recommendations 255 to the user 200.

For any of the cases described by FIGS. 5D-5G, controls may be provided for a recommendation recipient 200 or administrator to specify whether recommended objects are sourced from only behaviorally indexed source objects, only contents-indexed source objects, or both.

User Behavior and Usage Framework

Figure 6:
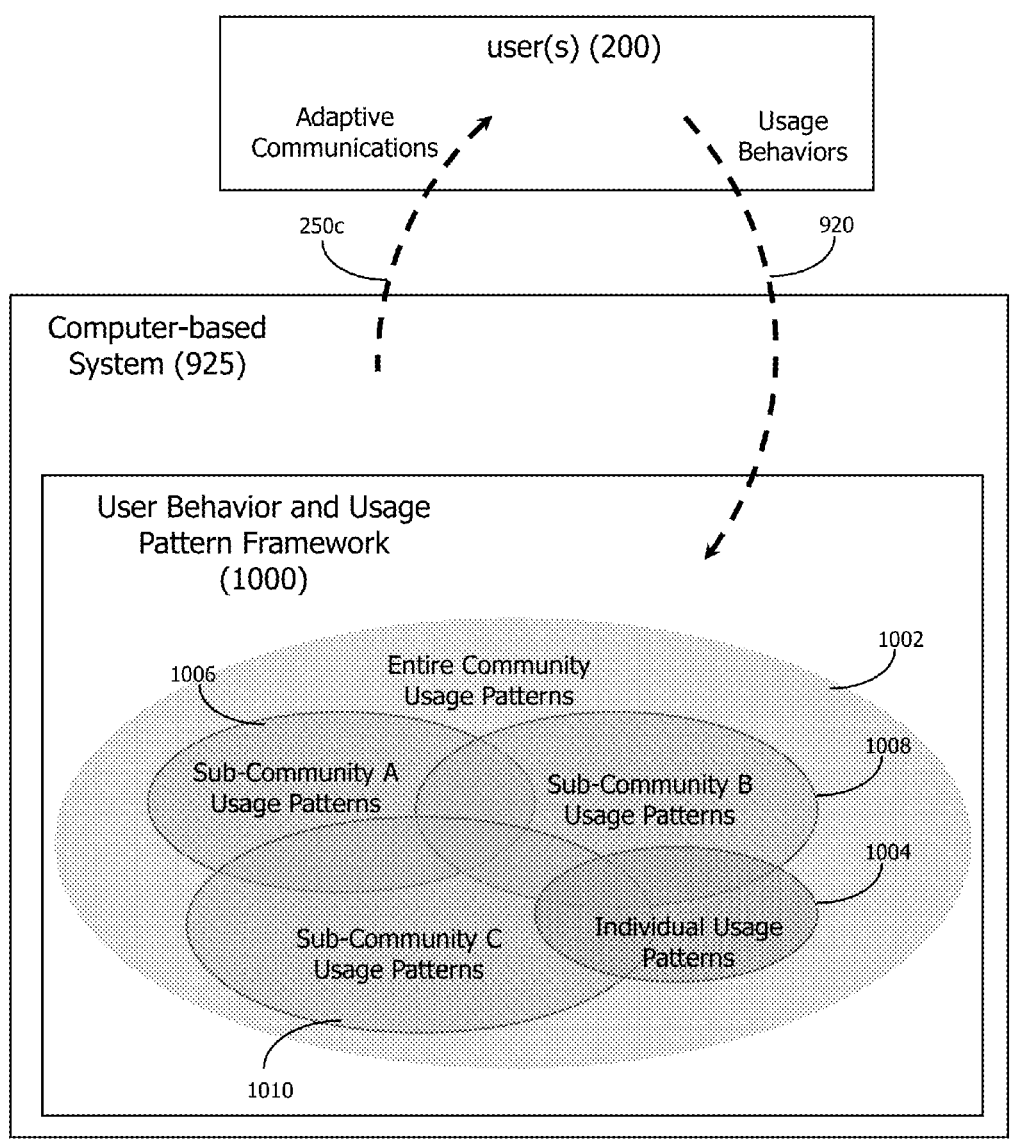
FIG. 6 is a block diagram of a computer-based system that enables adaptive communications, according to some embodiments.

FIG. 6 depicts a usage framework 1000 for performing preference and/or intention inferencing of tracked or monitored usage behaviors 920 by one or more computer-based systems 925. The one or more computer-based systems 925 may comprise an adaptive system 100. The usage framework 1000 summarizes the manner in which usage patterns are managed within the one or more computer-based systems 925. Usage behavioral patterns associated with an entire community, affinity group, or segment of users 1002 are captured by the one or more computer-based systems 925. In another case, usage patterns specific to an individual are captured by the one or more computer-based systems 925. Various sub-communities of usage associated with users may also be defined, as for example "sub-community A" usage patterns 1006, "sub-community B" usage patterns 1008, and "sub-community C" usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single user or multiple users. Sub-communities may likewise include one or more users. Thus, the individual usage patterns 1004 in FIG. 6 may also be described as representing the usage patterns of a community or a sub-community. For the one or more computer-based systems 925, usage behavior patterns may be segmented among communities and individuals so as to effectively enable adaptive communications 250*c* delivery for each sub-community or individual.

The communities identified by the one or more computer-based systems 925 may be determined through self-selection, through explicit designation by other users or external administrators (e.g., designation of certain users as "experts"), or through automatic determination by the one or more computer-based systems 925. The communities themselves may have relationships between each other, of multiple types and values. In addition, a community may be composed not of human users, or solely of human users, but instead may include one or more other computer-based systems, which may have reason to interact with the one or more computer-based systems 925. Or, such computer-based systems may provide an input into the one or more computer-based systems 925, such as by being the output from a search engine. The interacting computer-based system may be another instance of the one or more computer-based systems 925.

The usage behaviors 920 included in Table 1 may be categorized by the one or more computer-based systems 925 according to the usage framework 1000 of FIG. 6. For example, categories of usage behavior may be captured and categorized according to the entire community usage patterns 1002, sub-community usage patterns 1006, and individual usage patterns 1004. The corresponding usage behavior information may be used to infer preferences and/or intentions and interests at each of the user levels.

Multiple usage behavior categories shown in Table 1 may be used by the one or more computer-based systems 925 to make reliable inferences of the preferences and/or intentions and/or intentions of a user with regard to elements, objects, or items of content associated with the one or more computer-based systems 925. There are likely to be different preference inferencing results for different users.

As shown in FIG. 6, the one or more computer-based systems 925 delivers adaptive communications to the user 200. These adaptive communications 250*c* may include adaptive recommendations 250 and/or associated explanations for the recommendations, or may be other types of communications to the user 200, including advertising. In some embodiments the adaptive communications 250*c* comprise one or more phrases, where phrases comprise one or more words. The adaptive communications 250*c* may be delivered to the user 200 in a written form, an audio form, or a combination of these forms.

By introducing different or additional behavioral characteristics, such as the duration of access of, or monitored or inferred attention toward, an object, a more adaptive communication 250*c* is enabled. For example, duration of access or attention will generally be much less correlated with navigational proximity than access sequences will be, and therefore provide a better indicator of true user preferences and/or intentions and/or intentions. Therefore, combining access sequences and access duration will generally provide better inferences and associated system structural updates than using either usage behavior alone. Effectively utilizing additional usage behaviors as described above will generally enable increasingly effective system structural updating. In addition, the one or more computer-based systems 925 may employ user affinity groups to enable even more effective system structural updating than are available merely by applying either individual (personal) usage behaviors or entire community usage behaviors.

Furthermore, relying on only one or a limited set of usage behavioral cues and signals may more easily enable potential "spoofing" or "gaming" of the one or more computer-based systems 925. "Spoofing" or "gaming" the one or more computer-based systems 925 refers to conducting consciously insincere or otherwise intentional usage behaviors 920 so as to influence the costs of advertisements 910 of the one or more computer-based systems 925. Utilizing broader sets of system usage behavioral cues and signals may lessen the effects of spoofing or gaming. One or more algorithms may be employed by the one or more computer-based systems 925 to detect such contrived usage behaviors, and when detected, such behaviors may be compensated for by the preference and interest inferencing algorithms of the one or more computer-based systems 925.

In some embodiments, the one or more computer-based systems 925 may provide users 200 with a means to limit the tracking, storing, or application of their usage behaviors 920. A variety of limitation variables may be selected by the user 200. For example, a user 200 may be able to limit usage behavior tracking, storing, or application by usage behavior category described in Table 1. Alternatively, or in addition, the selected limitation may be specified to apply only to particular user communities or individual users 200. For example, a user 200 may restrict the application of the full set of her usage behaviors 920 to preference or interest inferences by one or more computer-based systems 925 for application to only herself, and make a subset of process behaviors 920 available for application to users only within her workgroup, but allow none of her process usage behaviors to be applied by the one or more computer-based systems 925 in making inferences of preferences and/or intentions and/or intentions or interests for other users.

User Communities

As described above, a user associated with one or more systems 925 may be a member of one or more communities of interest, or affinity groups, with a potentially varying degree of affinity associated with the respective communities. These affinities may change over time as interests of the user 200 and communities evolve over time. The affinities or relationships among users and communities may be categorized into specific types. An identified user 200 may be considered a member of a special sub-community containing only one member, the member being the identified user. A user can therefore be thought of as just a specific case of the more general notion of user or user segments, communities, or affinity groups.

Figure 7:
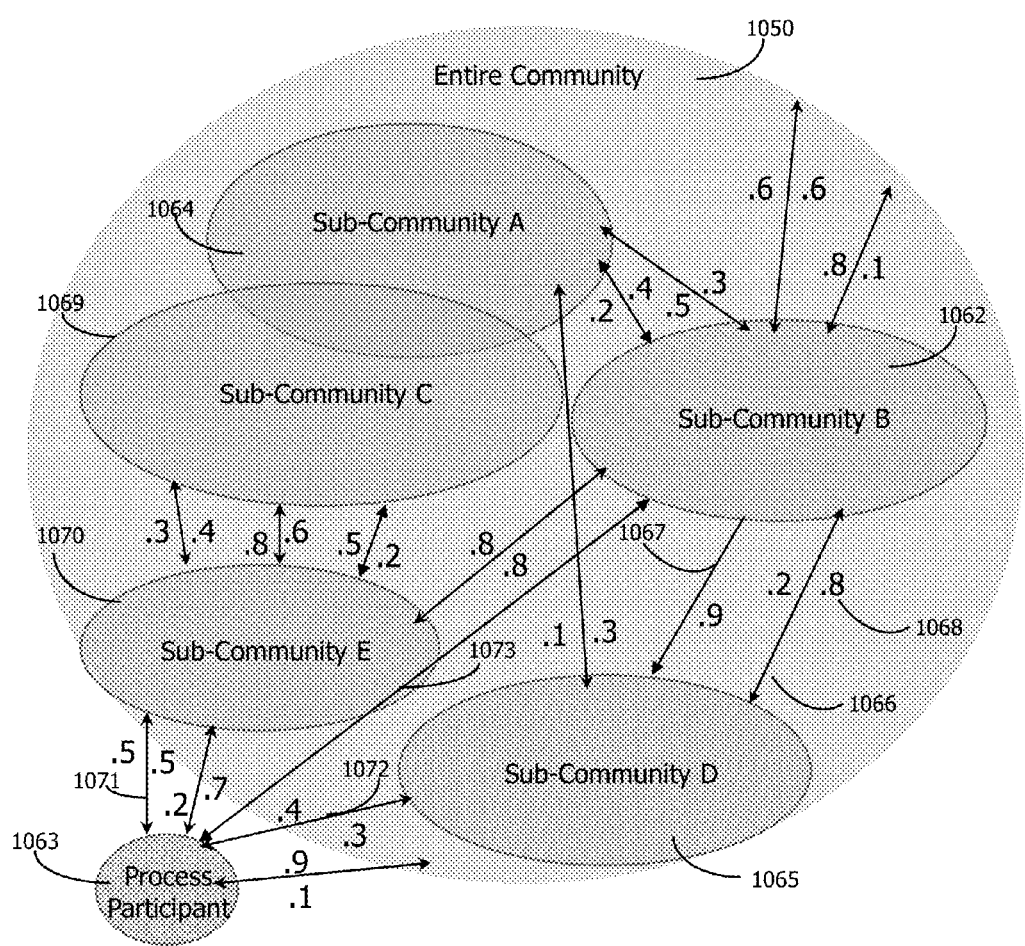
FIG. 7 is a diagram illustrating user communities and associated relationships, according to some embodiments.

FIG. 7 illustrates the affinities among user communities and how these affinities may automatically or semi-automatically be updated by the one or more computer-based systems 925 based on user preferences and/or intentions which are derived from user behaviors 920. An entire community 1050 is depicted in FIG. 7. The community may extend across organizational, functional, or process boundaries. The entire community 1050 includes sub-community A 1064, sub-community B 1062, sub-community C 1069, sub-community D 1065, and sub-community E 1070. A user 1063 who is not part of the entire community 1050 is also featured in FIG. 7.

Sub-community B 1062 is a community that has many relationships or affinities to other communities. These relationships may be of different types and differing degrees of relevance or affinity. For example, a first relationship 1066 between sub-community B 1062 and sub-community D 1065 may be of one type, and a second relationship 1067 may be of a second type. (In FIG. 7, the first relationship 1066 is depicted using a double-pointing arrow, while the second relationship 1067 is depicted using a unidirectional arrow.)

The relationships 1066 and 1067 may be directionally distinct, and may have an indicator of relationship or affinity associated with each distinct direction of affinity or relationship. For example, the first relationship 1066 has a numerical value 1068, or relationship value, of "0.8." The relationship value 1068 thus describes the first relationship 1066 between sub-community B 1062 and sub-community D 1065 as having a value of 0.8.

The relationship value may be scaled as in FIG. 7 (e.g., between 0 and 1), or may be scaled according to another interval. The relationship values may also be bounded or unbounded, or they may be symbolically represented (e.g., high, medium, low).

The user 1063, which could be considered a user community including a single member, may also have a number of relationships to other communities, where these relationships are of different types, directions and relevance. From the perspective of the user 1063, these relationship types may take many different forms. Some relationships may be automatically formed by the one or more computer-based systems 925, for example, based on explicit or inferred interests, geographic location, or similar traffic/usage patterns. Thus, for example the entire community 1050 may include users in a particular city. Some relationships may be context-relative. For example, a community to which the user 1063 has a relationship could be associated with a certain process, and another community could be related to another process. Thus, sub-community E 1070 may be the users associated with a product development business to which the user 1063 has a relationship 1071; sub-community B 1062 may be the members of a cross-business innovation process to which the user 1063 has a relationship 1073; sub-community D 1065 may be experts in a specific domain of product development to which the user 1063 has a relationship 1072. The generation of new communities which include the user 1063 may be based on the inferred interests of the user 1063 or other users within the entire community 1050.

Membership of communities may overlap, as indicated by sub-communities A 1064 and C 1069. The overlap may result when one community is wholly a subset of another community, such as between the entire community 1050 and sub-community B 1062. More generally, a community overlap will occur whenever two or more communities contain at least one user or user in common. Such community subsets may be formed automatically by the one or more systems 925, based on preference, interest, or expertise inferencing from user behaviors 920. For example, a subset of a community may be formed based on an inference of increased interest or demand of particular content or expertise of an associated community. The one or more computer-based systems 925 are also capable of inferring that a new community is appropriate. The one or more computer-based systems 925 will thus create the new community automatically.

For each user, whether residing within, say, sub-community A 1064, or residing outside the community 1050, such as the user 1063, the relationships (such as arrows 1066 or 1067), affinities, or "relationship values" (such as numerical indicator 1068), and directions (of arrows) are unique. Accordingly, some relationships (and specific types of relationships) between communities may be unique to each user. Other relationships, affinities, values, and directions may have more general aspects or references that are shared among many users, or among all users of the one or more computer-based systems 925. A distinct and unique mapping of relationships between users, such as is illustrated in FIG. 7, could thus be produced for each user by the one or more computer-based systems 925.

The one or more computer-based systems 925 may automatically generate communities, or affinity groups, based on user behaviors 920 and associated preference inferences. In addition, communities may be identified by users, such as administrators of the process or sub-process instance 930. Thus, the one or more computer-based systems 925 utilizes automatically generated and manually generated communities.

The communities, affinity groups, or user segments aid the one or more computer-based systems 925 in matching interests optimally, developing learning groups, prototyping process designs before adaptation, and many other uses. For example, some users that use or interact with the one or more computer-based systems 925 may receive a preview of a new adaptation of a process for testing and fine-tuning, prior to other users receiving this change.

Users 200 or communities may be explicitly represented as elements or objects 212 within the one or more computer-based systems 925. An object 212 representing a user 200 may include self-profiling information that is explicitly provided by the user 200. This user descriptive information may include, but are not limited to, for example, a photo or avatar, relationships to other people, subjects of interest, and affiliations.

Preference and/or Intention Inferences

Figure 8:
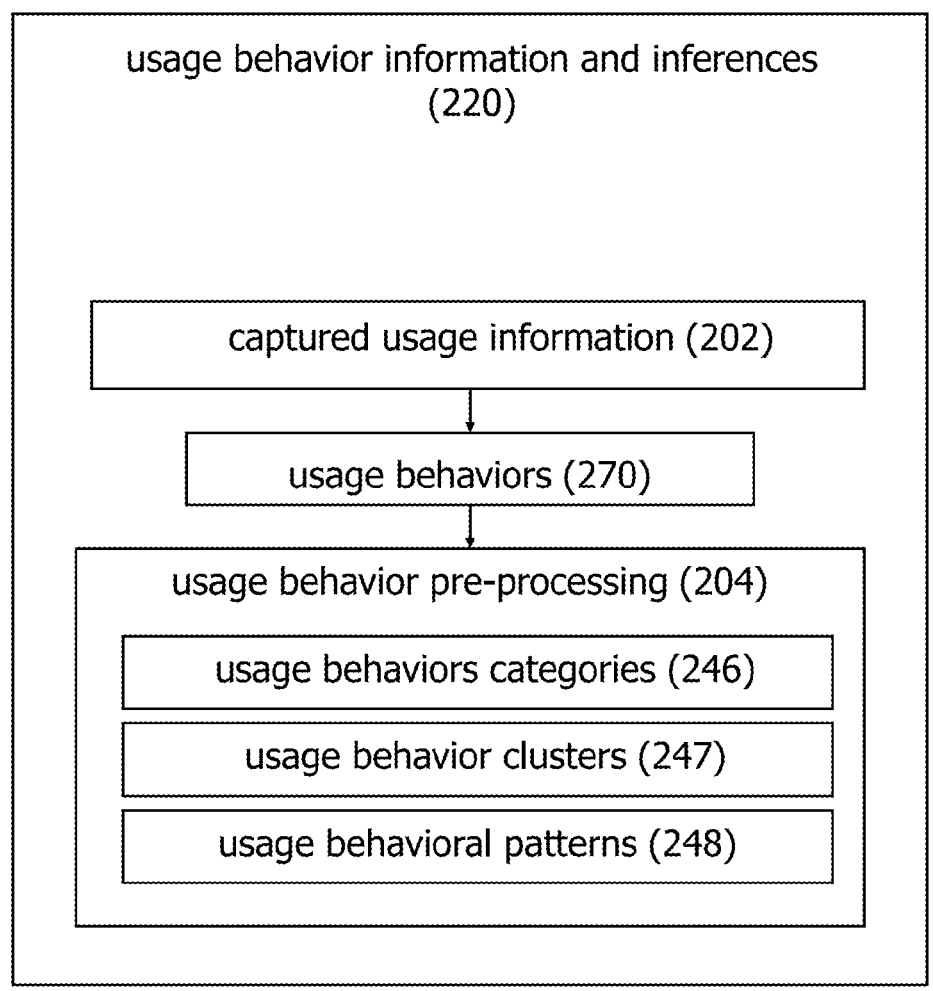
FIG. 8 is a block diagram of usage behavior processing functions of the computer-based system of FIG. 6, according to some embodiments.

The usage behavior information and inferences function 220 of the one or more computer-based systems 925 is depicted in the block diagram of FIG. 8. In embodiments where computer-based systems 925 is an adaptive system 100, then usage behavior information and inferences function 220 is equivalent to the usage aspect 220 of FIG. 1. The usage behavior information and inferences function 220 denotes captured usage information 202, further identified as usage behaviors 270, and usage behavior pre-processing 204. The usage behavior information and inferences function 220 thus reflects the tracking, storing, classification, categorization, and clustering of the use and associated usage behaviors 920 of the one or more users or users 200 interacting with the one or more computer-based systems 925.

The captured usage information 202, known also as system usage or system use 202, includes any interaction by the one or more users or users 200 with the system, or monitored behavior by the one or more users 200. The one or more computer-based systems 925 may track and store user key strokes and mouse clicks or other device controller information, for example, as well as the time period in which these interactions occurred (e.g., timestamps), as captured usage information 202. From this captured usage information 202, the one or more computer-based systems 925 identifies usage behaviors 270 of the one or more users 200 (e.g., web page access or physical location changes of the user). Finally, the usage behavior information and inferences function 220 includes usage-behavior pre-processing, in which usage behavior categories 246, usage behavior clusters 247, and usage behavioral patterns 248 are formulated for subsequent processing of the usage behaviors 270 by the one or more computer-based systems 925. Some usage behaviors 270 identified by the one or more computer-based systems 925, as well as usage behavior categories 246 designated by the one or more computer-based systems 925, are listed in Table 1, and are described in more detail below.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200, potentially including environmental aspects of the physical location(s). The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering.

User Behavior Categories

In Table 1, a variety of different user behaviors 920 are identified that may be assessed by the one or more computer-based systems 925 and categorized. The usage behaviors 920 may be associated with the entire community of users, one or more sub-communities, or with individual users of the one of more computer-based applications 925.

TABLE 1

Usage behavior categories and usage behaviors

| usage behavior category | usage behavior examples |
|---|---|
| navigation and access | activity, content and computer application accesses, including buying/selling<br>paths of accesses or click streams<br>execution of searches and/or search history |
| subscription and self-profiling | personal or community subscriptions to, or following of, topical areas<br>interest and preference self-profiling<br>following other users<br>filters<br>affiliation self-profiling (e.g., job function) |
| collaborative | referral to others<br>discussion forum activity<br>direct communications (voice call, messaging)<br>content contributions or structural alterations<br>linking to another user |
| reference | personal or community storage and tagging<br>personal or community organizing of stored or tagged information |
| direct feedback | user ratings of activities, content, computer applications and automatic recommendations<br>user comments |
| physiological responses | direction of gaze<br>brain patterns<br>blood pressure<br>heart rate<br>voice modulation<br>facial expression<br>kinetic expression of limbs such as tension, posture or movement<br>expression of other users in the group |
| environmental conditions and location | current location<br>location over time<br>relative location to users/object references<br>current time<br>current weather condition |

A first category of process usage behaviors 920 is known as system navigation and access behaviors. System navigation and access behaviors include usage behaviors 920 such as accesses to, and interactions with computer-based applications and content such as documents, Web pages, images, videos, TV channels, audio, radio channels, multi-media, interactive content, interactive computer applications and games, e-commerce applications, or any other type of information item or system "object." These process usage behaviors may be conducted through use of a keyboard, a mouse, oral commands, or using any other input device. Usage behaviors 920 in the system navigation and access behaviors category may include, but are not limited to, the viewing, scrolling through, or reading of displayed information, typing written information, interacting with online objects orally, or combinations of these forms of interactions with computer-based applications. This category includes the explicit searching for information, using, for example, a search engine. The search term may be in the form of a word or phrase to be matched against documents, pictures, webpages, or any other form of on-line content. Alternatively, the search term may be posed as a question by the user.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the one or more computer-based systems 925, or may be associated with any other subset of the one or more computer-based systems 925. "Following" is another term that may be used for a subscription behavior—i.e., following a topic is synonymous with subscribing to a topic. Subscriptions or following behaviors may also be with regard to other users—the subscriber or follower receives activity streams of the subscribed to or followed user. A user's following behavior is distinguished from a linking behavior with regard to another user in that a following relationship is asymmetric, while a linking (e.g., "friending") relationship is typically symmetric (and hence linking is considered in the collaborative behavior category herein). Subscriptions may thus indicate the intensity of interest with regard to elements of the one or more computer-based systems 925. The delivery of information to fulfill subscriptions may occur online, such as through activity streams, electronic mail (email), on-line newsletters, XML or RSS feeds, etc., or through physical delivery of media.

Self-profiling refers to other direct, persistent (unless explicitly changed by the user) indications explicitly designated by the one or more users regarding their preferences and/or intentions and interests, or other meaningful attributes. A user 200 may explicitly identify interests or affiliations, such as job function, profession, or organization, and preferences and/or intentions, such as representative skill level (e.g., novice, business user, advanced). Self-profiling enables the one or more computer-based systems 925 to infer explicit preferences and/or intentions of the user. For example, a self-profile may contain information on skill levels or relative proficiency in a subject area, organizational affiliation, or a position held in an organization. A user 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and/or intentions and interests with regard to system use and associated topical areas, and with regard to degree of affinity with other user community subsets. A user may identify preferred methods of information receipt or learning style, such as visual or audio, as well as relative interest levels in other communities.

A third category of usage behaviors 920 is known as collaborative behaviors. Collaborative behaviors are interactions among the one or more users. Collaborative behaviors may thus provide information on areas of interest and intensity of interest. Interactions including online referrals of elements or subsets of the one or more computer-based systems 925, such as through email, whether to other users or to non-users, are types of collaborative behaviors obtained by the one or more computer-based systems 925.

Other examples of collaborative behaviors include, but are not limited to, online discussion forum activity, contributions of content or other types of objects to the one or more computer-based systems 925, posting information that is then received by subscribers, categorizing subscribers so as to selectively broadcast information to subscribers, linking to another user, or any other alterations of the elements, objects or relationships among the elements and objects of one or more computer-based systems 925. Collaborative behaviors may also include general user-to-user communications, whether synchronous or asynchronous, such as email, instant messaging, interactive audio communications, and discussion forums, as well as other user-to-user communications that can be tracked by the one or more computer-based systems 925.

A fourth category of process usage behaviors 920 is known as reference behaviors. Reference behaviors refer to the marking, designating, saving or tagging of specific elements or objects of the one or more computer-based systems 925 for reference, recollection or retrieval at a subsequent time. An indicator such as "like" is a reference behavior when used as a tag for later retrieval of associated information. Tagging may include creating one or more symbolic expressions, such as a word or words (e.g., a hashtag), associated with the corresponding elements or objects of the one or more computer-based systems 925 for the purpose of classifying the elements or objects. The saved or tagged elements or objects may be organized in a manner customizable by users. The referenced elements or objects, as well as the manner in which they are organized by the one or more users, may provide information on inferred interests of the one or more users and the associated intensity of the interests.

A fifth category of process usage behaviors 920 is known as direct feedback behaviors. Direct feedback behaviors include ratings or other indications of perceived quality by individuals of specific elements or objects of the one or more computer-based systems 925, or the attributes associated with the corresponding elements or objects. The direct feedback behaviors may therefore reveal the explicit preferences and/or intentions of the user. In the one or more computer-based systems 925, the recommendations 250 may be rated by users 200. This enables a direct, adaptive feedback loop, based on explicit preferences and/or intentions specified by the user. Direct feedback also includes user-written comments and narratives associated with elements or objects of the computer-based system 925.

A sixth category of process usage behaviors is known as physiological responses. These responses or behaviors are associated with the focus of attention of users and/or the intensity of the intention, or any other aspects of the physiological responses of one or more users 200. For example, the direction of the visual gaze of one or more users may be determined. This behavior can inform inferences associated with preferences and/or intentions or interests even when no physical interaction with the one or more computer-based systems 925 is occurring. Even more direct assessment of the level of attention may be conducted through access to the brain patterns or signals associated with the one or more users. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by one or more regions of the brain.

Physiological responses may include any other type of physiological response of a user 200 that may be relevant for making preference or interest inferences, independently, or collectively with the other usage behavior categories. Other physiological responses may include, but are not limited to, utterances, vocal range, intensity and tempo, gestures, movements, or body position. Attention behaviors may also include other physiological responses such as breathing rate, heart rate, temperature, blood pressure, or galvanic response.

A seventh category of process usage behaviors is known as environmental conditions and physical location behaviors. Physical location behaviors identify physical location and mobility behaviors of users. The location of a user may be inferred from, for example, information associated with a Global Positioning System or any other position or location-aware system or device, or may be inferred directly from location information input by a user (e.g., inputting a zip code or street address, or through an indication of location on a computer-implemented map), or otherwise acquired by the computer-based systems 925. The physical location of physical objects referenced by elements or objects of one or more computer-based systems 925 may be stored for future reference. Proximity of a user to a second user, or to physical objects referenced by elements or objects of the computer-based application, may be inferred. The length of time, or duration, at which one or more users reside in a particular location may be used to infer intensity of interests associated with the particular location, or associated with objects that have a relationship to the physical location. Derivative mobility inferences may be made from location and time data, such as the direction of the user, the speed between locations or the current speed, the likely mode of transportation used, and the like. These derivative mobility inferences may be made in conjunction with geographic contextual information or systems, such as through interaction with digital maps or map-based computer systems. Environmental conditions may include the time of day, the weather, temperature, the configuration of elements or objects in the surrounding physical space, lighting levels, sound levels, and any other condition of the environment around the one or more users 200.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the one or more computer-based systems 925. The temporal patterns may include historical patterns, including how recently an element, object or item of content associated with one or more computer-based systems 925. For example, more recent behaviors may be inferred to indicate more intense current interest than less recent behaviors.

Another temporal pattern that may be tracked and contribute to derive preference inferences is the duration associated with the access or interaction with, or inferred attention toward, the elements, objects or items of content of the one or more computer-based systems 925, or the user's physical proximity to physical objects referenced by system objects of the one or more computer-based systems 925, or the user's physical proximity to other users. For example, longer durations may generally be inferred to indicate greater interest than short durations. In addition, trends over time of the behavior patterns may be captured to enable more effective inference of interests and relevancy. Since delivered recommendations may include one or more elements, objects or items of content of the one or more computer-based systems 925, the usage pattern types and preference inferencing may also apply to interactions of the one or more users with the delivered recommendations 250 themselves, including accesses of, or interactions with, explanatory information regarding the logic or rationale that the one more computer-based systems 925 used in deciding to deliver the recommendation to the user.

Adaptive Communications Generation

In some embodiments, adaptive communications 250c or recommendations 250 may be generated for the one or more users 200 through the application of affinity vectors.

For example, in some embodiments, Member-Topic Affinity Vectors (MTAVs) may be generated to support effective recommendations, wherein for a user or registered member 200 of the one or more computer-based systems 925 a vector is established that indicates the relative affinity (which may be normalized to the [0,1] continuum) the member has for one or more object sub-networks the member has access to. For computer-based systems 925 comprising a fuzzy content network-based structural aspect, the member affinity values of the MTAV may be in respect to topic networks.

So in general, for each registered member, e.g., member M, a hypothetical MTAV could be of a form as follows:

| MTAV for Member M | | | | | |
|---|---|---|---|---|---|
| Topic 1 | Topic 2 | Topic 3 | Topic 4 | . . . | Topic N |
| 0.35 | 0.89 | 0.23 | 0.08 | . . . | 0.14 |

The MTAV will therefore reflect the relative interests of a user with regard to all N of the accessible topics. This type of vector can be applied in two major ways:
  A. To serve as a basis for generating adaptive communications 250c or recommendations 250 to the user 200
  B. To serve as a basis for comparing the interests with one member 200 with another member 200, and to therefore determine how similar the two members are In some embodiments, an expertise vector (MTEV) may be used as a basis for generating recommendations of people with appropriately inferred levels of expertise, rather than, or in addition to, using an MTAV as in the exemplary examples herein. That is, the values of an MTEV correspond to inferred levels of expertise, rather than inferred levels of interests, as in the case of an MTAV.

To generate a MTAV or MTEV, any of the behaviors of Table 1 may be utilized. For example, in some embodiments the following example behavioral information may be used in generating an MTAV:
  1) The topics the member has subscribed to received updates
  2) The topics the member has accessed directly
  3) The accesses the member has made to objects that are related to each topic
  4) The saves or tags the member has made of objects that are related to each topic This behavioral information is listed above in a generally reverse order of importance from the standpoint of inferring member interests; that is, access information gathered over a significant number of accesses or over a significant period of time will generally provide better information than subscription information, and save information is typically more informative of interests than just accesses.

The following fuzzy network structural information may also be used to generate MTAV values:
  5) The relevancies of each content object to each topic
  6) The number of content objects related to each topic Personal topics that are not shared with other users 200 may be included in MTAV calculations. Personal topics that have not been made publicly available cannot be subscribed to by all other members, and so could in this regard be unfairly penalized versus public topics. Therefore for the member who created the personal topic and co-owners of that personal topic, in some embodiments the subscription vector to may be set to "True," i.e. 1. There may exist personal topics that are created by a member 200 and that have never been seen or contributed to by any other member. This may not otherwise affect the recommendations 250 since the objects within that personal topic may be accessible by other members, and any other relationships these objects have to other topics will be counted toward accesses of these other topics.

In some embodiments the first step of the MTAV calculation is to use information 1-4 above to generate the following table or set of vectors for the member, as depicted in the following hypothetical example:

TABLE 2

| Member 1 Behaviors | Topic 1 | Topic 2 | Topic 3 | Topic 4 | . . . | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 112 | 55 | 23 | 6 | | 43 |
| Weighted Saves | 6 | 8 | 4 | 0 | . . . | 2 |

The Subscriptions vector of Table 2 contains either a 1 if the member has subscribed to a topic or is the owner/co-owner of a personal topic or a 0 if the member has not subscribed to the topic. The Topic Accesses vector contains the number of accesses to that topic's explore page by the member to a topic over a period of time, for example, the preceding 12 months.

The Weighted Accesses vector of Table 1 contains the number of the member's (Member 1) accesses over a specified period of time of each object multiplied by the relevancies to each topic summed across all accessed objects. (So for example, if Object 1 has been accessed 10 times in the last 12 months by Member 1 and it is related to Topic 1 by 0.8, and Object 2 has been accessed 4 times in the last 12 months by Member 1 and is related to Topic 1 at relevancy level 0.3, and these are the only objects accessed by Member 1 that are related to Topic 1, then Topic 1 would contain the value 10*0.8+4*0.3=9.2).

The Weighted Saves vector of Table 1 works the same way as the Weighted Accesses vector, except that it is based on Member 1's object save data instead of access data.

In some embodiments, topic object saves are counted in addition to content object saves. Since a member saving a topic typically is a better indicator of the member's interest in the topic than just saving an object related to the said topic, it may be appropriate to give more "credit" for topic saves than just content object saves. For example, when a user saves a topic object, the following process may be applied:

If the Subscriptions vector indicator is not already set to "1" for this topic in Table 1, it is set to "1". (The advantage of this is that even if the topic has been saved before 12 months ago, the user will still at least get subscription "credit" for the topic save even if they don't get credit for the next two calculations).

In exactly the same way as a saved content object, a credit is applied in the Weighted Accesses vector of Table 2 based on the relevancies of other topics to the saved topic. A special "bonus" weighting in the Weighted Accesses vector of Table 2 may be applied with respect to the topic itself using the weighting of "10"—which means a topic save is worth at least as much as 10 saves of content that are highly related to that topic.

The next step is to make appropriate adjustments to Table 1. For example, it may be desirable to scale the Weighted Accesses and Weighted Saves vectors by the number of objects that is related to each topic. The result is the number of accesses or saves per object per topic. This may be a better indicator of intensity of interest because it is not biased against topics with few related objects. However, per object accesses/saves alone could give misleading results when there are very few accesses or saves. So as a compromise, the formula that is applied to each topic, e.g., Topic N, may be a variation of the following in some embodiments:

((Weighted Accesses for Topic N)/(Objects related to Topic N))*Square Root(Weighted Accesses for Topic N)

This formula emphasizes per object accesses, but tempers this with a square root factor associated with the absolute level of accesses by the member. The result is a table, Table 2A, of the form:

TABLE 2A

| Member 1 Behaviors | Topic 1 | Topic 2 | Topic 3 | Topic 4 | ... | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 9.1 | 12 | 3.2 | 0.6 | | 2.3 |
| Weighted Saves | 0.9 | 1.3 | 1.1 | 0 | ... | 0.03 |

In some embodiments, the next step is to transform Table 2A into a MTAV. In some embodiments, indexing factors, such as the following may be applied:

| Topic Affinity Indexing Factors | Weight |
|---|---|
| Subscribe Indexing Factor | 10 |
| Topic Indexing Factor | 20 |
| Accesses Indexing Factor | 30 |
| Save Indexing Factor | 40 |

These factors have the effect of ensuring normalized MTAV values ranges (e.g. 0-1 or 0-100) and they enable more emphasis on behaviors that are likely to provide relatively better information on member interests. In some embodiments, the calculations for each vector of Table 1A are transformed into corresponding Table 2 vectors as follows:
1. Table 3 Indexed Subscriptions for a topic by Member 1=Table 2A Subscriptions for a topic*Subscribe Indexing Factor
2. Table 3 Indexed Direct Topic Accesses by Member 1=Table 2A Topic Accesses*Topic Indexing Factor
3. Table 3 Indexed Accesses for a topic by Member 1=((Table 2A Weighted Accesses for a topic by Member 1)/(Max(Weighted Accesses of all Topics by Member 1)))*Accesses Indexing Factor
4. Table 3 Indexed Saves for a topic by Member 1=((Table 2A Weighted Saves for a topic by Member 1)/(Max(Weighted Saves of all Topics by Member 1)))*Saves Indexing Factor The sum of these Table 3 vectors results in the MTAV for the associated member 200 as shown in the hypothetical example of Table 3 below:

TABLE 3

| Member 1 Indexed Behaviors | Topic 1 | Topic 2 | Topic 3 | Topic 4 | ... | Topic N |
|---|---|---|---|---|---|---|
| Subscriptions | 0 | 10 | 10 | 10 | | 10 |
| Topic Accesses | 5 | 1 | 20 | 0 | | 8 |

TABLE 3-continued

| Member 1 Indexed Behaviors | Topic 1 | Topic 2 | Topic 3 | Topic 4 | ... | Topic N |
|---|---|---|---|---|---|---|
| Weighted Accesses | 11 | 1 | 30 | 12 | | 6 |
| Weighted Saves | 0 | 10 | 40 | 1 | | 2 |
| Member 1 MTAV | 16 | 22 | 100 | 23 | ... | 26 |

In some embodiments, member-to-member affinities can be derived by comparing the MTAVs of a first member 200 and a second member 200. Statistical operators such as correlation coefficients may be applied to derive a sense of the distance between members in n-dimensional topic affinity space, where there are N topics. Since different users may have access to different topics, the statistical correlation for a pair of members is preferentially applied against MTAV subsets that contain only the topics that both members have access to. In this way, a member-to-member affinity vector (MMAV) can be generated for each member or user 200, and the most similar members, the least similar members, etc., can be identified for each member 200. In some embodiments, a member-to-member expertise vector (MMEV) may be analogously generated by comparing the MTEVs of a pair of users 200 and applying correlation methods.

With the MTAVs, MMAVs, and Most Similar Member information available, a set of candidate objects to be recommended can be generated in accordance with some embodiments. These candidate recommendations may, in a later processing step, be ranked, and the highest ranked to candidate recommendations will be delivered to the recommendation recipient 200,260. Recall that recommendations 250 may be in-context of navigating the system 925 or out-of-context of navigating the system 925.

Following are more details on an exemplary set of steps related to generating out-of-context recommendations. At each step, the candidate objects may be assessed against rejection criteria (for example, the recommendation recipient having already recently received the candidate object may be a cause for immediate rejection) and against a maximum number of candidate objects to be considered.
1. Determine if there are objects that have been related to objects at a sufficient level of relatedness that have been "saved" by the recommendation recipient since the time the recommendation recipient saved the object. This may be a good choice for a first selection step because it would be expected that such objects would be highly relevant to the recommendation recipient.
2. Determine if the Most Similar Members to the recommendation recipient have "saved" (related) objects in the last 12 months to the recommendation recipient's highest affinity topics.
3. Determine if the Most Similar Members to the recommendation recipient have rated objects at a level greater than some threshold over some time period, that are related to the recommendation recipient's highest affinity topics.
4. Determine the most frequently accessed objects by the Most Similar Members over some period of time that are related to the recommendation recipient's highest affinity topics.
5. Determine the highest influence objects that are related to the recommendation recipient's highest affinity topics.

A variation of the out-of-context recommendation process may be applied for in-context recommendations, where the process places more emphasis of the "closeness" of the objects to the object being viewed in generating candidate recommendation objects.

For both out-of-context and in-context recommendations, a ranking process may be applied to the set of candidate objects, according to some embodiments. The following is an exemplary set of input information that may be used to calculate rankings.

1. Editor Rating: If there is no editor rating for the object, this value is set to a default
2. Community Rating (If there is no community rating for the object, this value can be set to a default)
3. Popularity: Indexed popularity (e.g., number of views) of the object.
4. Change in Popularity: Difference in indexed popularity between current popularity of the object and the object's popularity some time ago
5. Influence: Indexed influence of the object, where the influence of an object is calculated recursively based on the influence of other objects related to said object, weighted by the degree of relationship to said object, and where the initial setting of influence of an object is defined as its popularity.
6. Author's Influence: Indexed influence of the highest influence author (based on the sum of the influences of the author's content) of the content referenced by the object
7. Publish Date: Date of publication of the object
8. Selection Sequence Type: An indicator the sequence step in which the candidate object was selected
9. Object Affinity to MTAV: The indexed vector product of the Object-Topic Affinity Vector (OTAV) and the MTAV. The values of the OTAV are just the affinities or relevancies between the object and each topic, which may be derived from behavioral and/or contents indexing processes.

A ranking is then developed based on applying a mathematical function to some or all or input items listed directly above, and/or other inputs not listed above. In some embodiments, user or administrator-adjustable weighting or tuning factors may be applied to the raw input values to tune the object ranking appropriately. These recommendation preference settings may be established directly by the user, and remain persistent across sessions until updated by the user, in some embodiments.

Some non-limiting examples of weighting factors that can be applied dynamically by a user 200 or administrator are as follows:

1. Change in Popularity ("What's Hot" factor)
2. Recency Factor
3. Object Affinity to MTAV (personalization factor)

Another example tuning factor that may be applied by a user 200 or administrator is contextual affinity, which is the degree of affinity of the object that is providing the context for the recommendation and its affinity to other objects, wherein the affinities are determined by means, for example, of applying its CTAV, or by comparison of its OCV to the OCVs of other objects. These weighting factors could take any value (but might be typically in the 0-5 range) and could be applied to associated ranking categories to give the category disproportionate weightings versus other categories. They can provide control over how important, for example, change in popularity, freshness of content, and an object's affinity with the member's MTAV are in ranking the candidate objects.

The values of the weighting factors are combined with the raw input information associated with an object to generate a rating score for each candidate object. The objects can then be ranked by their scores, and the highest scoring set of X objects, where X is a defined maximum number of recommended objects, can be selected for deliver to a recommendation recipient 200,260. In some embodiments, scoring thresholds may be set and used in addition to just relative ranking of the candidate objects. The scores of the one or more recommended objects may also be used by the computer-based system 925 to provide to the recommendation recipient a sense of confidence in the recommendation. Higher scores would warrant more confidence in the recommendation of an object than would lower scores.

In some embodiments other types of recommendation tuning factors may be applied by a user 200 or administrator. For example, the scope of a social network, such as degrees of separation, may be adjusted so as to influence the recommendations 250, and/or relationship types or categories of social relationships may be selected to tune recommendations 250. Recommendation recipients 200 or administrators may also or alternatively be able to restrict objects 212 representing other specified users 200 from being recommended, or restrict objects authored or otherwise having an affiliation with other specified users.

In some embodiments the scope of geography or distance from a current location, including, but not limited to, the expected time to travel from the existing location to one or more other locations, may be tuned or adjusted so as to influence recommendations 250. The expected time to travel may be a function of the actual or inferred mode of transportation of the recommendation recipient, road conditions, traffic conditions, and/or environmental conditions such as the weather. The specification of scope of geography, distance, and/or time-to-travel may be via an automated monitoring or inference of the recommendation recipient's current location, or may be via an explicit indication of location by the recommendation recipient through entering a location designation such as a zip code, or by indicating a location on a graphical representation of geography, for example, by indication location on a computer-implemented map display.

Other tuning factors that may be applied to influence recommendations 250 include the ability for the recommendation recipient to select a recommendation recipient mood or similar type of "state of mind" self-assessment that influences the generation of a recommendation. For example, a recommendation recipient might indicate the current state of mind is "busy," and less frequent and more focused recommendations 250 could be generated as a consequence.

For recommendations of people, recommendation recipients 200 can tune the recommendations 255 they receive by the degree of similarity of interests for one or more topics, according to some embodiments. Similarly, recommendation recipients may tune recommendations of people by the degree of difference in their level of expertise for one or more topics versus other users. This can be beneficial, for example, when a recommendation recipient seeks to receive recommendations of other people who have greater levels of expertise than themselves for one or more topics, but not too much greater levels of expertise.

In some embodiments, another type of tuning that may be applied by a user or administrator relates to the degree to which the capacity for enhanced serendipity is incorporated within the recommendation generating function 240 of the adaptive system 100.

In some embodiments a serendipity function comprises an interest anomaly function that identifies contrasting affinities between a first user's MTAV and a second user's MTAV.

Situations in which the first user's MTAV and the second user's MTAV have contrasting values associated with one or more topical areas, but wherein the two MTAVs otherwise have a higher than typical level similarity (as determined a vector similarity function such as, but not limited to, cosine similarity or correlation coefficient functions), present the opportunity for preferentially recommending objects 212 with a relatively high affinity to the topical areas associated with the contrasting MTAV affinities. More specifically, for two users 200 that have a relatively high level of similarity based on a comparison of their entire MTAVs, if the affinity values of the first user's MTAV corresponding to one or more topical areas is relatively high, and the affinity values of the second user's MTAV corresponding to the one or more topical areas is relatively low, then one or more objects 212 with relatively high OTAV values associated with the one or more topical areas may be preferentially recommended to the second user.

In some embodiments, the amount and/or quality of usage behavioral information on which the respective MTAV affinity values of the two users is based may additionally influence the generated recommendation 250. Specifically, in the above example, if the affinity values of the second user's MTAV corresponding to the one or more topical areas are relatively low and there is relatively little behavioral information on which said affinity values are based, then there is even greater motivation to recommend one or more objects 212 with relatively high OTAV values associated with the one or more topical areas to the second user. This is because there is incrementally greater value in learning more about the user's interest than if the low affinities were based on inferences from a larger body of behavioral information, as well as there being a less likelihood of providing a recommendation 250 that is truly not of interest to the user.

In some embodiments, then, a general method of generating beneficially serendipitous recommendations combines the contrasting of topical affinities among users 200 and the relative confidence levels in the topical contrasting affinities. This approach provides a "direction" for generating recommendations that are further from inferred interests that would otherwise be generated. Besides direction, a serendipity function may also include a "distance" factor and a probability factor. That is, according to some embodiments generating serendipity can be thought of as exploring other areas of a multi-dimensional interest landscape, where the best inference based on historical behavioral information is a (local) maximum on the landscape. The serendipity function can be thought of as performing a "jump" on the interest landscape, where the jump is in a specified direction, for a specified distance, and performed with a specified frequency or probability. One or more of these serendipity distance, direction, and probability parameters may be tunable by a user 200 or administrator in accordance with some embodiments.

In some embodiments the serendipity function may include applying a degree of randomization in addition to, or instead of, applying the interest anomaly function. This randomization function may be applied when selecting objects 212 from a set of candidate objects to be recommended to a recommendation recipient rather than simply relying on deterministic scoring means. In such embodiments the serendipity tuning function can be used by a user 200 or administrator to control the degree to which delivered recommendations 255 deviate from the recommendations that would otherwise be delivered using purely deterministic means.

The serendipity distance may be generated in accordance with a mathematical function. In some embodiments, the distance and/or probability factors may be generated in accordance with a power law distribution—as a non-limiting example, the distance and/or probability factors may be in accordance with a Levy Walk function.

It should be understood that other recommendation tuning controls may be provided that are not explicitly described herein.

Knowledge and Expertise Discovery

Recall that knowledge discovery and expertise discovery refer to learning layer functions that generate content recommendations and people recommendations 250, respectively.

For expertise discovery, there are at least two categories of people that may be of interest to other people within a user community:

1. People who have similar interest or expertise profiles to the recommendation recipient, which may be calculated, for example, in accordance with MMAVs and MMEVs.
2. People who are likely to have the most, or complementary levels of, expertise in specified topical areas Expertise discovery functions deliver recommendations 250 within a navigational context of the recommendation recipient 200, or without a navigational context. In some embodiments, a person or persons may be recommended consistent with the "navigational neighborhood," which may be in accordance with a topical neighborhood that the recommendation recipient 200 is currently navigating. The term "navigating" as used herein should be understood to most generally mean the movement of the user's 200 attention from one object 212 to another object 212 while interacting with, or being monitored by, a computer-implemented user interface (wherein the user interface may be visual, audio and/or kinesthetic-based). Entering a search term, for example, is an act of navigating, as is browsing or scrolling through an activity stream or news feed through use of a mouse, keyboard, and/or gesture detection sensor.

In some embodiments expertise may be determined through a combination of assessing the topical neighborhood in conjunction with behavioral information 920. The behavioral information that may be applied includes, but is not limited to, the behaviors and behavior categories in accordance with Table 1.

As a non-limiting example, an expertise score may be generated from the following information in some embodiments:

1. The scope of the topical neighborhood, as described herein
2. The topics created by each user within the topical neighborhood
3. The amount of content each user contributed in the topical neighborhood
4. The popularity (which may be derived from accesses and/or other behaviors) of the content
5. The ratings of the content In some embodiments this information may be applied to generate expertise rankings as illustrated in the following non-limiting example:

1. For each user X, sum the number of topics created by user X in the topical neighborhood, and then normalize across all users. Call this the T-Score of the user
2. For each user X, and for each content item created in a given time period by user X in the topical neighborhood: multiply the number of accesses (popularity) over the time period of each content item by the average rating of the content item (if there is no rating, set the rating to an average level). Then sum over all content items created by the user and normalize across all users. Call this the "C-Score" of the user.

3. For each user X, and for each content item modified at least once during the time period by user X in the topical neighborhood: multiply the number of accesses (popularity) over the time period of each content item by the average rating of the content item (if there is no rating, set the rating to an average level). Then sum over all content items modified by the user and normalize across all users. Call this "M-Score" of the user.

4. Total Expertise Score of a User=Scaling Factor1*T-Score+Scaling Factor2*C-Score+Scaling Factor3*M-Score 5. Find the top Total Expertise Scores and display a recommendation of one or more users ranked by total expertise score.

In some embodiments, user-controlled tuning or preference controls may be provided. For example, an expertise tuning control may be applied that determines the scope of the navigational neighborhood of the network of content that will be used in calculating the total expertise scores. The tuning controls may range, for example, from a value V of 1 (broadest scope) to 5 (narrowest scope).

In some embodiments, the topical neighborhood of the currently navigated topic T may then defined as encompassing all content items with a relationship indicator R 718 to topic T 710$t$ such that R>V−1. So if V=5, then the topical neighborhood includes just the content that has a relationship of >4 to the topic T, and so on. Expertise tuning may be effected through a function that enables expertise breadth to be selected from a range corresponding to alternative levels of V, in some embodiments.

In some embodiments, other tuning controls may be used to adjust expertise discovery recommendations 250 with regard to depth of expertise, in addition to, or instead of, breadth of expertise. For example, for a given navigational neighborhood, a user 200 or administrator may be able to adjust the required thresholds of inferred expertise for a recommendation 250 to be delivered to the recommendation recipient 200, and/or may be able to tune the desired difference in expertise levels between the recommendation recipient and recommended people. Tuning of recommendations 250 may also be applied against a temporal dimension, so as to, for example, account for and/or visualize the accretion of new expertise over time, and/or, for example, to distinguish long-term experts in a topical area from those with more recently acquired expertise.

In some embodiments, the expertise discovery function may generate recommendations 250 that are not directly based on navigational context. For example, the expertise discovery function may infer levels of expertise associated with a plurality of topical neighborhoods, and evaluate the levels of expertise for the topical neighborhoods by matching an MTAV or MTEV, or other more explicit indicator of topical expertise demand associated with the recommendation recipient 200 and a plurality of MTEVs of other users. Positive correlations between the expertise recommendation recipient's MTAV or topical expertise demand indicators and an MTEV, or negative correlations between the expertise recommendation recipient's MTEV and another MTEV, are factors that may influence the generation of expertise recommendations. In some embodiments, the MMAV or an expertise matching equivalent such as an MMEV of the recommendation recipient 200 may be applied by the expertise discovery function in evaluating other users 200 to recommend.

In some embodiments recommendation recipients 200 may select a level of expertise desired, and the expertise discovery function evaluates expertise levels in specific topical neighborhoods for matches to the desired expertise level. The recommendation recipient 200 may set the expertise discovery function to infer his level of expertise in a topical neighborhood and to evaluate others users for a similar level of expertise. The inference of expertise may be performed based, at least in part, by comparing the values of the recommendation recipient's MTEV with the associated topics in the specified topical neighborhood.

In some embodiments expertise may be inferred from the pattern matching of information within content. For example, if a first user 200 employs words, phrases, or terminology that has similarities to a second user 200 who is inferred by the system to have a high level expertise, then everything else being equal, the system 100 may infer the first user to have a higher than level of expertise. In some embodiments vocabularies that map to specific areas and/or levels of expertise may be accessed or generated by the system 100 and compared to content contributed by users 200 in evaluating the level of expertise of the users.

Recall that the MTEV can be generated from behavioral information, including but not limited to the behaviors 920 and behavioral categories described in Table 1, similarly to the MTAV, except expertise is inferred rather than interests and preferences. As just one example of the difference in inferring an expertise value associated with a topic rather than an interest value, clicking or otherwise accessing an object 212 may be indicative of a interest in the associated topic or topics, but not very informative about expertise with regard to the associated topic or topics. On the other hand, behaviors such as, but not limited to, creating objects, writing reviews for objects, receiving high ratings from other users with regard to created objects, being subscribed to by other users who have an inferred relatively high level of expertise, creation or ownership of topics, and so on, are more informative of expertise levels with regard to the associated topic or topics, and are preferentially applied in generating MTEV values according to some embodiments. Similarly to the generation of MTAVs, weights may be applied to each of multiple types of behavioral factors in generating composite MTEV values in accordance with their expected relative strength of correlation with actual expertise levels.

In some embodiments a difference between the calculation method of an MTAV versus that of an MTEV is that MTAV values are indexed across topics—that is, the MTAV values represent relative interest levels of a user 200 among topics, whereas MTEV values are indexed across users 200—that is, the MTEV values represent relative levels of expertise among users 200.

In some embodiments, MTEV values may be calibrated using a benchmarking process, enabling an inference of an absolute level of expertise instead of, or in addition to, an inference of a relative level of expertise among users. For example, a test result or other type of expertise calibration information may be applied that establishes a benchmark expertise level for a user 200 across one or more topics. Expertise calibration means include, but are not limited to, educational proxies for expertise levels such as certifications, education programs, degrees attained, experience levels in a field or performing an activity, and/or current or past professions. For example, a recent graduate degree in a specific branch of mathematics would be indicative of a high level of expertise in that branch of mathematics, and likely a fairly high level of expertise in mathematical topics in general. The expertise calibration information may be available to the recommendation function 240 through a user's self-profiling behavior, or may be accessed through other means.

The inferred MTEV values for the benchmarked user can then be used as a basis for indexing the inferred MTEV values of other users 200. This approach can be beneficial because an inferred expertise level that is calibrated against a benchmark level can enable the generation of more effective recommendations, particularly with regard to the generation of recommendations of content and/or topics. Whereas for recommendations of expertise (e.g., recommendations of other users), a purely relative expertise levels may be sufficient for generating useful recommendations, the process of generating recommendations of content or topics can often benefit from having a greater sense of absolute levels of expertise. This is particularly the case when the recommendation function 240 has access to information that is suggestive of the levels of expertise for which potentially recommended content or topics are appropriate. Information that is suggestive of the levels of expertise for which an object 212 will be most appropriate may be acquired by the recommendation function 240 through access to an explicit indication, such as, for example, through and expertise level indication within meta-information 712 associated with an object 212,710, or the recommendation function 240 may assess the expertise levels for which an object 212 would be most appropriate through inferences from the content or information 232 within the object.

In some embodiments, the recommendation function 240 combines one or more MTAVs with one or more MTEVs in generating a recommendation 255,265. For example, first, the MTAV of a recommendation recipient may be used by the recommendation function 240 to determine the one or more topics of highest interest to the recommendation recipient. The recommendation function may then compare the recommendation recipient's MTEV to the MTEVs of other users to identify one or more of the topics of highest interest for which the recommendation recipient has a lower level of expertise (or more generally, a complementary level of expertise) compared to one or more other users. The one or more other users whose MTEVs satisfy this condition are then candidates for recommending to the recommendation recipient. Another example of combining MTAV and MTEV information in generating a recommendation 255,265 is first identifying the one or more topics of highest interest to the recommendation recipient, and then using the recommendation recipient's MTEV to recommend content or topics that are consistent with the MTEV values associated with the highest interest topics. Where the recommendation function 240 is able to assess the levels of expertise for which an item of content or topic are appropriate, those levels of expertise can be compared against the corresponding MTEV values and serve as at least one factor in the recommendation function users in deciding whether to recommend the item of content to the recommendation recipient.

Inferences of levels of expertise can be informed by collaborative behaviors with regard to other users 200 who are inferred to have given levels of expertise. In some embodiments users 200 are automatically clustered or segmented into levels of inferred expertise. Often, levels of expertise cluster—that is, people with similar levels of expertise preferentially collaborate, a tendency which can be beneficially used by the expertise inferencing function. A recursive method may be applied that establishes an initial expertise clustering or segmentation, which in conjunction with collaborative and other behaviors, enables inferences of expertise of these and other users not already clustered, which then, in turn, enables adjustments to the expertise clusters, and so on.

Inferences of expertise that are embodied within an MTEV may be informed by the contents of objects associated with a user 200, in accordance with some embodiments. For example, the use, and/or frequency of use, of certain words or phrases may serve as a cue for level of expertise. More technical or domains-specific language, as informed by, for example, a word or phrase frequency table, would be indicative of level of expertise in a field. Other expertise cues include punctuation—question marks, everything else being equal, are more likely to be indicative of less expertise.

In some embodiments, when a recommendation of expertise in topical neighborhoods or for one or more specific topics is required, the selected topics are compared to user MTEVs to determine the best expertise match to the selected topics. For example, a specific project may require expertise in certain topical areas. These selected topical areas are then compared to MTEVs to determine the users with be most appropriate level of expertise for the project.

In some embodiments, the selected topics for which expertise is desired may be weighted, and the weighted vector of selected topics is compared to the corresponding topical expertise values in user MTEVs—positive correlations between the weighted vector of selected topics and the MTEVs of other users are preferentially identified. Mathematical functions are applied to determine the best expertise fit in the weighted selected topic case or the un-weighted selected topic case.

In some embodiments, the behaviors of users within one or more expertise segments or clusters are assessed over a period of time after an event associated with one or more topical areas. The event, embodied as an object 212, could, for example correspond to a condition identified by another user or be identified and communicated by a device. The post-event behaviors assessed for expertise cohorts may then form the basis for recommended content, people, and/or process steps to be delivered to users 200 when the same or similar event occurs in the future. These event-specific recommendations 250 may be tempered by an assessment of the recommendation recipient's MMEV such that if relatively high levels of expertise are inferred relative to the event or related topics, then "best practice" process step recommendations 250 derived from the post-event behaviors associated with the highest expertise cohort may be recommended. If relatively lower levels of expertise are inferred relative to the event or related topics, then process step recommendations 250 derived with the highest expertise cohort may be supplemented with, for example, additional educational or verification steps.

Recommendation Explanation Generation

In addition to delivering a recommendation 250 of an object 212, the computer-based application 925 may deliver a corresponding explanation 250c of why the object was recommended. This can be very valuable to the recommendation recipient 200 because it may give the recipient a better sense of whether to bother to read or listen to the recommended content (or in the case of a recommendation of another user 200 whether to, for example, contact them), prior to committing significant amount of time. For recommendations 250 that comprise advertising content, the explanation may enhance the persuasiveness of the ad.

The explanations 250c may be delivered through any computer-implemented means, including, but not limited to delivery modes in which the recommendation recipient can read and/or listen to the recommendation.

In some embodiments, variations of the ranking factors previously described may be applied in triggering explanatory phrases. For example, the following table illustrates how the ranking information can be applied to determine both positive and negative factors that can be incorporated within the recommendation explanations. Note that the Ranking Value Range is the indexed attribute values before multiplying by special scaling factors, Ranking Category Weighting Factors, such as the "What's Hot" factor, etc.

TABLE 2E

| 1 Ranking Category | 2 Ranking Value Range (RVR) | 3 Transformed Range | 4 $1^{st}$ Positive Threshold | 5 $2^{nd}$ Positive Threshold | 6 Negative Threshold |
|---|---|---|---|---|---|
| Editor Rating | 0-100 | RVR | 60 | 80 | 20 |
| Community Rating* | 0-100 | RVR | 70 | 80 | 20 |
| Popularity | 0-100 | RVR | 70 | 80 | 10 |
| Change in Popularity | −100-100 | RVR | 30 | 50 | −30 |
| Object Influence | 0-100 | RVR | 50 | 70 | 5 |
| Author's Influence | 0-100 | RVR | 70 | 80 | .01 |
| Publish Date | −Infinity-0 | 100-RVR | 80 | 90 | 35 |
| Object Affinity to MTAV | 0-100 | RVR | 50 | 70 | 20 |

An exemplary process that can be applied to generate explanations based on positive and negative thresholds listed in 2E is as follows:

Step 1: First Positive Ranking Category—subtract the $1^{st}$ Positive Threshold column from the Transformed Range column and find the maximum number of the resulting vector (may be negative). The associated Ranking Category will be highlighted in the recommendation explanation.

Step 2: Second Positive Ranking Category—subtract the $2^{nd}$ Positive Threshold column from the Transformed Range column and find the maximum number of the resulting vector. If the maximum number is non-negative, and it is not the ranking category already selected, then include this second ranking category in the recommendation explanation.

Step 3: First Negative Ranking Category—subtract the Negative Threshold column from the Transformed Range column and find the minimum number of the resulting vector. If the minimum number is non-positive this ranking category will be included in the recommendation explanation as a caveat, otherwise there will be no caveats.

Although two positive and one negative thresholds are illustrated in this example, an unlimited number of positive and negative thresholds may be applied as required for best results.

In some embodiments explanations 250c are assembled from component phrases and delivered based on a syntax template or function. Following is an example syntax that guides the assembly of an in-context recommendation explanation. In the syntactical structure below phrases within { } are optional depending on the associated logic and calculations, and "+" means concatenating the text strings. Other detailed syntactical logic such as handling capitalization is not shown in this simple illustrative example.

{[Awareness Phrase (if any)]} +
{[Sequence Number Phrase (if any) + [Positive Conjunction]} +
[$1^{st}$ Positive Ranking Category Phrase] +
{[Positive Conjunction] + [$2^{nd}$ Positive Ranking Category Phrase (if any)]}
+
{[Negative Conjunction] + [Negative Ranking Category Phrase (if any)]}
+
{[Suggestion Phrase (if any)]}

The following section provides some examples of phrase tables or arrays that may be used as a basis for selecting appropriate phrases for a recommendation explanation syntax. Note that in the following tables, when there are multiple phrase choices, they are selected probabilistically. "NULL" means that a blank phrase will be applied. [ ] indicates that this text string is a variable that can take different values.

| System Awareness Phrases | |
|---|---|
| Trigger Condition | Phrase |
| Apply these phrase alternatives if any of the 4 Sequence Numbers was triggered | 1) I noticed that<br>2) I am aware that<br>3) I realized that<br>4) NULL |

| Out-of-Context Sequence Number Phrases | |
|---|---|
| Trigger Condition | Phrase |
| Sequence 1 | 1) other members have related [this object] to [saved object name], which you have saved, |
| Sequence 2 | 1) members with similar interests to you have saved [this object] |
| Sequence 3 | 1) members with similar interests as you have rated [this object] highly<br>2) Members that have similarities with you have found [this object] very useful |
| Sequence 4 | 1) [this object] is popular with members that have similar interests to yours<br>2) Members that are similar to you have often accessed [this object] |

Note:
[this object] = "this 'content-type'" (e.g., "this book") or "it" depending on if the phrase "this 'content-type'" has already been used once in the explanation.

| Positive Ranking Category Phrases | |
|---|---|
| Trigger Category | Phrase |
| Editor Rating | 1) [it] is rated highly by the editor |
| Community Rating* | 1) [it] is rated highly by other members |
| Popularity** | 1) [it] is very popular |
| Change in Popularity | 1) [it] has been rapidly increasing in popularity |
| Object Influence | 1) [it] is [quite] influential |
| Author's Influence | 1) the author is [quite] influential<br>2) [author name] is a very influential author |
| Publish Date | 1) it is recently published |
| Object Affinity to MTAV (1) | 1) [it] is strongly aligned with your interests<br>2) [it] is related to topics such as [topic name] that you find interesting<br>3) [it] is related to topics in which you have an interest<br>4) [it] contains some themes related to topics in which you have an interest |

Positive Ranking Category Phrases

| Trigger Category | Phrase |
| --- | --- |
| Object Affinity to MTAV (2) | 5) I know you have an interest in [topic name]<br>6) I am aware you have an interest in [topic name]<br>7) I have seen that you are interested in [topic name]<br>8) I have noticed that you have a good deal of interest in [topic name] |

Positive Conjunctions

| Phrase |
| --- |
| 1) and |

Negative Ranking Category Phrases

| Trigger Category | Phrase |
| --- | --- |
| Editor Rating | 1) it is not highly rated by the editor |
| Community Rating | 1) it is not highly rated by other members |
| Popularity | 1) it is not highly popular |
| Change in Popularity | 1) it has been recently decreasing in popularity |
| Object Influence | 1) it is not very influential |
| Author's Influence | 1) the author is not very influential<br>2) [author name] is not a very influential author |
| Publish Date | 1) it was published some time ago<br>2) it was published in [Publish Year] |
| Object Affinity to MTAV | 1) it may be outside your normal area of interest<br>2) I'm not sure it is aligned with your usual interest areas |

Negative Conjunctions

| Phrase |
| --- |
| 1) , although<br>2) , however<br>3) , but |

Suggestion Phrases (use only if no caveats in explanation)

| Phrase |
| --- |
| 1) , so I think you will find it relevant<br>2) , so I think you might find it interesting<br>3) , so you might want to take a look at it<br>4) , so it will probably be of interest to you<br>5) , so it occurred to me that you would find it of interest<br>6) , so I expect that you will find it thought provoking<br>7) NULL |

The above phrase array examples are simplified examples to illustrate the approach. In practice, multiple syntax templates, accessing different phrase arrays, with each phrase array many different phrases and phrase variations are required to give the feel of human-like explanations. These example phrase arrays are oriented toward recommendations based on recommendation recipient interests as encoded in MTAVs; for recommendations related to the expertise of other users as encoded, for example, in MTEVs, explanation syntactical rules and phrase arrays tailored for that type of recommendation are applied. In some embodiments, explanatory syntactical rules and phrases are applied that are consistent with explanations of recommendations that are generated in accordance with both an MTAV and MTEV.

As mentioned above, a sense of confidence of the recommendation to the recommendation recipient can also be communicated within the recommendation explanation. The score level may contribute to the confidence level, but some other general factors may be applied, including the amount of usage history available for the recommendation recipient on which to base preference inferences and/or the inferred similarity of the user with one or more other users for which there is a basis for more confident inferences of interests or preferences. The communication of a sense of confidence in the recommendation can be applied to recommendations with regard to expertise, as well as interest-based recommendations. The degree of serendipity incorporated by the serendipity function may be communicated 250c to the user, and may influence the communication and related syntax and/or phrases applied in the communication 250c, as well as affect the communication of the degree of confidence in a recommendation.

In some embodiments, a recommendation explanation may reference a tuning factor and its setting. For example, if a user has set a recency tuning factor so as to slant the recommendations 255 toward recommending objects 212 that have been recently published, the explanation may contain words or phrases to the effect that acknowledge that a recommended object is in accordance with that setting. Or, for example, if a person is recommended in accordance with an expertise scope level set by the recommendation recipient 200, the explanation might reference that setting as a justification for its recommendation (or alternatively, the explanation might acknowledge a tuning setting but indicate why other factors over-rode the setting in generating the explanation). For example, an exemplary recommendation explanation in this case is, "Although Jim Smith's expertise does not appear to be the deepest in subject x, I infer that he has significant breadth of expertise in related subjects, and you have directed me to emphasize breadth of expertise."

Recommendation explanations are one type of behavioral-based communications 250c that the one or more computer-based applications 925 may deliver to users 200. Other types of adaptive communications 250c may be delivered to a user 200 without necessarily being in conjunction with the recommendation of an object or item of content. For example, a general update of the activities of other users 200 and/or other trends or activities related to people or content may be communicated.

Adaptive communications 250c may also include contextual information in accordance with some embodiments. For example, contextual information may be provided to assist a user 200 in navigating the structural aspect 210,210D of an adaptive system 100,100D. Contextual information may additionally or alternatively include information related to the structure of originating systems 620,660 that have been transformed into a fuzzy network-based structural aspect 210D.

One example of contextual information that may be communicated to the user 200 is the scope of the navigational neighborhood associated with the structural aspect 210D of an adaptive system 100D and/or the structure of one or more originating systems 620,660.

Another example of contextual information within an adaptive communication 250c relates to the cross-contextualization between a transformed structure 210D and the structure of an originating system 620,660. For example the adaptive communication 250c may include an indication to the user 200 that is navigating within a specific position within the structural aspect 210D of an adaptive system 100D the equivalent navigational position within one or more originating systems 620,660. The specific navigational position in the adaptive system 100D on which cross-contextualization is based can be a topic or a specific item of content, for example.

The adaptive communications 250c may include references to hierarchical structures—for example, it may be communicated to the user that a topic is the parent of, or sibling to, another topic. Or for a fuzzy network-based structure, the strength of the relationships among topics and content may be communicated.

In some embodiments, adaptive communications 250c may include explanations of recommended objects 212 in which the explanations include references to words, phrases, concepts, and/or themes that are included within, or derived from, the contents of OCVs that are associated with the objects 212. For example, the explanation may indicate to the recommendation recipient that a recommended object 212 is inferred to emphasize themes that are aligned with topics that are inferred to be of high interest to the recommendation recipient or which are appropriate for the recommendation recipient's inferred level of expertise on one or more topics.

Adaptive communications 250c may also comprise one or more phrases that communicate an awareness of behavioral changes in the user 200 over time, and inferences thereof. These behavioral changes may be derived, at least in part, from an evaluation of changes in the user's MTAV and/or MTEV values over time. In some cases, these behavioral patterns may be quite subtle and may otherwise go unnoticed by the user 200 if not pointed out by the computer-based system 925. Furthermore, the one or more computer-based systems may infer changes in interests or preferences, or expertise, of the user 200 based on changes in the user's behaviors over time. The communications 250c of these inferences may therefore provide the user 200 with useful insights into changes in his interest, preferences, tastes, and over time. This same approach can also be applied by the one or more computer-based systems to deliver insights into the inferred changes in interests, preferences, tastes and/or expertise associated with any user 200 to another user 200. These insights, packaged in an engaging communications 250c, can simulate what is sometimes referred to as "a theory of mind" in psychology.

The adaptive communications 250c in general may apply a syntactical structure and associated probabilistic phrase arrays to generate the adaptive communications in a manner similar to the approach described above to generate explanations for recommendations. The phrase tendencies of the adaptive communications 250c over a number of generated communications can be said to constitute a "personality" associated with the one or more computer-based applications 925. The next section describes how in some embodiments of the personality can evolve and adapt over time, based at least in part, on the behaviors of the communication recipients 200.

Adaptive Personalities

Figure 9:
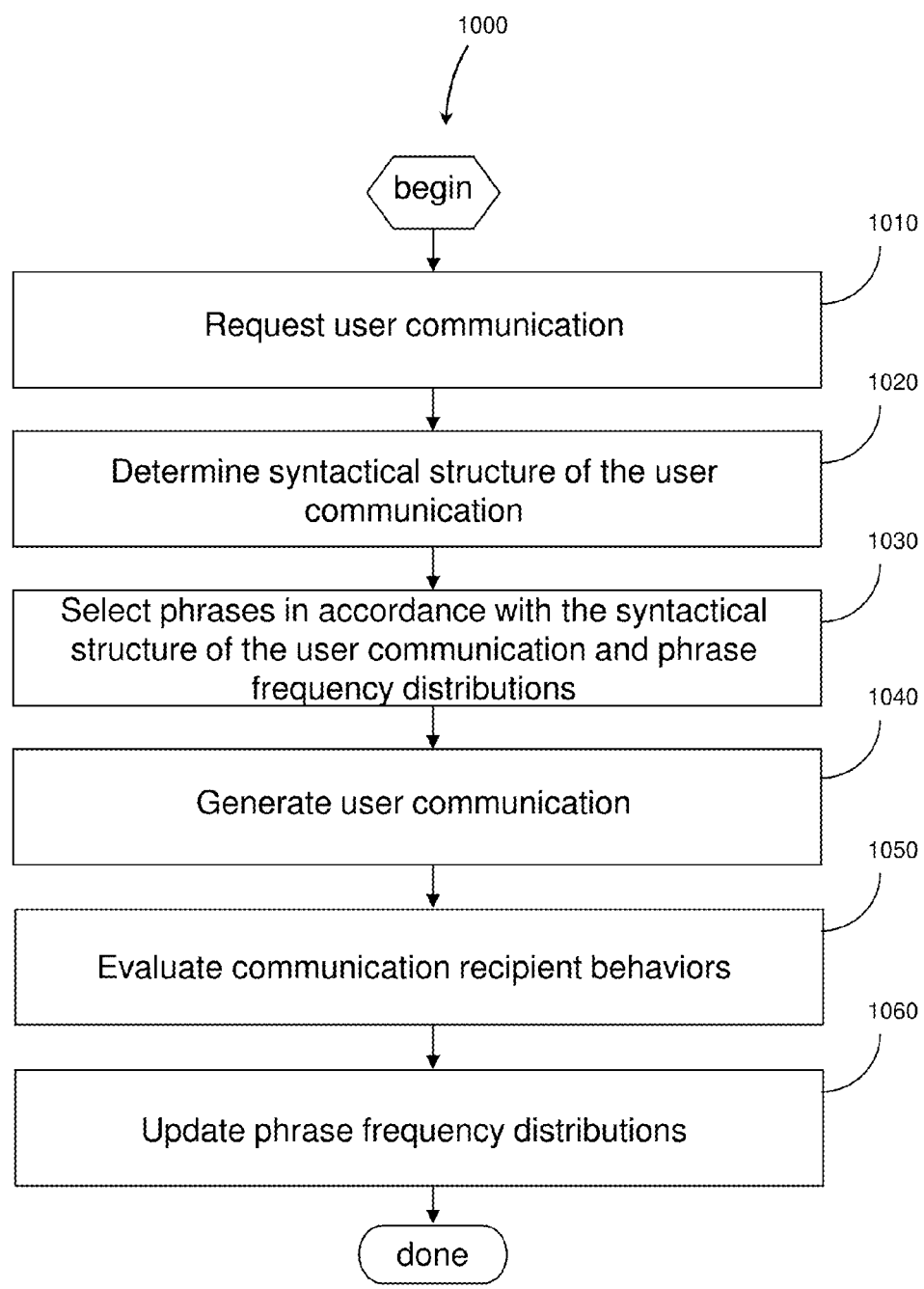
FIG. 9 is a flow diagram of an adaptive personality process, according to some embodiments.

FIG. 9 is a flow diagram of the computer-based adaptive personality process 1000 in accordance with some embodiments of the present invention. A user request for a communication 1010 initiates a function 1020 that determines the syntactical structure of the communication 250c to the user 200. The communication 250c to user 200 may be an adaptive recommendation 250, an explanation associated with a recommendation, or any other type of communication to the user. The communication 250c may be, for example, in a written and/or an audio-based format.

In accordance with the syntactical structure that is determined 1020 for the communication, one or more phrases are probabilistically selected 1030 based on frequency distributions 3030 associated with an ensemble of phrases to generate 1040 a communication 930 to the user.

User behaviors 920, which may include those described by Table 1 herein, are then evaluated 1050 after receipt of the user communication. Based, at least in part, on these evaluations 1050, the frequency distributions 3030 of one or more phrases that may be selected 1030 for future user communications are then updated 1060. For example, if the user communication 250c is an explanation associated with an adaptive recommendation 250, and it is determined that the recommendation recipient reads the corresponding recommended item of content, then the relative frequency of selection of the one or more phrases comprising the explanation of the adaptive recommendation 250 might be preferentially increased versus other phrases that were not included in the user communication. Alternatively, if the communication 250c elicited one or more behaviors 920 from the communication recipient 200 that were indicative of indifference or a less than positive reaction, then the relative frequency of selection of the one or more phrases comprising the communication might be preferentially decreased versus other phrases that were not included in the user communication.

In FIG. 11, an illustrative data structure 3000 supporting the adaptive personality process 1000 according to some embodiments is shown. The data structure may include a designator for a specific phrase array 3010. A phrase array may correspond to a specific unit of the syntax of an overall user communication. Each phrase array may contain one or more phrases 3040, indicated by a specific phrase ID 3020. Associated with each phrase 3040 is a selection frequency distribution indicator 3030. In the illustrative data structure 3000 this selection frequency distribution of phrases 3040 in a phrase array 3010 is based on the relative magnitude of the value of the frequency distribution indicator. In other embodiments, other ways to provide selection frequency distributions may be applied. For example, phrases 3040 may be selected per a uniform distribution across phrase instances in a phrase array 3010, and duplication of phrase instances may be used to as a means to adjust selection frequencies.

Communication of Self-Awareness

Figure 10:
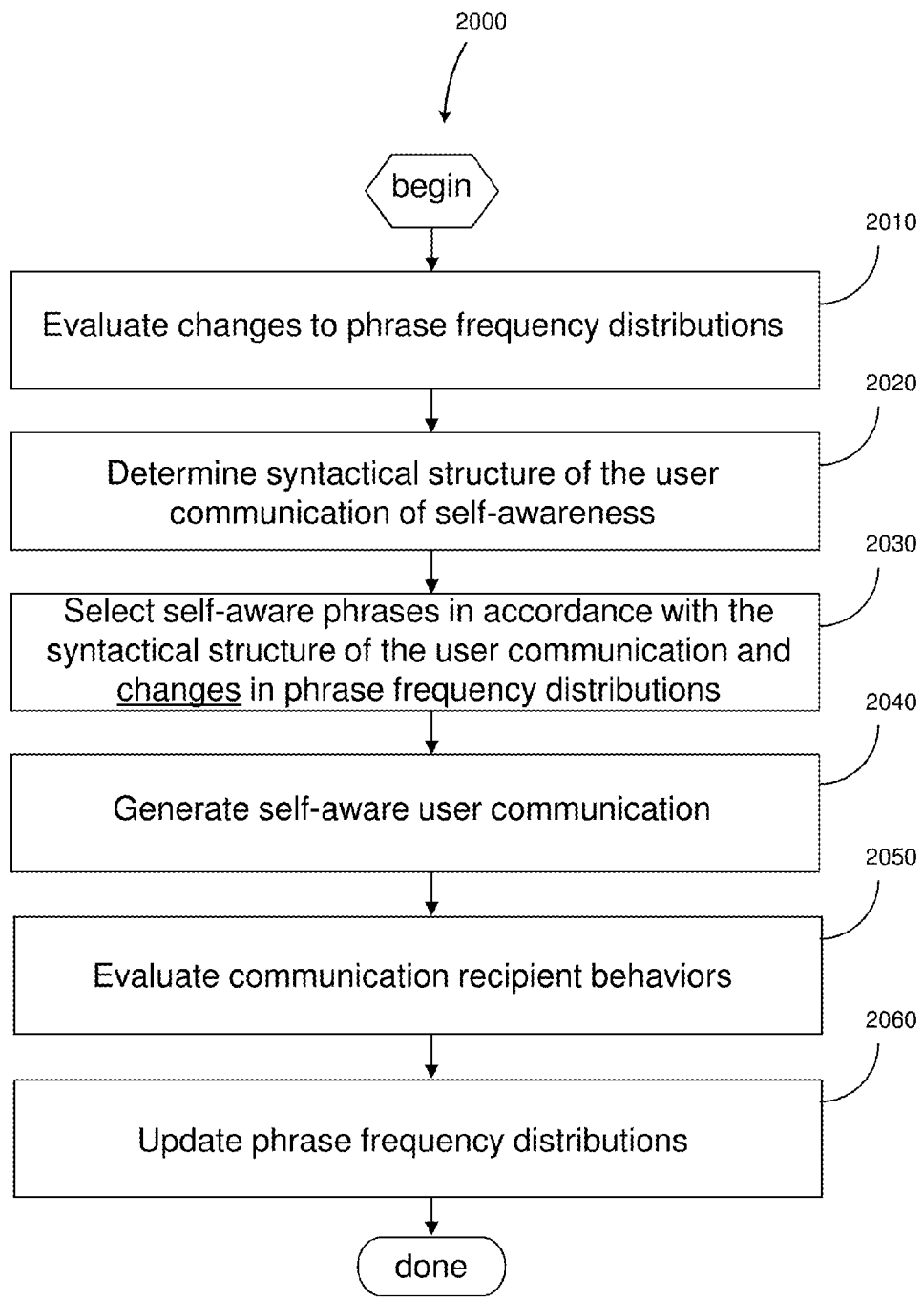
FIG. 10 is a flow diagram of a self-aware personality process, according to some embodiments.

FIG. 10 is a flow diagram of the computer-based adaptive self-awareness communication process 2000 in accordance with some embodiments of the present invention. The process 2000 begins with an evaluation 2010 of phrase frequency distribution 3030 changes over time. Then the appropriate syntactical structure of the communication 250c of self-awareness is determined 2020. One or more phrases 3040 that embody a sense of self-awareness are then selected in accordance with the syntactical structure requirements and changes in phrase frequency distributions over time.

Returning to FIG. 11, in some embodiments, phrase attributes that are associated with specific phrases may be used as a basis for self-aware phrase selection. Two example phrase attributes 3050, 3060 whose values are associated with specific phrases 3040 are shown. An unlimited number of attributes could be used as to provide as nuanced a level of self-awareness as desired.

When changes in phrase frequency distributions 3030 are evaluated 2010, the corresponding attributes 3050, 3060 are also evaluated. These attributes map to attributes 4050, 4060 that are associated with self-aware phrases 4040 in self-aware phrase data structure 4000. For example, if phrases 4040 that have the attribute value "humorous" have been increasing in frequency, then self-aware phrases that reference "humorous" may be appropriate to include in generating 2040 a communication of self-awareness 250c to a user 200. As is the case of any other communication 250c, the behaviors 920 of the recipient 200 of the communication may be evaluated 2050, and the self-aware phrase frequency distributions 4030 of the self-aware phrases 4040 may be updated 2060 accordingly. This recursive evaluation and updating of phrase frequency distributions can be applied without limit.

Figure 12:
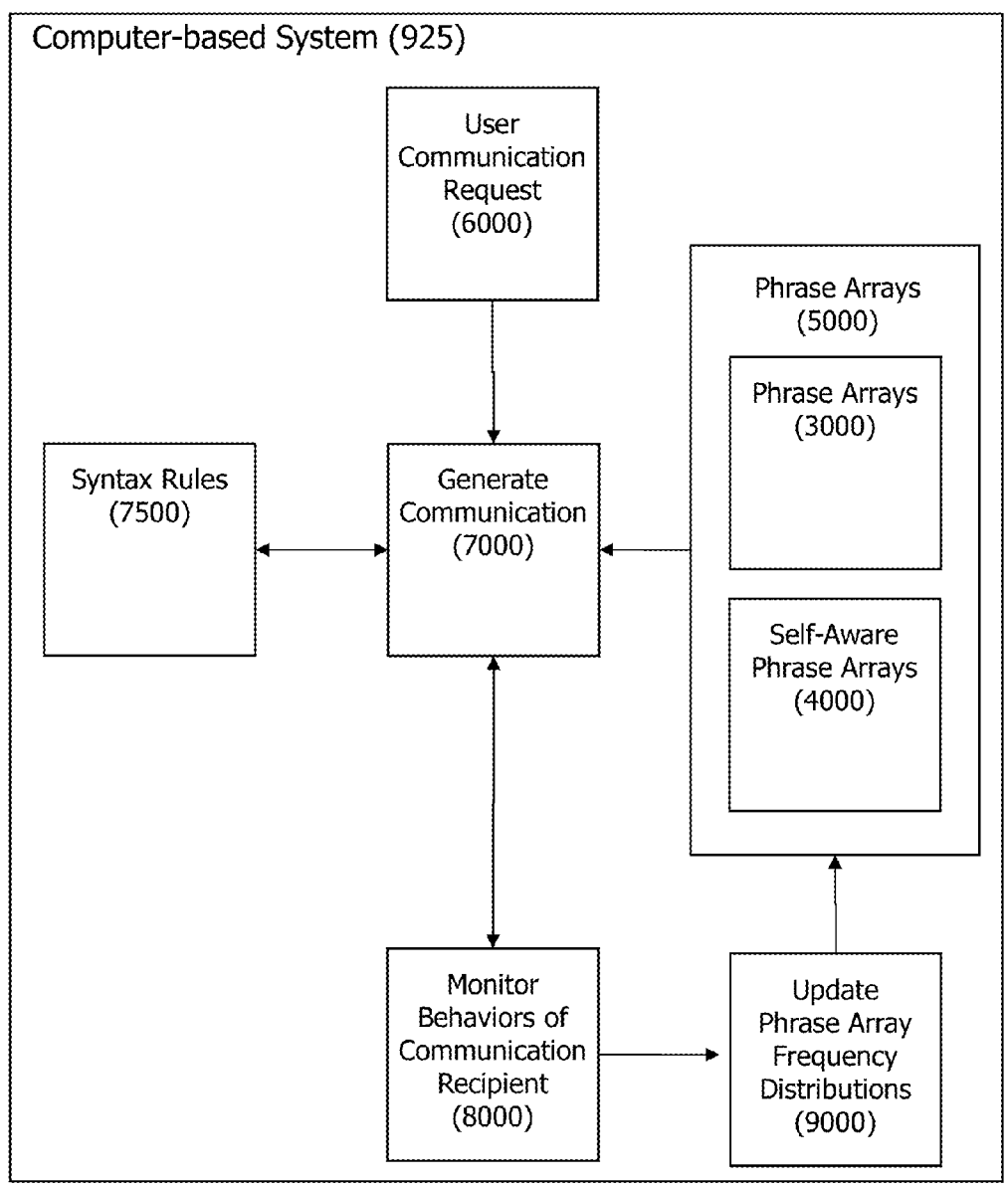
FIG. 12 is a block diagram of major functions of an adaptive personality and self-aware personality system, according to some embodiments.

FIG. 12 depicts the major functions associated with a computer based system 925 that exhibits an adaptive personality, and optionally, a self-aware personality. Recall that in some embodiments, the computer-based system 925 comprises an adaptive system 100.

A request 6000 for a communication to a user 200 is made. The request 6000 may be a direct request from a user 200, or the request may be made by another function of the computer-based system 925. In some embodiments the request 6000 for a communication to the user may be initiated by a function that generates 240 an adaptive recommendation. A communication to the user is then generated 7000. This generation is performed by first determining the appropriate syntactical rules or structure 7500 for the communication. In some embodiments, the syntax rules 7500 are of an "If some condition, Then apply a specific phrase array 3010" structure. Once the appropriate syntax is established and associated phrase arrays 3010 are determined, specific phrases are probabilistically retrieved from the phrase array function 5000 based on selection frequency distributions associated with the corresponding phrase arrays. The communication 250c is then assembled and delivered to a user 200.

User behaviors 920 of the communication recipient 200 are then monitored 8000. Based on inferences from these behaviors 920, the phrase array frequency distributions of the phrase array function 5000 are updated 9000 appropriately.

Computing Infrastructure

Figure 13:
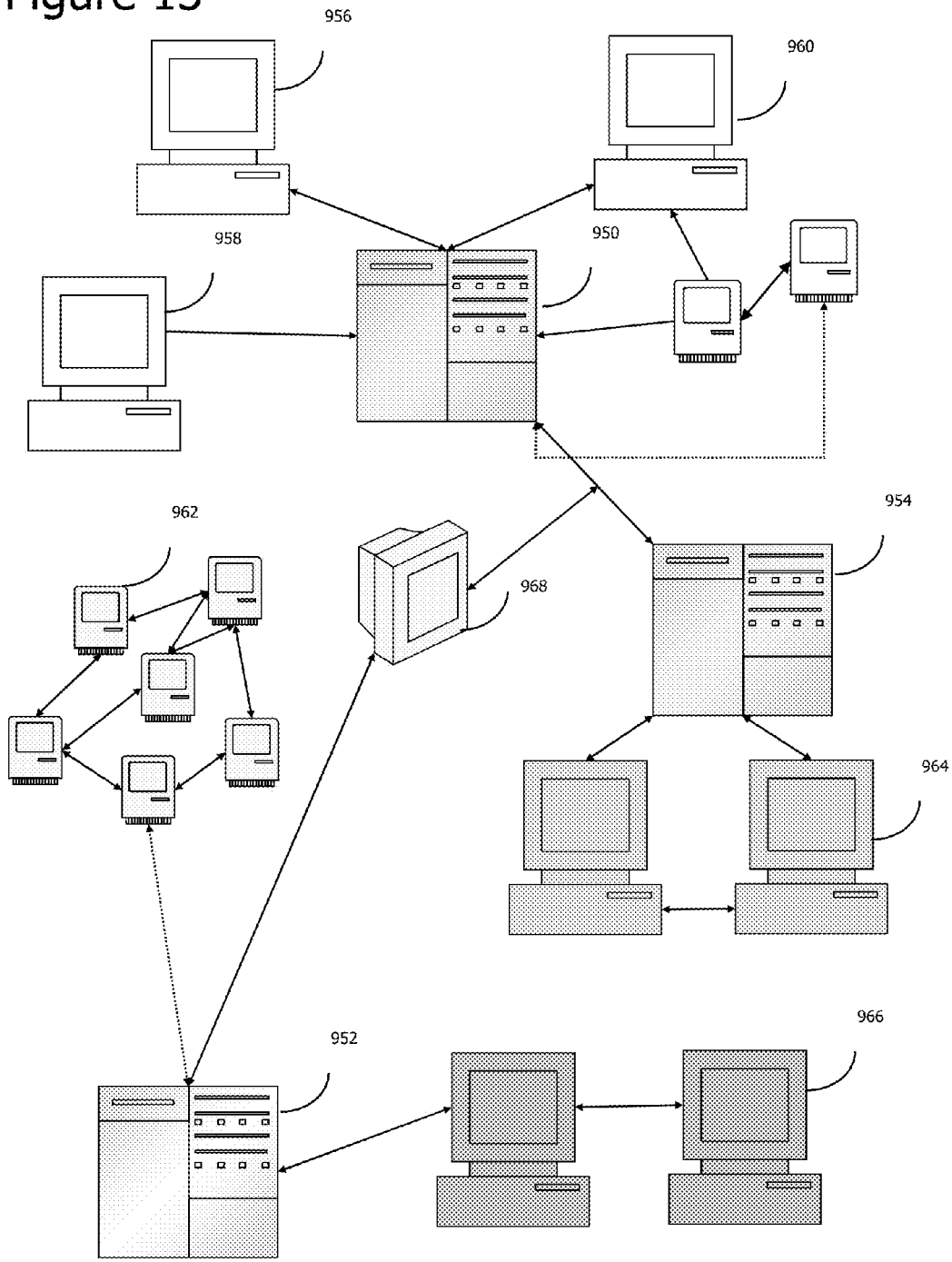
FIG. 13 is a diagram of various computing device topologies, according to some embodiments.

FIG. 13 depicts various processor-based computer hardware and network topologies on which the one or more of the computer-based applications 925, and by extension, adaptive system 100, may be embodied and operate. One or more processors of the computing hardware may be configured to execute the computer-based applications 925 individually or collectively.

Servers 950, 952, and 954 are shown, perhaps residing at different physical locations, and potentially belonging to different organizations or individuals. A standard PC workstation 956 is connected to the server in a contemporary fashion, potentially through the Internet. It should be understood that the workstation 956 can represent any processor-based device, mobile or fixed, including a set-top box. In this instance, the one or more computer-based applications 925, in part or as a whole, may reside on the server 950, but may be accessed by the workstation 956. A terminal or display-only device 958 and a workstation setup 960 are also shown. The PC workstation 956 or servers 950 may embody, or be connected to, a portable processor-based device (not shown), such as a mobile telephony device, which may be a mobile phone or a personal digital assistant (PDA). The mobile telephony device or PDA may, in turn, be connected to another wireless device such as a telephone or a GPS receiver. As just one non-limiting example, the mobile device may be a gesture-sensitive "smart phone," wherein gestures or other physiological responses are monitored, either through actual physical contact between the device and a user or without physical contact, by means of, for example, a touch screen and/or through a camera, or other sensor apparatus. The sensor apparatus may include devices for monitoring brain patterns and/or other physiological processes and conditions. The sensor apparatus may operate within a human body, in accordance with some embodiments. The mobile device may include hardware and/or software that enable it to be location-aware, and may embody a camera and/or sensors that enable the monitoring of environmental conditions such as weather, temperature, lighting levels, moisture levels, sound levels, and so on.

FIG. 13 also features a network of wireless or other portable devices 962. The one or more computer-based applications 925 may reside, in part or as a whole, on all of the devices 962, periodically or continuously communicating with the central server 952, as required. A workstation 964 connected in a peer-to-peer fashion with a plurality of other computers is also shown. In this computing topology, the one or more computer-based applications 925, as a whole or in part, may reside on each of the peer computers 964.

Computing system 966 represents a PC or other computing system, which connects through a gateway or other host in order to access the server 952 on which the one or more computer-based applications 925, in part or as a whole, reside. An appliance 968 includes software "hardwired" into a physical device, or may utilize software running on another system that does not itself host the one or more computer-based applications 925, such as in the case a gaming console or personal video recorder. The appliance 968 is able to access a computing system that hosts an instance of one of the relevant systems, such as the server 952, and is able to interact with the instance of the system.

The processor-based systems on which the one or more computer-based applications 925 operate may include hardware and/or software such as cameras that enable monitoring of physiological responses or conditions such as gestures, body movement, gaze, heartbeat, brain waves, temperature, blood composition, and so on. The processor-based systems may include sensors that enable sensing of environmental conditions such as weather conditions, lighting levels, physical objects in the vicinity, and so on.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A computer-implemented method, comprising:
   accessing automatically a plurality of usage behaviors associated with a plurality of users' use of a computer-implemented social network, wherein the computer-implemented social network comprises computer-implemented representations of a plurality of users of the computer-implemented social network and computer-implemented relationships among the plurality of users, wherein the computer-implemented relationships comprise subscribing relationships;

inferring automatically an expertise level of a first user of the plurality of users with respect to one or more topics based upon a first plurality of the plurality of usage behaviors;

generating automatically a recommendation comprising a representation of the first user for delivery to a second user of the computer-implemented social network, wherein the recommendation is generated in accordance with the inferred expertise level; and delivering the recommendation to the second user.

2. The method of claim 1, further comprising:

inferring automatically the expertise level of the first user of the plurality of users with respect to the one or more topics based upon the first plurality of the plurality of usage behaviors, wherein a plurality of the first plurality of usage behaviors comprise interactions of one or more of the plurality of users with respect to content authored by the first user.

3. The method of claim 1, further comprising:

inferring automatically the expertise level of the first user of the plurality of users with respect to the one or more topics based upon the first plurality of the plurality of usage behaviors and further based upon an automatic inference of an expertise level of a third user of the plurality of users, wherein one of the subscribing relationships is a subscribing relationship in which the third user subscribes to content published by the first user.

4. The method of claim 3, further comprising:

inferring automatically the expertise level of the first user of the plurality of users with respect to the one or more topics based upon the first plurality of the plurality of usage behaviors and further based upon the automatic inference of the expertise level of the third user of the plurality of users, wherein the inference of the expertise level of the third user is based upon a second plurality of the plurality of usage behaviors comprising interactions of one or more of the plurality of users with respect to content authored by the third user.

5. The method of claim 1, further comprising:

inferring automatically the expertise level of the first user of the plurality of users with respect to the one or more topics, wherein the one or more topics are determined by the second user.

6. The method of claim 5, further comprising:

inferring automatically the expertise level of the first user of the plurality of users with respect to the one or more topics, wherein the one or more topics are determined by the second user through application of a control that adjusts a topical neighborhood, wherein the topical neighborhood comprises a plurality of topics and weighted relationships among the plurality of topics.

7. The method of claim 1, further comprising:

generating automatically the recommendation for delivery to the second user of the computer-implemented social network, wherein the recommendation is further generated in accordance with a degree of separation between the first user and the second user, wherein the degree of separation is determined from the computer-implemented relationships.

8. A computer-implemented system comprising one or more processor-based devices configured to:

access a plurality of usage behaviors associated with a plurality of users' use of a computer-implemented social network, wherein the computer-implemented social network comprises computer-implemented representations of a plurality of users of the computer-implemented social network and computer-implemented relationships among the plurality of users, wherein the computer-implemented relationships comprise subscribing relationships;

infer an expertise level of a first user of the plurality of users with respect to one or more topics based upon a first plurality of the plurality of usage behaviors;

generate a recommendation comprising a representation of the first user for delivery to a second user of the computer-implemented social network, wherein the recommendation is generated in accordance with the inferred expertise level; and deliver the recommendation to the second user.

9. The system of claim 8, further comprising the one or more processor-based devices configured to:

infer the expertise level of the first user of the plurality of users with respect to the one or more topics based upon the first plurality of the plurality of usage behaviors, wherein a plurality of the first plurality of usage behaviors comprise interactions of one or more of the plurality of users with respect to content authored by the first user.

10. The system of claim 9, further comprising the one or more processor-based devices configured to:

infer the expertise level of the first user of the plurality of users with respect to the one or more topics based upon the first plurality of the plurality of usage behaviors, wherein the plurality of the first plurality of usage behaviors comprise interactions of the one or more of the plurality of users with respect to the content authored by the first user, wherein at least one of the interactions is a direct feedback behavior.

11. The system of claim 8, further comprising the one or more processor-based devices configured to:

infer the expertise level of the first user of the plurality of users with respect to the one or more topics based upon the first plurality of the plurality of usage behaviors and further based upon expertise calibration information.

12. The system of claim 11, further comprising the one or more processor-based devices configured to:

infer the expertise level of the first user of the plurality of users with respect to the one or more topics based upon the first plurality of the plurality of usage behaviors and further based upon the expertise calibration information, wherein the expertise calibration is determined from self-profiling content published by a user of the computer-implemented social network.

13. The system of claim 8, further comprising the one or more processor-based devices configured to:

infer the expertise level of the first user of the plurality of users with respect to the one or more topics based upon the first plurality of the plurality of usage behaviors, wherein the one or more topics are determined from tags applied by users of the computer-implemented social network to content.

14. The system of claim 8, further comprising the one or more processor-based devices configured to:

generate the recommendation, wherein the recommendation is further in accordance with one or more identified topics, wherein the one or more identified topics are identified based upon an item of content being accessed by the second user, wherein the item of content is related to at least one of the one or more identified topics.

15. The system of claim 8, further comprising the one or more processor-based devices configured to:

generate an explanation for the recommendation, wherein the explanation comprises a reference to the expertise level; and deliver the explanation to the second user.

16. The system of claim 15, further comprising the one or more processor-based devices configured to:

generate the explanation for the recommendation, wherein the explanation comprises the reference to the expertise level and further comprises a reference to a confidence level with respect to the recommendation.

17. A computer-implemented system comprising one or more processor-based devices configured to:

access a plurality of usage behaviors associated with a plurality of users' use of a computer-implemented social network, wherein the computer-implemented social network comprises computer-implemented representations of a plurality of users of the computer-implemented social network and computer-implemented relationships among the plurality of users, wherein the computer-implemented relationships comprise subscribing relationships;

infer a plurality of expertise levels, wherein each of the plurality of expertise levels is associated with a user of the plurality of users, wherein each of the plurality of expertise levels is with respect to one or more topics, and wherein each of the plurality of expertise levels is based upon a plurality of the plurality of usage behaviors;

select, in accordance with a request from a first user of the social network, one or more of the plurality of expertise levels; and deliver for display the one or more expertise levels and a representation of the user associated with each of the one or more expertise levels.

18. The system of claim 17, further comprising the one or more processor-based devices configured to:

infer the plurality of expertise levels, wherein each of the plurality of expertise levels is associated with the user of the plurality of users, wherein each of the plurality of expertise levels is based upon the plurality of the plurality of usage behaviors, and wherein the plurality of the plurality of usage behaviors comprise interactions of one or more of the plurality of users with respect to content authored by the user of the plurality of users who is associated with each expertise level.

19. The system of claim 17, further comprising the one or more processor-based devices configured to:

select, in accordance with the request from the first user of the social network, the one or more of the plurality of expertise levels, wherein the request from the first user comprises the first user selecting one or more topics.

20. The system of claim 17, further comprising the one or more processor-based devices configured to:

select, in accordance with the request from the first user of the social network, a plurality of expertise levels associated with a user of the social network, wherein the expertise levels correspond to different times.

* * * * *